(12) United States Patent
Gemba et al.

(10) Patent No.: US 9,786,929 B2
(45) Date of Patent: Oct. 10, 2017

(54) FUEL CELL AND FUEL CELL STACK COMPRISING THE SAME

(75) Inventors: Miho Gemba, Osaka (JP); Yoichiro Tsuji, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 1018 days.

(21) Appl. No.: 12/681,004

(22) PCT Filed: Sep. 15, 2009

(86) PCT No.: PCT/JP2009/004605
§ 371 (c)(1),
(2), (4) Date: Mar. 31, 2010

(87) PCT Pub. No.: WO2010/032439
PCT Pub. Date: Mar. 25, 2010

(65) Prior Publication Data
US 2010/0209801 A1     Aug. 19, 2010

(30) Foreign Application Priority Data

Sep. 18, 2008 (JP) ................................ 2008-238825

(51) Int. Cl.
*H01M 8/24* (2016.01)
*H01M 8/02* (2016.01)
(Continued)

(52) U.S. Cl.
CPC ....... *H01M 8/0258* (2013.01); *H01M 8/1007* (2016.02); *H01M 8/0263* (2013.01)

(58) Field of Classification Search
USPC ............ 429/34–39, 433, 532, 517, 534, 457
See application file for complete search history.

(56) References Cited

U.S. PATENT DOCUMENTS 6,007,933 A * 12/1999 Jones ............................ 429/481
6,528,198 B1 * 3/2003 Jones et al. ................... 429/414
(Continued)

FOREIGN PATENT DOCUMENTS

EP     1734604 A1    12/2006
JP    2001-043870     2/2001
(Continued)

OTHER PUBLICATIONS

Sachio Yasufuku, Application of Glass Fiber-Reinforced Plastics to Electrical and Electronic Apparatus in Japan, Jan./Feb. 1994, IEEE Electrical Insulation Magazine, vol. 10, Issue 1, pp. 8-15.*
(Continued)

*Primary Examiner* — Osei Amponsah
(74) *Attorney, Agent, or Firm* — McDermott Will & Emery LLP

(57) ABSTRACT

A fuel cell of the present disclosure includes an electrolyte-layer-electrode assembly, a first separator, a second separator, and one or more gas permeation suppressing sections, the inner surface of the first separator and the inner surface of the second separator have a first region and a second region, the gas permeation suppressing section is provided at least one of a first reactant gas channel and a second reactant gas channel so as to overlap with the first region when viewed in a thickness direction of the first separator, and the gas permeation suppressing section is provided at least one of the first reactant gas channel and the second reactant gas channel so as to overlap with the second region when viewed in the thickness direction of the first separator.

20 Claims, 33 Drawing Sheets

(51) Int. Cl.
*H01M 8/0258* (2016.01)
*H01M 8/1007* (2016.01)
*H01M 8/0263* (2016.01)

(56) References Cited

U.S. PATENT DOCUMENTS

| | | | |
|---|---|---|---|
| 6,528,199 B1* | 3/2003 | Mercuri et al. | 429/532 |
| 6,794,079 B2* | 9/2004 | Inagaki et al. | 429/492 |
| 6,884,536 B1* | 4/2005 | Hatoh et al. | 429/433 |
| 2002/0192532 A1 | 12/2002 | Inagaki et al. | |
| 2003/0077501 A1 | 4/2003 | Knights et al. | |
| 2004/0002002 A1* | 1/2004 | Mizuta et al. | 429/188 |
| 2004/0180248 A1* | 9/2004 | Matsubayashi et al. | 429/26 |
| 2004/0191601 A1* | 9/2004 | Grot | 429/30 |
| 2006/0292432 A1* | 12/2006 | Ogawa et al. | 429/38 |
| 2007/0020504 A1* | 1/2007 | Sugita et al. | 429/38 |
| 2008/0171250 A1 | 7/2008 | Takeguchi et al. | |
| 2008/0233447 A1 | 9/2008 | Gemba et al. | |

FOREIGN PATENT DOCUMENTS

| | | |
|---|---|---|
| JP | 2002-343368 | 11/2002 |
| JP | 2004-327162 | 11/2004 |
| JP | 2005-093244 | 4/2005 |
| JP | 2005-216536 | 8/2005 |
| JP | 2006-114386 | 4/2006 |
| JP | 2006-210335 | 8/2006 |
| JP | 2008-091104 | 4/2008 |
| JP | 2008-146897 | 6/2008 |
| JP | 2009-004282 | 1/2009 |
| JP | 2009-094046 | 4/2009 |
| JP | 2009-199882 | 9/2009 |
| WO | 2005/020346 A2 | 3/2005 |
| WO | WO 2007/013298 A1 | 2/2007 |

OTHER PUBLICATIONS

Extended European Search Report for corresponding EP application No. 09814284.7 issued on May 15, 2014.

* cited by examiner

FUEL CELL AND FUEL CELL STACK COMPRISING THE SAME

RELATED APPLICATIONS

This application is the U.S. National Phase under 35 U.S.C. §371 of International Application No. PCT/JP2009/004605, filed on Sep. 15, 2009, which in turn claims the benefit of Japanese Application No. 2008-238825, filed on Sep. 18, 2008, the disclosures of which Applications are incorporated by reference herein.

FIELD OF THE INVENTION

The present disclosure relates to a configuration of a fuel cell and a configuration of a fuel cell stack comprising the fuel cell. Particularly, the present disclosure relates to a configuration of a polymer electrolyte fuel cell.

DESCRIPTION OF THE RELATED ART

Polymer electrolyte fuel cells (hereinafter referred to as PEFCs) are configured to generate electricity and heat simultaneously through an electrochemical reaction between a fuel gas containing hydrogen and an oxidizing gas containing oxygen, such as air.

A cell of a PEFC includes a MEA (Membrane-Electrode-Assembly) composed of a polymer electrode membrane and a pair of gas diffusion electrodes (anode and cathode), gaskets and electrically-conductive separators. Each separator is provided with a groove-shaped reactant gas channel (fuel gas channel or oxidizing gas channel) on a main surface thereof which is in contact with one of the gas diffusion electrodes to flow a fuel gas or an oxidizing gas (these gases are collectively referred to as reactant gases) therethrough. The MEA with gaskets disposed in peripheral portions thereof is sandwiched between a pair of separators, thereby forming the cell. Plural cells formed in this way are stacked together, the both ends of the cells stacked are sandwiched between end plates, and the end plates and the cells are fastened by fastener members, thereby fabricating the PEFC.

In the cells of the PEFC, a reaction indicated by a chemical formula (1) proceeds in a anode and a reaction indicated by a chemical formula (2) proceeds in a cathode.

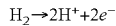
(chemical formula 1)

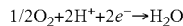
(chemical formula 2)

During power generation of the PEFC, a part of water generated in the cathode diffuses reversibly and moves to the anode.

In a case where hydrogen is used as the fuel gas and air is used as the oxidizing gas, air that is about 2.5 times in amount as large as hydrogen is required to supply oxygen which reacts with hydrogen to the cathode. To this end, a fuel cell is known, in which the width of the oxidizing gas channel is set larger than the width of the fuel gas channel (see, for example, Japanese Laid-Open Patent Application Publication No. 2004-327162). When the width of the oxidizing gas channel is set larger than the width of the fuel gas channel, an area of a portion of the separator and a portion of the membrane electrode assembly which contact each other is different between the anode and the cathode. For this reason, in the fuel cell disclosed in the publication No. 2004-327162, at least one of an anode separator and a cathode separator is provided with an auxiliary member for substantially equalizing the contact area of the separator and the membrane electrode assembly (MEA) between the anode and the cathode, to make a surface pressure applied from the anode and cathode uniform.

To prevent a gasket to fall into a reactant gas channel, there is known a fuel cell plate in which a flat plate is attached to the end portion of a gas channel to form a tunnel-shaped gas channel, and a seal unit is provided between the flat plate and a gas channel region covered with the flat plate (e.g., see Japanese Laid-Open Patent Application Publication No. 2008-91104).

However, in the fuel cell disclosed in Patent document 1, if the fuel cell is operated under high-temperature and low-humidity conditions (e.g., the dew point of the reactant gas is set lower than the temperature of the interior of a fuel cell stack), the above reaction does not occur sufficiently in an upstream portion of the reactant gas channel. As a result, water is not generated and a portion of the polymer electrolyte membrane which faces the upstream portion of the reactant gas channel gets dried, which results in deterioration of the membrane.

SUMMARY OF THE DISCLOSURE

The present disclosure is directed to solving the above mentioned problems and an object of the present disclosure is to provide a fuel cell which is capable of suppressing degradation of an electrolyte layer (polymer electrolyte membrane) when a fuel cell, in particular, a polymer electrolyte fuel cell is operated under high-temperature and low-humidity conditions, and a fuel cell stack comprising the fuel cell.

By the way, it is known that during the operation of the fuel cell, water (liquid and gaseous water) content in a portion of a gas diffusion electrode (hereinafter referred to as electrode) which faces a reactant gas channel is lower than a water content in a portion of the electrode which is in contact with a rib portion formed between adjacent reactant gas channels. FIG. 22 is a schematic view showing the water content in the electrode during the operation of the fuel cell.

The inventors intensively studied to solve the above mentioned problem associated with the prior art and discovered the following. To be specific, as shown in FIG. 22, water present in a portion 202A of an electrode 202 which is in contact with a rib portion 204 formed between adjacent reactant gas channels 203 diffuses toward a portion 202B of the electrode 202 which faces the reactant gas channel 203, and as a result, the water content in a region of the electrode 202 at a boundary between the rib portion 204 and the reactant gas channel 203 is higher than the water content in a center region of a portion 202B of the electrode 202. In other words, the water content is less in a direction away from the portion 202A of the electrode 202 which is in contact with the rib portion 204. The inventors discovered that the object of the present disclosure is effectively achieved by using a configuration described below, and the conceived the present disclosure.

A fuel cell of the present disclosure comprises an electrolyte-layer-electrode assembly including an electrolyte layer and a pair of electrodes sandwiching the electrolyte layer; a first separator which has a plate shape and is electrically conductive, the first separator being disposed to contact the electrolyte-layer-electrode assembly and being provided with a first groove-shaped reactant gas channel on an inner surface thereof which contacts one of the electrodes; a second separator which has a plate shape and is electrically conductive, the second separator being disposed to contact the electrolyte-layer-electrode assembly and being provided with a second groove-shaped reactant gas channel on an inner surface thereof which contacts the other electrode; and one or more gas permeation suppressing sections for suppressing a gas from flowing to at least one of the electrodes; wherein each of the inner surface of the first separator and the inner surface of the second separator has a region (hereinafter referred to as a first region) including at least a portion where the first reactant gas channel extending from its upstream end contacts one of the electrodes first when viewed in a thickness direction of the first separator, and a region (hereinafter referred to as a second region) including at least a portion where the second reactant gas channel extending from its upstream end contacts the other electrode first when viewed in the thickness direction of the first separator; wherein at least one of the first reactant gas channel and the second reactant gas channel is configured such that the gas permeation suppressing section is disposed to overlap with the first region when viewed in the thickness direction of the first separator; and wherein at least one of the first reactant gas channel and the second reactant gas channel is configured such that the gas permeation suppressing section is disposed to overlap with the second region when viewed in the thickness direction of the first separator.

As explained above, since the water content in the portion of the electrode which faces the first reactant gas channel is lower than the water content in the portion of the electrode which is in contact with the rib portion, and especially, the water generated is less in the regions of the electrode which face the first region of the first reactant gas channel and the second region of the second reactant gas channel, because the electrochemical reaction between the fuel gas and the oxidizing gas does not occur sufficiently in these regions. For this reason, if the fuel cell is operated under high-temperature and low-humidity conditions, a steam diffuses from the electrode to the first reactant gas channel or the second reactant gas channel. As a result, the electrode tends to get dried.

To solve this, the fuel cell of the present disclosure is configured such that the gas permeation suppressing section is formed in the portion(s) of the first reactant gas channel and/or the second reactant gas channel which is/are formed in the first region and/or the second region. Therefore, it is possible to suppress the steam from moving from the region(s) of the electrode which face(s) the first region and/or the second region, to the first reactant gas channel and/or the second reactant gas channel formed in these regions. Thus, it is possible to suppress the electrode and hence the electrolyte layer from getting dried. As a result, degradation of the electrolyte layer (polymer electrolyte membrane) can be suppressed.

In the fuel cell of the present disclosure, the gas permeation suppressing section may have a culvert shape. The phrase "the gas permeation suppressing section has a culvert shape" means that the channel is formed by a tunnel or a groove having an opening covered with a lid.

In the fuel cell of the present disclosure, the gas permeation suppressing section of the first reactant gas channel may be provided such that a cover member covers an opening of the first reactant gas channel; and the gas permeation suppressing section of the second reactant gas channel may be provided such that a cover member covers an opening of the second reactant gas channel.

In the fuel cell of the present disclosure, the cover member may have a through-hole in a region thereof which covers the first reactant gas channel or the second reactant gas channel.

In such a configuration, it is possible to supply the reactant gas to the region(s) of the electrode which face(s) the first region and/or the second region while suppressing the steam from moving from the region(s) of the electrode which face(s) the first region and/or the second region, to the first reactant gas channel and/or the second reactant gas channel, which is/are formed in the region(s) of the electrode.

In the fuel cell of the present disclosure, the cover member may be made of an electrically-conductive material.

In the fuel cell of the present disclosure, a degree of porosity of the cover member may be lower than a degree of porosity of a gas diffusion layer of each of the electrodes.

In the fuel cell of the present disclosure, the cover member may be made of a material having porosity of zero degree.

In the fuel cell of the present disclosure, the gas permeation suppressing section of the first reactant gas channel may be integral with the first separator and may be constructed of a tunnel formed by boring the first separator; and the gas permeation suppressing section of the second reactant gas channel may be integral with the second separator and may be constructed of a tunnel formed by boring the second separator.

In the fuel cell of the present disclosure, the tunnel of the first separator may be provided with a through-hole which opens in the inner surface of the first separator, and the tunnel of the second separator may be provided with a through-hole which opens in the inner surface of the second separator.

In such a configuration, it is possible to supply the reactant gas to the region(s) of the electrode which face(s) the first region and/or the second region while suppressing a steam from moving from the region(s) of the electrode which face(s) the first region and/or the second region, to the first reactant gas channel and/or the second reactant gas channel, which is/are formed in these region(s) of the electrode.

In the fuel cell of the present disclosure, the first reactant gas channel may be provided with the gas permeation suppressing section in each of portions thereof respectively formed in the first region and the second region of the first separator.

In the fuel cell of the present disclosure, the second reactant gas channel may be provided with the gas permeation suppressing section in each of portions thereof respectively formed in the first region and the second region of the second separator.

In the fuel cell of the present disclosure, the first reactant gas channel may be provided with the gas permeation suppressing section in each of portions thereof respectively formed in the first region and the second region of the first separator, and the second reactant gas channel may be provided with the gas permeation suppressing section in each of portions thereof respectively formed in the first region and the second region of the second separator.

In the fuel cell of the present disclosure, the first reactant gas channel may be provided with the gas permeation suppressing section in a portion thereof formed in the first region of the first separator, and the second reactant gas channel may be provided with the gas permeation suppressing section in a portion thereof formed in the second region of the second separator.

In the fuel cell of the present disclosure, the first reactant gas channel may be provided with the gas permeation suppressing section in a portion thereof formed in the second region of the first separator, and the second reactant gas channel may be provided with the gas permeation suppressing section in a portion thereof formed in the first region of the second separator.

In the fuel cell of the present disclosure, the first reactant gas channel and the second reactant gas channel may be arranged to form a parallel flow pattern.

In the fuel cell of the present disclosure, the first reactant gas channel and the second reactant gas channel may be arranged to form a counter flow pattern.

In the fuel cell of the present disclosure, each of the first reactant gas channel and the second reactant gas channel may have a serpentine shape.

In the fuel cell of the present disclosure, the first reactant gas channel may include a first upstream gas channel, a first downstream gas channel, and plural first communication gas channels through which the first upstream gas channel communicates with the first downstream gas channel, the plural first communication gas channels extending in a straight-line shape; wherein the second reactant gas channel may include a second upstream gas channel, a second downstream gas channel, and plural second communication gas channels through which the second upstream gas channel communicates with the second downstream gas channel, the plural second communication gas channels extending in a straight-line shape; wherein an upstream end of the first upstream gas channel may be an upstream end of the first reactant gas channel and a downstream end of the first downstream gas channel is a downstream end of the first reactant gas channel; and wherein an upstream end of the second upstream gas channel may be an upstream end of the second reactant gas channel and a downstream end of the second downstream gas channel may be a downstream end of the second reactant gas channel.

In the fuel cell of the present disclosure, a recess may be provided in the first region or the second region of the inner surface of at least one of the first separator and the second separator such that a main surface of the cover member which does not contact the first separator or the second separator is entirely coplanar with the inner surface of the first separator or the second separator.

A fuel cell stack of the present disclosure comprises plural fuel cells, the plural fuel cells being stacked together and fastened to each other.

In such a configuration, it is possible to suppress the steam from moving from the regions of the electrode which face(s) the first region and/or the second region, to the first reactant gas channel and/or the second reactant gas channel, which are formed in these regions. This, it is possible to suppress the electrode and hence the electrolyte layer from getting dried. As a result, degradation of the electrolyte layer (polymer electrolyte membrane) can be suppressed.

The above and further objects, features and advantages of the present disclosure will more fully be apparent from the following detailed description of preferred embodiments with accompanying drawings.

DESCRIPTION OF THE PREFERRED EMBODIMENTS

Figure 1:
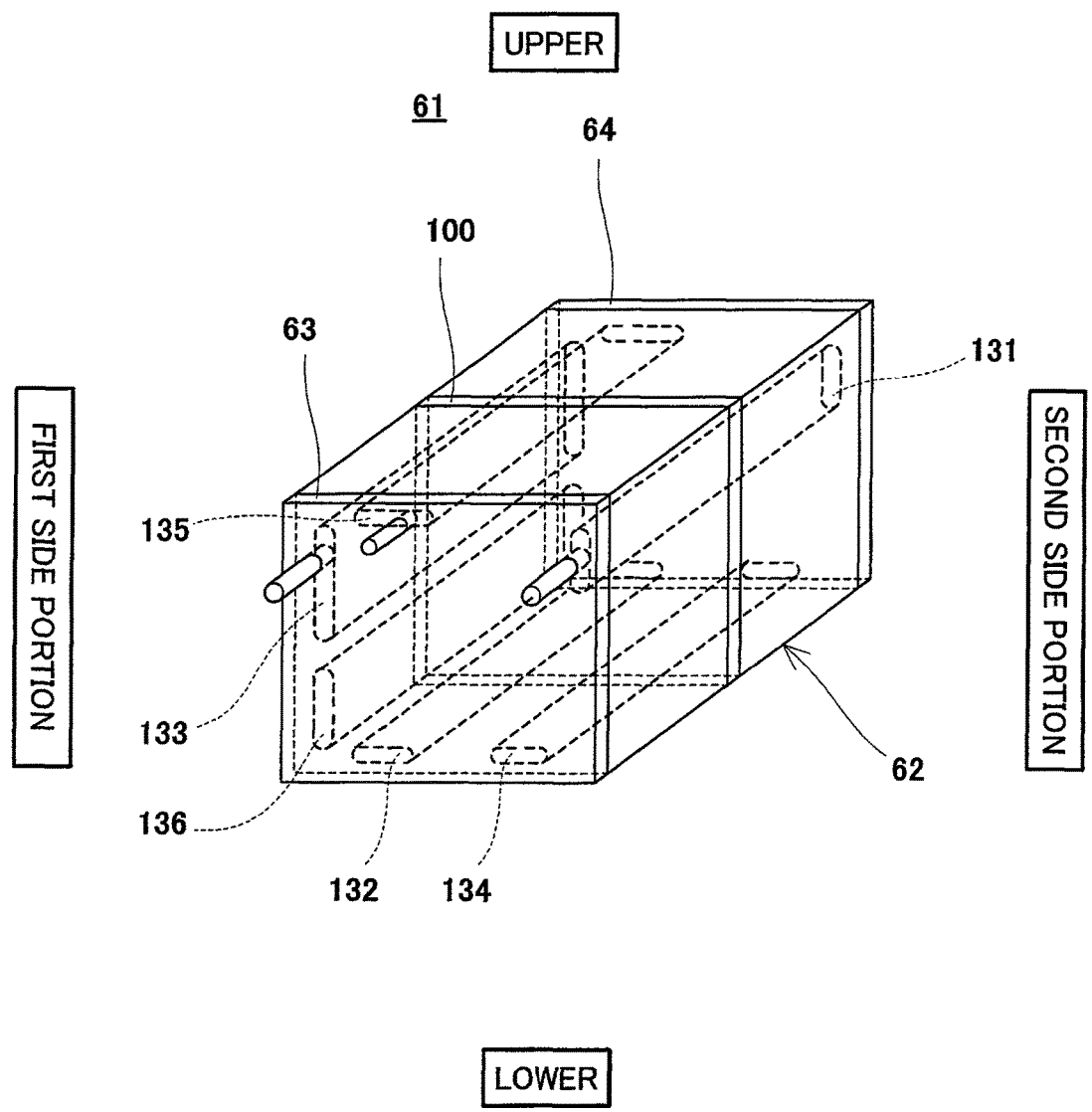
FIG. 1 is a perspective view schematically showing an exemplary configuration of a fuel cell stack according to Embodiment 1 of the present disclosure.

Hereinafter, preferred embodiments of the present disclosure will be described with reference to the drawings. Throughout the drawings, the same or corresponding parts are designated by the same reference numerals and repetitive description thereof is sometimes omitted.

Embodiment 1

[Configuration of Fuel Cell Stack]

FIG. 1 is a perspective view schematically showing an exemplary configuration of a fuel cell stack according to Embodiment 1 of the present disclosure. In FIG. 1, the upper and lower sides of the fuel cell stack are expressed as the upper and lower sides in FIG. 1.

As shown in FIG. 1, a fuel cell stack 61 according to Embodiment 1 of the present disclosure includes a cell stack body 62 composed of polymer electrolyte fuel cells 100 (hereinafter simply referred to as fuel cells) which have a plate shape as a whole and are stacked together in a thickness direction thereof, first and second end plates 63 and 64 disposed at both ends of the cell stack body 62, and fastener members (not shown) fastening the cell stack body 62 to the first and second end plates 63 and 64, in a direction in which fuel cells 100 are stacked together. Although current collectors and insulating plates are provided at the first and second end plates 63 and 64, they are not illustrated. The plate-shaped fuel cells 100 extend in parallel with a vertical plane and are stacked together horizontally.

An oxidizing gas supply manifold 133 is provided in the upper portion of one side portion (left side portion in FIG. 1: hereinafter referred to as first side portion) of the cell stack body 62 such that the oxidizing gas supply manifold 133 penetrates the cell stack body 62 in the direction in which the fuel cells 100 are stacked together, and a cooling medium discharge manifold 136 is provided in the lower portion of the first side portion. A cooling medium supply manifold 135 is provided inward relative to the oxidizing gas supply manifold 133 in the upper portion of the first side portion of the cell stack body 62, where the oxidizing gas supply manifold 133 is provided such that the cooling medium supply manifold 135 penetrates the cell stack body 62 in the direction in which the fuel cells 100 are stacked together. Likewise, a fuel gas discharge manifold 132 is provided inward relative to the cooling medium discharge manifold 136 in the lower portion where the cooling medium discharge manifold 136 is provided such that the fuel gas discharge manifold 132 penetrates the cell stack body 62 in the direction in which the fuel cells 100 are stacked together. A fuel gas supply manifold 131 is provided in the other side portion (right side portion in FIG. 1: hereinafter referred to as second side portion) of the cell stack body 62 such that the fuel gas supply manifold 131 penetrates the cell stack body 62 in the direction in which the fuel cells 100 are stacked together. An oxidizing gas discharge manifold 134 is provided in the lower portion of the second side portion such that the oxidizing gas discharge manifold 134 penetrates the cell stack body 62 in the direction in which the fuel cells 100 are stacked together.

Suitable pipes are coupled to the manifolds, respectively. Through these suitable pipes, a fuel gas, an oxidizing gas and a cooling medium are supplied to and discharged from the fuel cell stack 61.

Although the fuel cell stack 61 is formed using the cell stack body 62 including the fuel cells 100 stacked together in the thickness direction thereof, the configuration of the fuel cell stack 61 is not limited to this. Alternatively, the fuel cell stack 61 may be formed in such a manner that a single fuel cell 100 is sandwiched between the first and second end plates 63 and 64, and others and fastened to each other.

[Configuration of Polymer Electrolyte Fuel Cell]

Next, the configuration of the polymer electrolyte fuel cell 100 according to Embodiment 1 of the present disclosure will be described with reference to FIG. 2.

Figure 2:
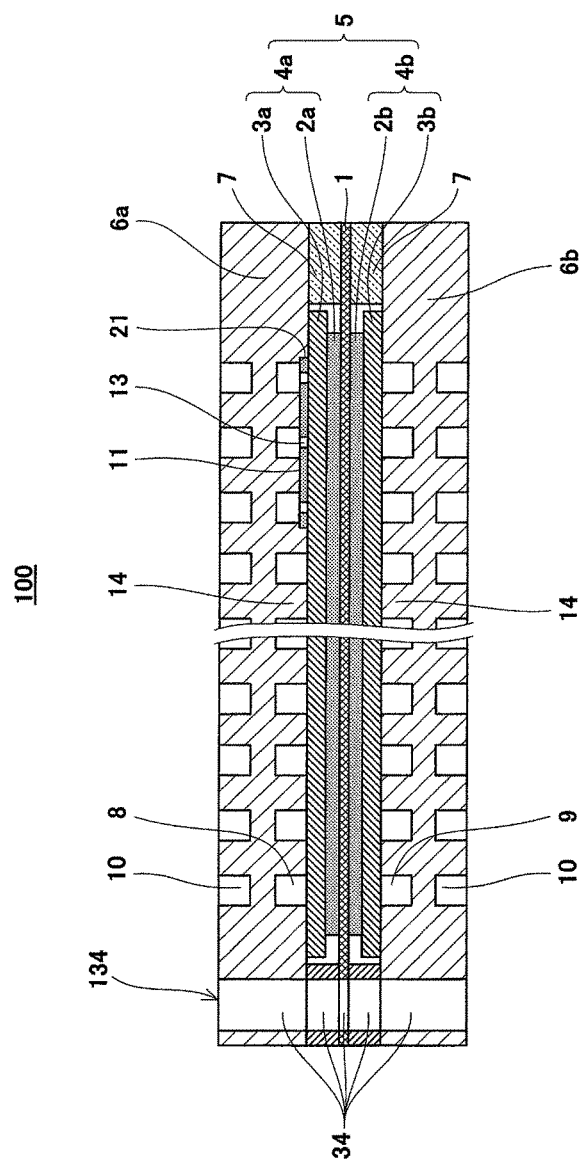
FIG. 2 is a cross-sectional view schematically showing an exemplary configuration of a fuel cell of the fuel cell stack of FIG. 1.

FIG. 2 is a cross-sectional view schematically showing an exemplary configuration of the fuel cell 100 in the fuel cell stack 61 of FIG. 1. In FIG. 2, a part of the configuration is omitted.

As shown in FIG. 2, the fuel cell 100 of Embodiment 1 includes a MEM (Membrane-Electrode-Assembly) 5, gaskets 7 and an anode separator (first separator) 6a, a cathode separator (second separator) 6b and a cover member 11.

Firstly, the MEA 5 will be described.

The MEA 5 has a polymer electrolyte membrane (electrolyte layer) which selectively transports hydrogen ions, a anode 4a and a cathode 4b. The polymer electrolyte membrane 1 has a substantially quadrilateral shape (in this Embodiment rectangular shape). The anode 4a and the cathode 4b (these are referred to as gas diffusion electrodes (electrodes)) are provided on both surfaces of the polymer electrolyte membrane 1 such that they are positioned inward relative to peripheral portions thereof. The manifold holes such as the oxidizing gas discharge manifold holes 34 as described later are provided to penetrate the peripheral portion of the polymer electrolyte membrane 1 in a thickness direction thereof.

The anode 4a includes an anode catalyst layer 2a which is provided on one main surface of the polymer electrolyte membrane 1 and contains as a major component carbon powder carrying platinum-based metal catalyst, and an anode gas diffusion layer 3a which is provided on the anode catalyst layer 2a and has gas permeability and electric conductivity. In the same manner, the cathode 4b includes a cathode catalyst layer 2b which is provided on the other main surface of the polymer electrolyte membrane 1 and contains as a major component carbon powder carrying platinum-based metal catalyst, and a cathode gas diffusion layer 3b which is provided on the cathode catalyst layer 2b and has gas permeability and electric conductivity. The end portion of the anode catalyst layer 2a and the end portion of the cathode catalyst layer 2b align with each other, and the end portion of the anode gas diffusion layer 3a and the end portion of the cathode gas diffusion layer 3b align with each other when viewed in the thickness direction of the polymer electrolyte membrane 1. In other words, the end portion of the anode 4a and the end portion of the cathode 4b align with each other when viewed in a thickness direction of the polymer electrolyte membrane 1.

Next, the constituents of the MEA 5 will be described.

The polymer electrolyte membrane 1 has proton conductivity. The polymer electrolyte membrane 1 desirably includes sulfonic acid group, carboxylic acid group, phosphonic acid group or sulfonimide group, as cation exchange group. In light of the proton conductivity, the polymer electrolyte membrane 1 more desirably includes sulfonic acid group.

The resin having the sulfonic acid group forming the polymer electrolyte membrane 1 is desirably dry resin having an ion exchange capacity of 0.5~1.5 meq/g. The ion exchange capacity of dry resin forming the polymer electrolyte membrane 1 is desirably 0.5 meq/g or larger, because an increase in the resistance value of the polymer electrolyte membrane 1 during power generation can be sufficiently reduced. The ion exchange capacity of dry resin is desirably 1.5 meq or smaller, because the polymer electrolyte membrane 1 is less likely to get humid without an increase in the water content of the polymer electrolyte membrane 1, and therefore there is no chance that the pores in the catalyst layer 2 as described later will not be clogged with water. In addition, for the reasons described above, the ion exchange capacity of dry resin is more desirably 0.8~1.2 meq/g.

The material of the polymer electrolyte is desirably a copolymer including a polymer unit based on perfluoro vinyl compound expressed as $CF_2=CF-(OCF_2CFX)_m-O_p-(CF_2)_n-SO_3H$ (m: integer of 0~3, n: integer of 1~12, p: 0 or 1, X: fluorine atom or trifluoromethyl group), and a polymer unit based on tetrafluoroethylene.

Preferable examples of the perfluoro vinyl compounds are compounds represented by the formulae (1)~(3). In the formulae, q indicates an integer in a range of 1~8, r indicates an integer in a range of 1~8, and t indicates an integer in a range of 1~3.

$$CF_2=CFO(CF_2)_q-SO_3H \quad (1)$$

$$CF_2=CFOCF_2CF(CF_3)O(CF_2)_r-SO_3H \quad (2)$$

$$CF_2=CF(OCF_2CF(CF_3))_tO(CF_2)_2-SO_3H \quad (3)$$

The anode catalyst layer 2a and the cathode catalyst layer 2b are not particularly limited so long as it is capable of achieving the advantage of the present disclosure, but may be configured like the catalyst layers of the gas diffusion electrodes of a known fuel cell. For example, each of the anode catalyst layer 2a and the cathode catalyst layer 2b may contain, for example, electrically-conductive carbon particles (powders) carrying electrocatalyst and polymer electrolyte having cation (hydrogen ions) conductivity, or may further contain a water-repellent material such as polytetrafluoroethylene. The anode catalyst layer 2a and the cathode catalyst layer 2b may have the same configuration or different configurations.

As the polymer electrolyte, the material forming the above described polymer electrolyte membrane 1 may be used, or a different material may be used. As the electrocatalyst, metal particles may be used. The metal particles are not particularly limited but may be made of various metals. Nonetheless, in light of the electrode reaction activity, they may be desirably made of at least one metal selected from the group consisting of platinum, gold, silver, ruthenium, rhodium, palladium, osmium, iridium, chrome, iron, titanium, manganese, cobalt, nickel, molybdenum, tungsten, aluminum, silicon, zinc, and tin. Among them, platinum, or alloy including platinum and at least one metal selected from the above-identified metal group is desirable. Alloy of platinum and ruthenium is particularly desirable to stabilize the activity of the catalyst in the anode catalyst layer 2a.

The metal particles used for the electrocatalyst desirably have an average particle diameter of 1~5 nm. The electrocatalyst of an average particle diameter of 1 nm or larger is desirable because it is easily industrially prepared. The electrocatalyst of an average particle diameter of 5 nm or smaller is desirable because activity per electrocatalyst mass is sufficiently ensured, and thereby a cost of the fuel cell is reduced.

The electrically-conductive carbon particles desirably have a specific surface area of 50~1500 $m^2$/g. The specific surface area of the carbon particles is desirably 50 $m^2$/g or larger, because a carrying ratio of the electrocatalyst easily increases and the obtained catalyst layer 2 can have a sufficient output ability. The specific surface area of the carbon particles is desirably 1500 $m^2$/g or smaller, because pores of a sufficient size can be easily ensured, the electrocatalyst can be easily covered with the polymer electrolyte membrane, and the anode catalyst layer 2a and the cathode catalyst layer 2b can have a sufficient output property. For the same reason mentioned above, the specific surface area of the carbon particles is more desirably 200~900 $m^2$/g.

The electrically-conductive carbon particles have an average particle diameter of 0.1~1.0 μm. The average particle diameter of the electrically-conductive carbon particles is desirably 0.1 μm or larger, because the anode catalyst layer 2a and the cathode catalyst layer 2b can have a sufficient gas diffusion ability and can prevent flooding more surely. The average particle diameter of the electrically-conductive carbon particles is desirably 1.0 μm or smaller, because the electrocatalyst can be more easily covered with the polymer electrolyte membrane in a good condition and the area of the electrocatalyst which is covered with the polymer electrolyte can be sufficiently ensued so that a sufficiently high electrode ability is easily ensured.

The anode catalyst layer 2a and the cathode catalyst layer 2b are produced by a method known in the art using a catalyst layer forming ink containing electrically-conductive carbon particles carrying electrocatalyst made of precious metal, polymer electrolyte, and a dispersion medium. The materials used for the anode gas diffusion layer 3a and the cathode gas diffusion layer 3b are not particularly limited, but may be materials known in the art. For example, an electrically-conductive porous base material such as a carbon cloth or a carbon paper may be used. The electrically-conductive porous base material may be subjected to water-repellent treatment in a method known in the art.

As the anode gas diffusion layer 3a and the cathode gas diffusion layer 3b, for example, an electrically-conductive base material having a porous structure, which is fabricated using carbon fine powders, a pore forming material, a carbon paper or carbon cloth which have large surface areas, may be used to provide gas permeability. Alternatively, water-repellent polymer, which is represented by fluorine-containing resin, etc, may be dispersed into the anode gas diffusion layer 3a or the cathode gas diffusion layer 3b, to provide a high water discharge ability. Also, the anode gas diffusion layer 3a and the cathode gas diffusion layer 3b may be formed using an electron-conductive material such as carbon fibers, metal fibers or carbon fine powders, to provide high electron conductivity.

In a further alternative, a water-repellent carbon layer composed of water-repellent polymer and carbon powders may be provided between the anode gas diffusion layer 3a and the anode catalyst layer 2a, and between the cathode gas diffusion layer 3b and the cathode catalyst layer 2b. This enables water control (retaining water required to maintain a good property of the MEA 5 and quick discharge of unnecessary water) in the MEA 5 more easily and more surely.

Next, other constituents of the fuel cell 100 will be described.

A pair of gaskets 7 which are made of fluorine-containing rubber and ring-shaped are provided around the anode 4a and the cathode 4b (to be precise, the anode gas diffusion layer 3a and the cathode gas diffusion layer 3b) of the MEA 5 such that the gaskets 7 sandwich the polymer electrolyte membrane 1 between them. This makes it possible to prevent leakage of the fuel gas and the oxidizing gas to outside the cell and to prevent mixing of these gases inside the fuel cell 100. Manifold holes such as the oxidizing gas discharge manifold hole 34, which are through-holes provided to penetrate peripheral portions of the gaskets 7 in a thickness direction thereof.

The electrically-conductive anode separator 6a and the electrically-conductive cathode separator 6b are provided to sandwich the MEA 5 and the gaskets 7. Thus, the MEA 5 is mechanically fastened and electric connection of the MEA 5 is accomplished in a state where plural fuel cells 100 are stacked together in a thickness direction thereof. The separators 6a and 6b may be formed of a metal which is high in heat conductivity and electric conductivity, graphite or a mixture of graphite and resin. For example, a mixture of carbon powders and a binder (solvent) which is fabricated by injection molding or a plate material which is made of titanium or stainless steel and has a gold-plated surface may be used.

A groove-shaped fuel gas channel (first reactant gas channel) 8 is provided on one main surface (hereinafter referred to as inner surface) of the anode separator 6a which is in contact with the anode 4a to flow the fuel gas therethrough, while a groove-shaped cooling medium channel 10 is provided on the other main surface (hereinafter referred to as outer surface) of the anode separator 6a to flow a cooling medium therethrough. Likewise, a groove-shaped oxidizing gas channel (second reactant gas channel) 9 is provided on one main surface (hereinafter referred to as inner surface) of the cathode separator 6b which is in contact with the cathode 4b to flow the oxidizing gas therethrough, while the groove-shaped cooling medium channel 10 is provided on the other main surface (hereinafter referred to as outer surface) of the catalyst separator 6b to flow the cooling medium therethrough.

In the above configuration, the fuel gas and the oxidizing gas are supplied to the anode 4a and the cathode 4b, respectively, and these gases react with each other to generate electricity and heat. A cooling medium such as cooling water is flowed through the cooling medium channel 10 to recover the generated heat.

The fuel cell 100 configured as described above may be used as a single cell, or otherwise plural fuel cells 100 may be stacked together to form the fuel cell stack 61. When the fuel cells 100 are stacked together, the cooling medium channel 10 may be provided for each set of two or three cells. When the cooling medium channel 10 is not provided between the cells, a single separator sandwiched between two MEAs 5 may be provided with the fuel gas channel 8 on one main surface thereof and the oxidizing gas channel 9 on the other main surface thereof so that the single separator can serve as both of the anode separator 6a and the cathode separator 6b. Although the first separator is the anode separator 6a, the second separator is the cathode separator 6b, the first reactant gas channel is the fuel gas channel 8 and the second reactant gas channel is the oxidizing gas channel 9 in this Embodiment, the first separator may be the cathode separator 6b, the second separator may be the anode separator 6a, the first reactant gas channel may be the oxidizing gas channel 9 and the second reactant gas channel may be the fuel gas channel 8.

[Configuration of Separator]

Next, the anode separator 6a and the cathode separator 6b will be described with reference to FIGS. 2 to 6 in detail.

Figure 3:
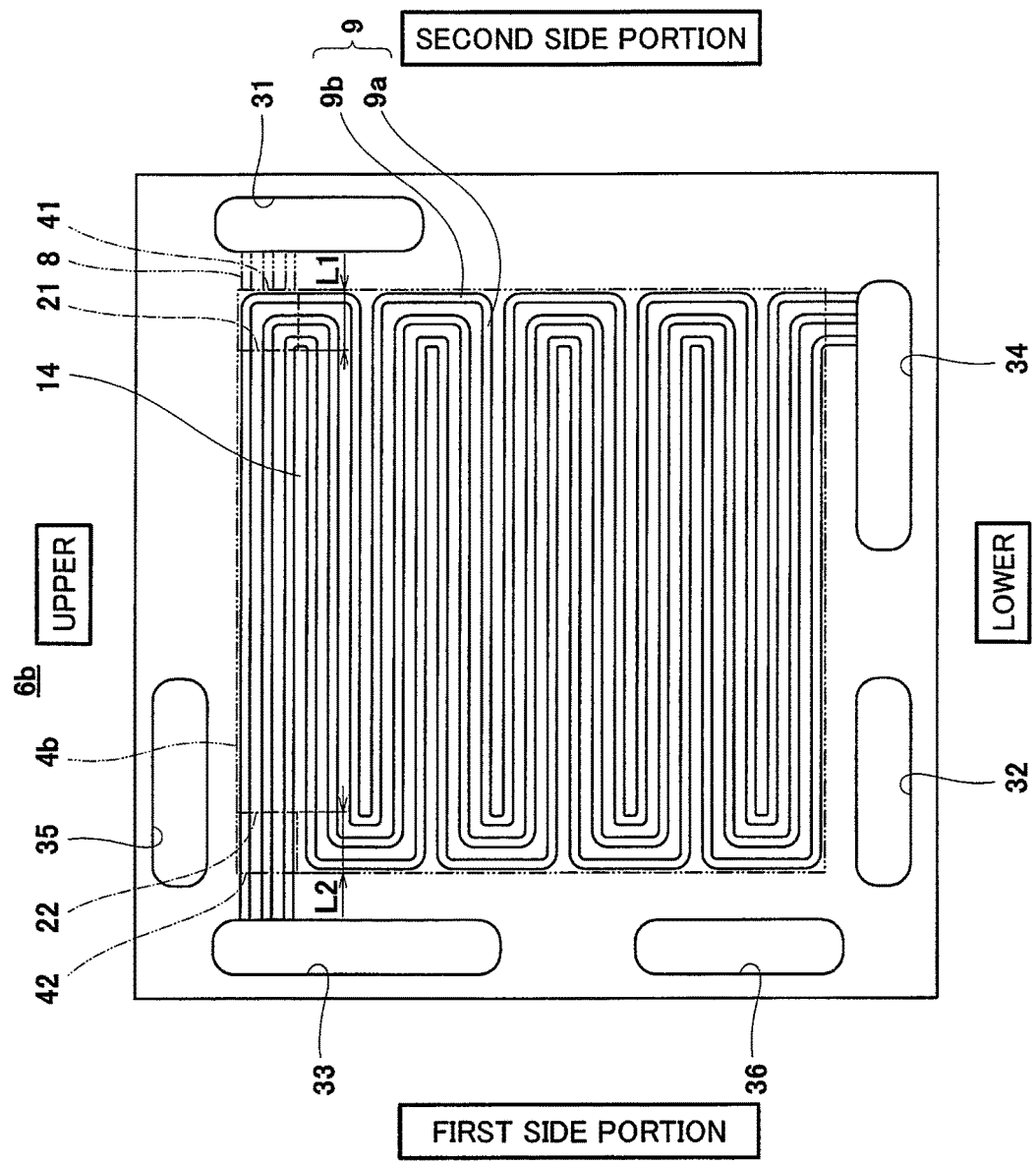
FIG. 3 is a schematic view showing an exemplary configuration of the inner surface of a cathode separator of the fuel cell of FIG. 2.
Figure 4:
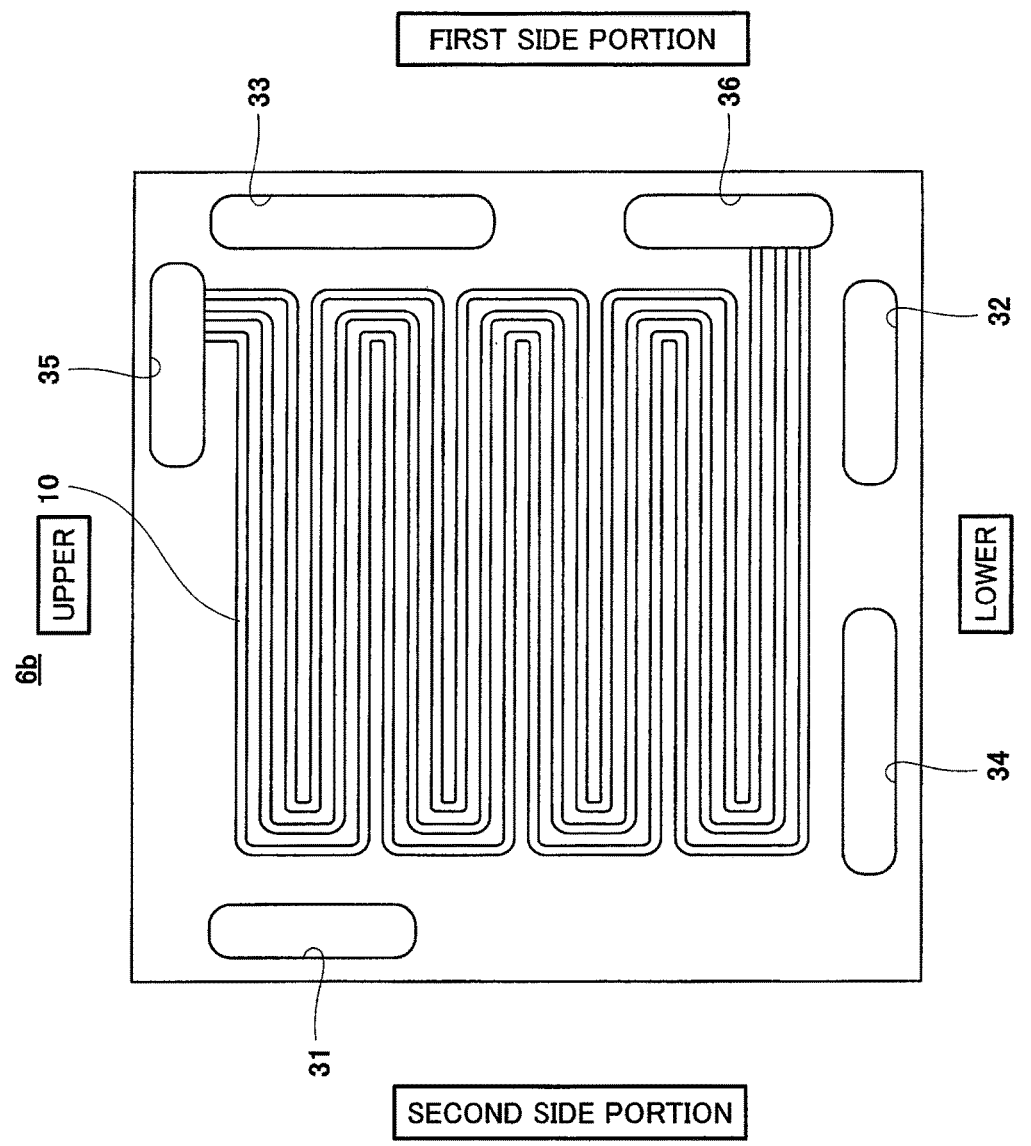
FIG. 4 is a schematic view showing an exemplary configuration of the outer surface of the cathode separator of the fuel cell of FIG. 2.

Firstly, the configuration of the cathode separator 6b will be described with reference to FIGS. 2 to 4. FIG. 3 is a schematic view showing an exemplary configuration of the inner surface of the cathode separator 6b of the fuel cell 100 of FIG. 2. FIG. 4 is a schematic view showing an exemplary configuration of the outer surface of the cathode separator 6b of the fuel cell 100 of FIG. 2. In FIGS. 3 and 4, the upper and lower sides of the cathode separator 6b are expressed as the upper and lower sides in these Figures, and in FIG. 3, a part of the fuel gas channel 8 is indicated by imaginary lines.

As shown in FIG. 3, the cathode separator 6b has a plate shape and is in the form of substantially quadrilateral (rectangle), and manifold holes such as the fuel gas supply manifold hole 31, are provided to penetrate the peripheral portion thereof in the thickness direction of the cathode separator 6b. To be specific, an oxidizing gas supply manifold hole 33 is provided in the upper portion of one side portion (hereinafter referred to as first side portion) of the cathode separator 6b, and a cooling medium discharge manifold hole 36 is provided in the lower portion of the first side portion. A cooling medium supply manifold hole 35 is provided inward relative to the oxidizing gas supply manifold hole 33 in the upper portion of the first side portion where the oxidizing gas supply manifold hole 33 is provided. Likewise, a fuel gas discharge manifold hole 32 is provided inward relative to the cooling medium discharge manifold hole 36 in the lower portion of the first side portion where the cooling medium discharge manifold hole 36 is provided. A fuel gas supply manifold hole 31 is provided in the upper portion of the other side portion (hereinafter referred to as second side portion) of the cathode separator 6b, and an oxidizing gas discharge manifold hole 34 is provided in the lower portion of the second side portion.

The fuel gas supply manifold hole 31 and the oxidizing gas supply manifold hole 33 are provided at opposite sides to sandwich a center portion of the cathode separator 6b. The term "center portion of the cathode separator 6b" as used herein means a center portion relative to the outer periphery of the cathode separator 6b.

As shown in FIG. 3, the groove-shaped oxidizing gas channel 9 is formed in a serpentine shape on the inner surface of the cathode separator 6b to connect the oxidizing gas supply manifold hole 33 to the oxidizing gas discharge manifold hole 34. In this Embodiment, the oxidizing gas channel 9 is composed of three grooves each of which is substantially constructed of a reciprocating portion 9a and an inverted portion 9b.

To be more specific, the groove of the oxidizing gas channel 9 extends a certain distance horizontally from the oxidizing gas supply manifold hole 33 toward the second side portion and then a certain distance downwardly. Then, the groove extends a certain distance horizontally toward the second side portion and then a certain distance downwardly. This extension pattern repeats three times, and then the groove extends a certain distance horizontally toward the second side portion. Then, the groove extends downwardly to the oxidizing gas discharge manifold hole 34. The horizontally extending portion of the oxidizing gas channel 9 forms the reciprocating portion 9a, and the downwardly extending portion of the oxidizing gas channel 9 forms the inverted portion 9b. As shown in FIGS. 2 and 3, a portion between the grooves of the oxidizing gas channel 9 forms a rib portion 14 which is in contact with the cathode 4b.

As shown in FIG. 3, the inner surface of the cathode separator 6b has a first region 21 and a second region 22. The first region 21 and the second region 22 of the cathode separator 6b are similar in structure to the first region 21 and the second region 22 of the anode separator 6a and will be described in detail later. Likewise, the inner surface of the cathode separator 6b has a portion 41 and a portion 42. The portion 41 and the portion 42 of the cathode separator 6b are similar in structure to the portion 41 and the portion 42 of the anode separator 6a, and will be described in detail later.

As shown in FIG. 4, a groove-shaped cooling medium channel 10 is formed in serpentine shape on the outer surface of the cathode separator 6b to connect the cooling medium supply manifold hole 35 to the cooling medium discharge manifold hole 36. The cooling medium channel 10 is similar in structure to the oxidizing gas channel 9 and therefore, will not be described later.

Figure 5:
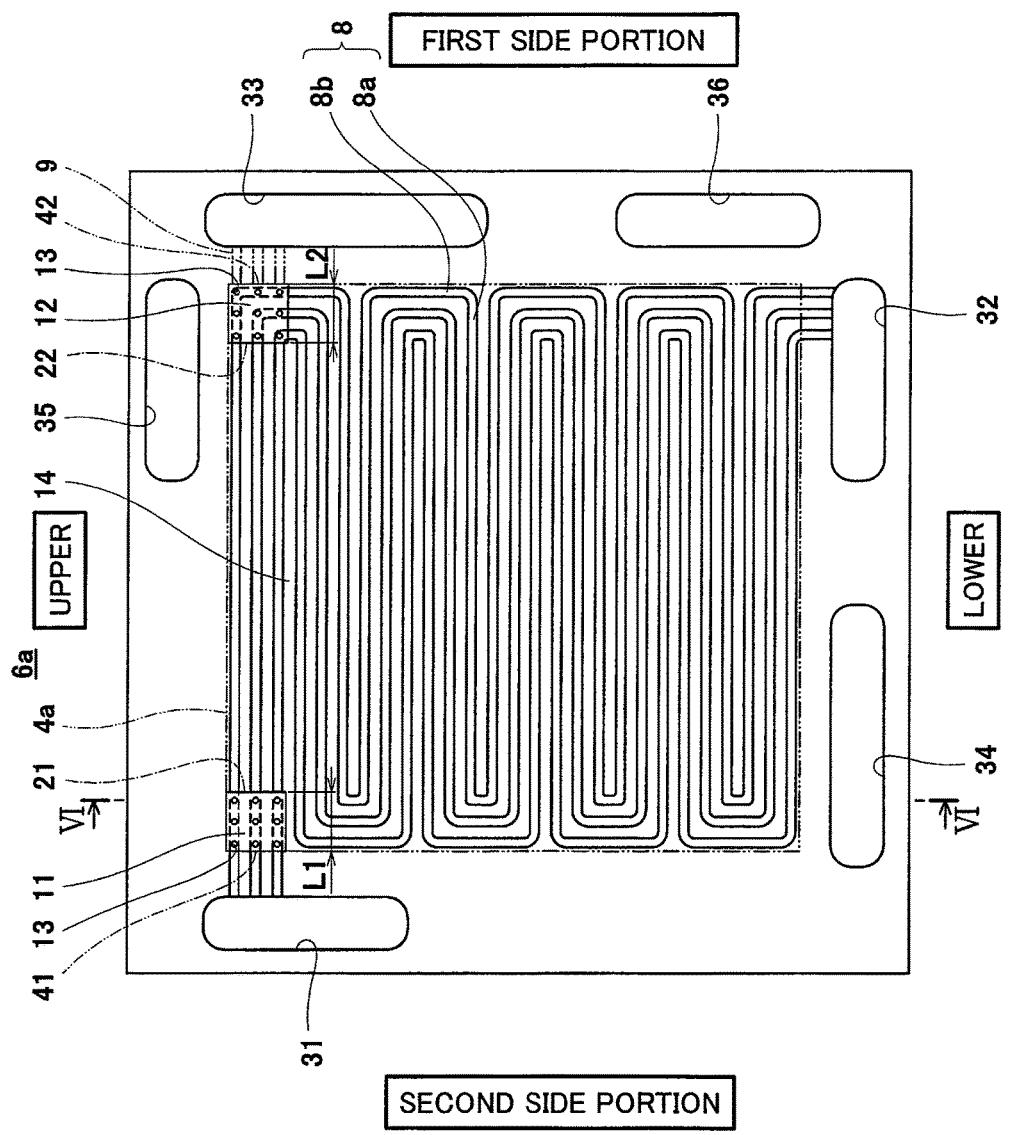
FIG. 5 is a schematic view showing an exemplary configuration of the inner surface of an anode separator of the fuel cell of FIG. 2.
Figure 6:
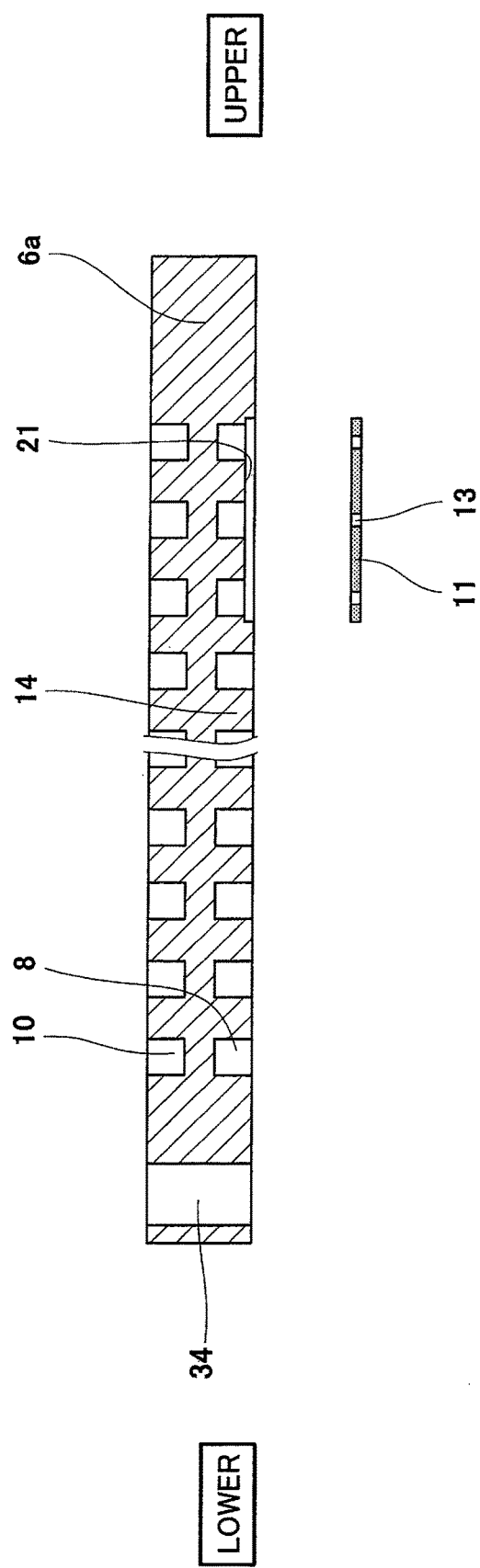
FIG. 6 is a cross-sectional view taken along line VI-VI of FIG. 5.

Next, the configuration of the anode separator 6a will be described with reference to FIGS. 2, 5 and 6. FIG. 5 is a schematic view showing an exemplary configuration of the inner surface of the anode separator 6a of the fuel cell 100 of FIG. 2. FIG. 6 is a cross-sectional view taken along line VI-VI of FIG. 5. In FIGS. 5 and 6, the upper and lower sides of the anode separator 6a are expressed as upper and lower sides in these Figures. In FIG. 5, a part of the oxidizing gas channel is indicated by imaginary lines. In FIG. 6, a part of the configuration is omitted.

As shown in FIG. 5, the anode separator 6a has a plate shape which is the form of substantially quadrilateral (rectangle), and manifold holes such as the fuel gas supply manifold hole 31, are provided to penetrate the peripheral portion thereof in the thickness direction of the anode separator 6a. The groove-shaped cooling medium channel 10 is formed in a serpentine shape to connect the cooling medium supply manifold hole 35 to the cooling medium discharge manifold hole 36. The positions of the manifold holes are the same as those of the cathode separator 6b, and therefore detail description thereof is omitted. Also, the cooling medium channel 10 is similar in structure to the oxidizing gas channel 9, and therefore detail description thereof is omitted.

A groove-shaped fuel gas channel 8 is formed in a serpentine shape on the inner surface of the anode separator 6a to connect the fuel gas supply manifold hole 31 to the fuel gas discharge manifold hole 32.

The fuel gas channel 8 is composed of three grooves each of which is substantially constructed of a reciprocating portion 8a and an inverted portion 8b. To be more specific, the groove of the fuel gas channel 8 extends a certain distance horizontally from the fuel gas supply manifold hole 31 toward the first side portion and then a certain distance downwardly. Then, the groove extends a certain distance horizontally toward the second side portion and then a certain distance downwardly. This extension pattern repeats three times, and then the groove extends a certain distance horizontally toward the first side portion. Then, the groove extends downwardly to the fuel gas discharge manifold hole 32. The horizontally extending portion of the fuel gas channel 8 forms the reciprocating portion 8a, and the downwardly extending portion of the fuel gas channel 8 forms the inverted portion 8b. A portion between the grooves of the fuel gas channel 8 forms a rib portion 14 which is in contact with the anode 4a.

The fuel gas channel 8 and the oxidizing gas channel 9 are arranged to form a parallel flow pattern. The parallel flow pattern will be described hereinafter with reference to FIG. 7.

Figure 7:
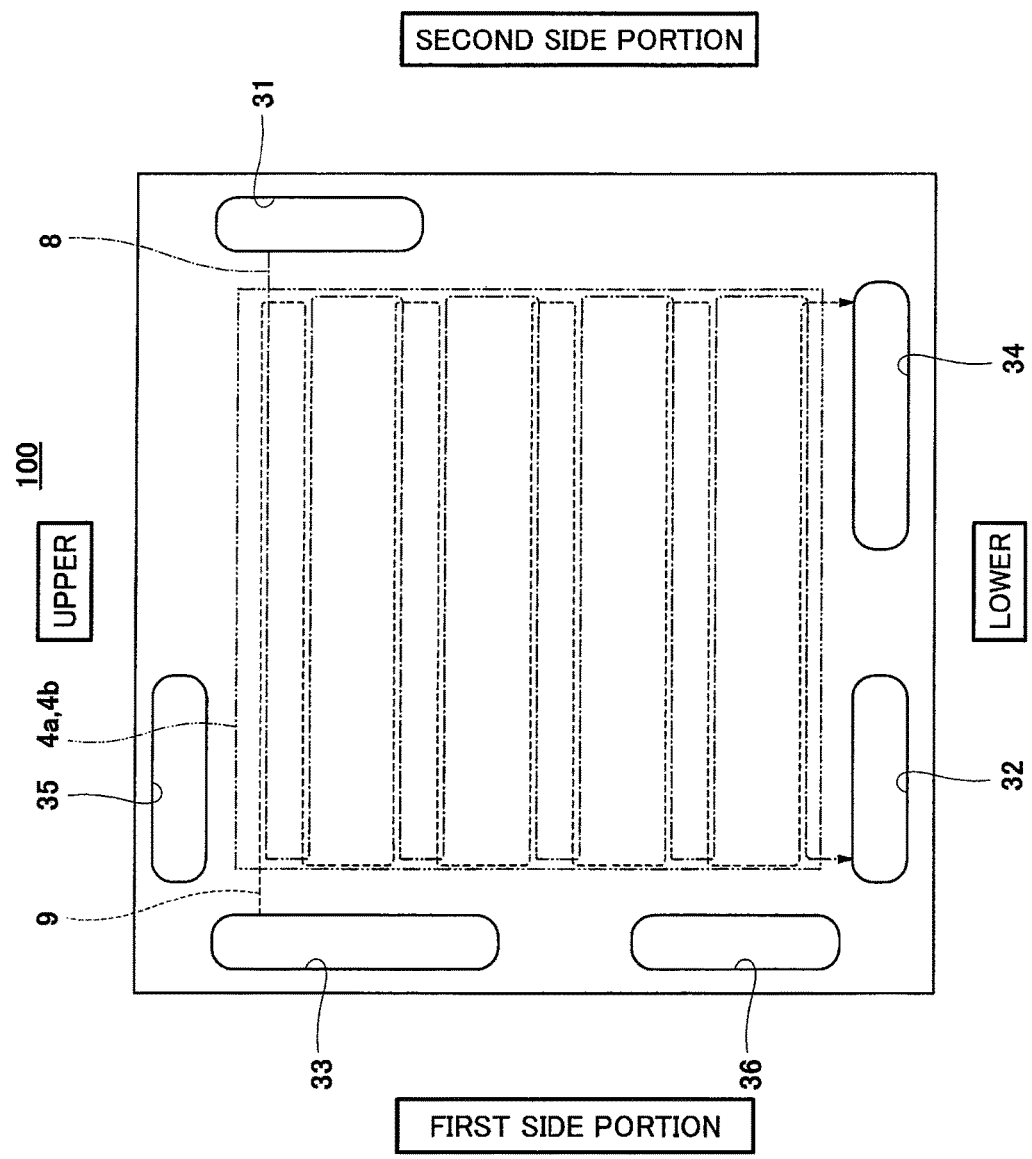
FIG. 7 is a schematic view showing an exemplary structure of an anode separator and an exemplary structure of a cathode separator of the fuel cell of FIG. 2.

FIG. 7 is a schematic view showing an exemplary structure of the anode separator 6a and an exemplary structure of the cathode separator 6b of the fuel cell 100 of FIG. 2. In FIG. 7, the anode separator 6a and the cathode separator 6b are perspectively drawn when viewed in a thickness direction of the fuel cell 100. The grooves of the fuel gas channel 8 of the anode separator 6a are drawn as a single line and the grooves of the oxidizing gas channel 9 of the cathode separator 6b are drawn as a single line. The upper and lower sides of the separators 6a and 6b are drawn as the upper and lower sides of FIG. 7. Furthermore, in FIG. 7, the fuel gas channel 8 and the oxidizing gas channel 9 are drawn to run at different positions in the vertical direction, to easily distinguish between them.

As shown in FIG. 7, the fuel gas and the oxidizing gas flow in opposite directions in portions of the fuel gas channel 8 and the oxidizing gas channel 9 but flow in substantially the same direction from upstream side to downstream side macroscopically (as a whole) when viewed in the thickness direction of the fuel cell 100. This flow pattern is called a parallel flow pattern.

As shown in FIGS. 5 and 6, the inner surface of the anode separator 6a has the first region 21 and the second region 22.

The first region 21 is a region located between the portion 41 which contacts the anode 4a first from the upstream end of the fuel gas channel 8 when viewed in the thickness direction of the anode separator 6a and the portion 42 which contacts the cathode 4b first from the upstream end of the oxidizing gas channel 9 (indicated by an imaginary line (two-dotted line in FIG. 5), when viewed in the thickness direction of the anode separator 6a. The first region 21 is a region extending a predetermined distance L1 from the portion 41 of the fuel gas channel 8 along the fuel gas channel 8. When viewed in the thickness direction of the anode separator 6a, the horizontal one end portion (second side end portion) of the first region 21 is the portion 41 which contacts the anode 4a first from the upstream end of the fuel gas channel 8. When viewed in the thickness direction of the anode separator 6a, the horizontal other end portion (first side end portion) of the first region 21 is the portion extending the predetermined distance L1 from the portion 41 of the fuel gas channel 8 along the fuel gas channel 8. When viewed in the thickness direction of the anode separator 6a, the upper end portion of the first region 21 is the upper end portion of the anode 4a, and the lower end portion of the first region 21 is the rib portion 14 formed by the lowermost groove of the fuel gas channel 8 composed of the three grooves running along each other (arranged in parallel).

Although in Embodiment 1, the horizontal other end portion of the first region 21 is the portion extending the predetermined distance L1 from the portion 41 of the fuel gas channel 8 along the fuel gas channel 8, it may be a region where the fuel gas channel 8 aligning with the oxidizing gas channel 9 first misaligns with the oxidizing gas channel 9, or otherwise the portion 42.

Since the end portion of the anode 4a and the end portion of the cathode 4b align with each other when viewed in the thickness direction of the polymer electrolyte membrane 1 (when viewed in the thickness direction of the anode separator 6a) in Embodiment 1 as described above, the upper end portion of the first region 21 is the upper end portion of the anode 4a. If the end portion of the anode 4a and the end portion of the cathode 4b do not align with each other when viewed in the thickness direction of the polymer electrolyte membrane 1, it is desired that the upper end portion of the first region 21 be the end portion of the electrode located higher, to suppress the polymer electrolyte membrane 1 from getting dried.

Since the grooves of the fuel gas channel 8 are equal in number to the grooves of the oxidizing gas channel 9, and the grooves of the fuel gas channel 8 and the grooves of the oxidizing gas channel 9 are arranged at the same positions when viewed in the thickness direction of the anode separator 6a in Embodiment 1, the lower end portion of the first region 21 is the rib portion 14 formed by the lowermost groove of the fuel gas channel 8. If the grooves of the fuel gas channel 8 are different in number and/or position from the grooves of the oxidizing gas channel 9, the rib portion 14 formed by either the fuel gas channel 8 or the oxidizing gas channel 9 which is located lower is desirably the lower end portion of the first region 21.

The second region 22 is a region located between the portion 42 which contacts the cathode 4b first from the upstream end of the oxidizing gas channel 9 when viewed in the thickness direction of the anode separator 6a and the portion 41 which contacts the anode 4a first from the upstream end of the fuel gas channel 8 when viewed in the thickness direction of the anode separator 6a. The second region 22 is a region extending a predetermined distance L2 from the portion 42 of the oxidizing gas channel 9 along the oxidizing gas channel 9. To be specific, when viewed in the thickness direction of the anode separator 6a, horizontal one end portion (first side end portion) of the second region 22 is the portion 42 which contacts the anode 4a first from the upstream end of the oxidizing gas channel 9, and the horizontal other end portion (second side end portion) of the second region 22 is a portion extending the predetermined distance L2 from the portion 42 of the oxidizing gas channel 9 along the oxidizing gas channel 9. When viewed in the thickness direction of the anode separator 6a, the upper end portion of the second region 22 is the upper end portion of the anode 4a. When viewed in the thickness direction of the anode separator 6a, the lower end portion of the second region 22 is the rib portion 14 formed by the lowermost groove of the fuel gas channel 8 composed of the three grooves running along each other (arranged in parallel).

Although in Embodiment 1, the horizontal other end portion of the second region 22 is the portion extending the predetermined distance L2 from the portion 42 of the oxidizing gas channel 9 along the oxidizing gas channel 9, it may be a region where the oxidizing gas channel 9 aligning with the fuel gas channel 8 first misaligns with the fuel gas channel 8, or otherwise the portion 41.

Since the end portion of the anode 4a and the end portion of the cathode 4b align with each other when viewed in the thickness direction of the polymer electrolyte membrane 1 (when viewed in the thickness direction of the anode separator 6a) in Embodiment 1 as described above, the upper end portion of the second region 22 is the upper end portion of the anode 4a. If the end portion of the anode 4a and the end portion of the cathode 4b misalign with each other when viewed in the thickness direction of the polymer electrolyte membrane 1, it is desired that the upper end portion of the second region 22 be the end portion of the electrode which is located higher, to suppress the polymer electrode membrane 1 from getting dried.

Since the grooves of the fuel gas channel 8 are equal in number to the grooves of the oxidizing gas channel 9, and the grooves of the fuel gas channel 8 and the grooves of the oxidizing gas channel 9 are arranged at the same position when viewed in the thickness direction of the anode separator 6a in Embodiment 1, the lower end portion of the second region 22 is the rib portion 14 formed by the lowermost groove of the fuel gas channel 8 (oxidizing gas channel 9). If the grooves of the fuel gas channel 8 are different in number and/or position from the grooves of the oxidizing gas channels 9, the rib portion 14 formed by either the fuel gas channel 8 or the oxidizing gas channel 9 which is located lower is desirably the lower end portion of the second region 22.

Although the first region 21 and the second region 22 do not have an overlapping region when viewed in the thickness direction of the anode separator 6a, they may have an overlapping region.

As shown in FIG. 6, the first region 21 and the second region 22 of the anode separator 6a are recessed to a certain depth in the inner surface of the peripheral portion of the anode separator 6. A cover member 11 and a cover member 12 are provided at the first region 21 and the second region 22 to cover the first region 21 and the second region 22 (to cover the opening of the groove-shaped fuel gas channel 8), respectively. Each of the cover member 11 and the cover member 12 has a plate shape. The cover member 11 has a thickness equal to the depth of the first region 21. The cover member 12 has a thickness equal to the depth of the second region 22. In other words, the cover member 11 and the cover member 12 are fitted to the first region 21 and the second region 22, respectively.

In this structure, portions of the fuel gas channel 8 which are formed in the first region 21 and the second region 22, respectively, have a culvert (tunnel) shape. Thus, in Embodiment 1, the cover member 11 and the cover member 12 cover the opening of the fuel gas channel 8 to form gas permeation suppressing sections.

Each of the cover member 11 and the cover member 12 is provided with plural though-holes 13 on a main surface thereof. The through-holes 13 are arranged along the fuel gas channel 8. This makes it possible to suppress a steam diffusing from the portions of MEA 5 (to be precise, anode 4a) which face the first region 21 and the second region 22 of the anode separator 6a, to the fuel gas channel 8, when viewed in the thickness direction of the anode separator 6a. Thus, it is possible to suppress the MEA 5 (in particular, polymer electrolyte membrane 1) from getting dried.

The size of the through-holes 13 is desirably set smaller than the width (length of the fuel gas channel 8 in a direction which is perpendicular to the direction in which the fuel gas flows through the fuel gas channel 8) of the fuel gas channel 8, to allow the fuel gas to be supplied from the fuel gas channel 8 to the MEA 5 while suppressing the steam from moving from the MEA 5, to the fuel gas channel 8. The number of through-holes 13 is suitably set based on the size of the cover member 11 and the cover member 12, the width of the groove of the fuel gas channel 8, the flow rate of the fuel gas flowing through the fuel gas channel 8, etc. Although in Embodiment 1, the shape of the opening of the through-holes 13 is a circle, it may be elongate circle, a rectangle, etc.

The cover member 11 and the cover member 12 are desirably configured to be low in gas-permeability. The cover members 11 and 12 are formed of, for example a metal plate made of metal such as titanium or stainless, a resin film made of resin such as Teflon (registered trademark) or silicon, a thin film made of carbon powders or a mixture of carbon powders and resin, etc.

The cover members 11 and 12 are more desirably made of an electrically-conductive material to enable power generation in regions of the cover members 11 and 12 which are other than the through-holes 13. As the electrically-conductive material used for the cover members 11 and 12, for example, there is a metal. The cover members 11 and 12 are desirably formed of a material having a lower porosity degree than the electrically-conductive base material which is used for the anode gas diffusion layer 3a or the cathode gas diffusion layer 3b and has a porous structure, and are more desirably formed of a material having porosity of zero degree, to suppress the steam from moving to the oxidizing gas channel 9 through the portions of the cover member 11 and the cover member 12 other than the through-holes 13. As the material having porosity of zero degree, for example, there is a metal.

Next, the advantages of the fuel cell stack 61 (fuel cell 100) according to Embodiment 1 will be described with reference to FIGS. 1 to 7.

[Advantage of Fuel Cell Stack (Fuel Cell)]

As explained above, the water content in the portion of the anode 4a which faces the fuel gas channel 8 is lower than the water content in the portion of the anode 4a which is in contact with the rib portion 14. In particular, when the fuel cell stack 61 is operated under high-temperature and low-humidity conditions, water generated through the reaction of the reactant gases is insufficient in the portions of the anode 4a which face the first region 21 and the second region 22 (especially, portion 41 and portion 42) of the anode separator 6a, and therefore water content in these portions is low. For this reason, the portions of the polymer electrolyte membrane 1 which face the first region 21 and the second region 22 (especially, portion 41 and portion 42) of the anode separator 6a tend to dry, which increases a chance that proton conductivity in these portions of the polymer electrolyte membrane 1 decreases and deterioration of these portions occur.

To avoid this, in the fuel cell stack 61 (fuel cell 100) of Embodiment 1, since the cover member 11 and the cover member 12 are provided at the first region 21 and the second region 22 of the anode separator 6a to cover the first region 21 and the second region 22, respectively, it is possible to suppress the steam from diffusing from the portions of the MEA 5 (to be precise, anode 4a) which face the first region 21 and the second region 22 of the anode separator 6a, to the fuel gas channel 8. Thus, it is possible to suppress the MEA 5, especially the polymer electrolyte membrane 1 from getting dried.

In the fuel cell stack 61 (fuel cell 100) of Embodiment 1, the plural through-holes 13 are provided in each of the main surfaces of the cover member 11 and the cover member 12 such that they are arranged along the fuel gas channel 8. This makes it possible to supply the fuel gas from the fuel gas channel 8 to the MEA 5 while suppressing the steam from diffusing from the MEA 5 (to be precise, anode 4a) to the fuel gas channel 8.

In the fuel cell stack 61 (fuel cell 100) according to Embodiment 1, since the cover member 11 and the cover member 12 are formed of the material with porosity of zero degree, it is possible to suppress the steam from moving to the fuel gas channel 8 through the portions of the cover 11 and the cover 12 other than the through-holes 13. Thus, it is possible to more effectively suppress the MEA 5 (especially, polymer electrolyte membrane 1) from getting dried.

In the fuel cell stack 61 (fuel cell 100) according to Embodiment 1, since the cover member 11 and the cover member 12 are formed of the electrically-conductive material, power generation is enabled in the regions of the cover member 11 and the cover member 12 which are other than the through-holes 13, thereby enabling the fuel cell stack 61 (fuel cell 100) to maintain a power generation ability. With the water generated through the power generation, it is possible to more effectively suppress the MEA 5 (especially, polymer electrolyte membrane 1) from getting dried.

In Embodiment 1, the cover member 11 and the cover member 12 are provided with the through-holes 13 to allow the reactant gas (fuel gas) to be supplied to the MEA 5 while suppressing diffusion of the steam. Alternatively, the degree of porosity of the cover member 11 and the cover member 12 may be adjusted (e.g., the cover member 11 and the cover member 12 may be formed of ceramic and the degree of porosity of the ceramic may be adjusted when calcined) to allow the reactant gas to be supplied to the MEA 5 while suppressing diffusion of the steam.

Next, modifications of the fuel cell stack 61 (fuel cell 100) of Embodiment 1 will be described.

[Modification 1]

Figure 23:
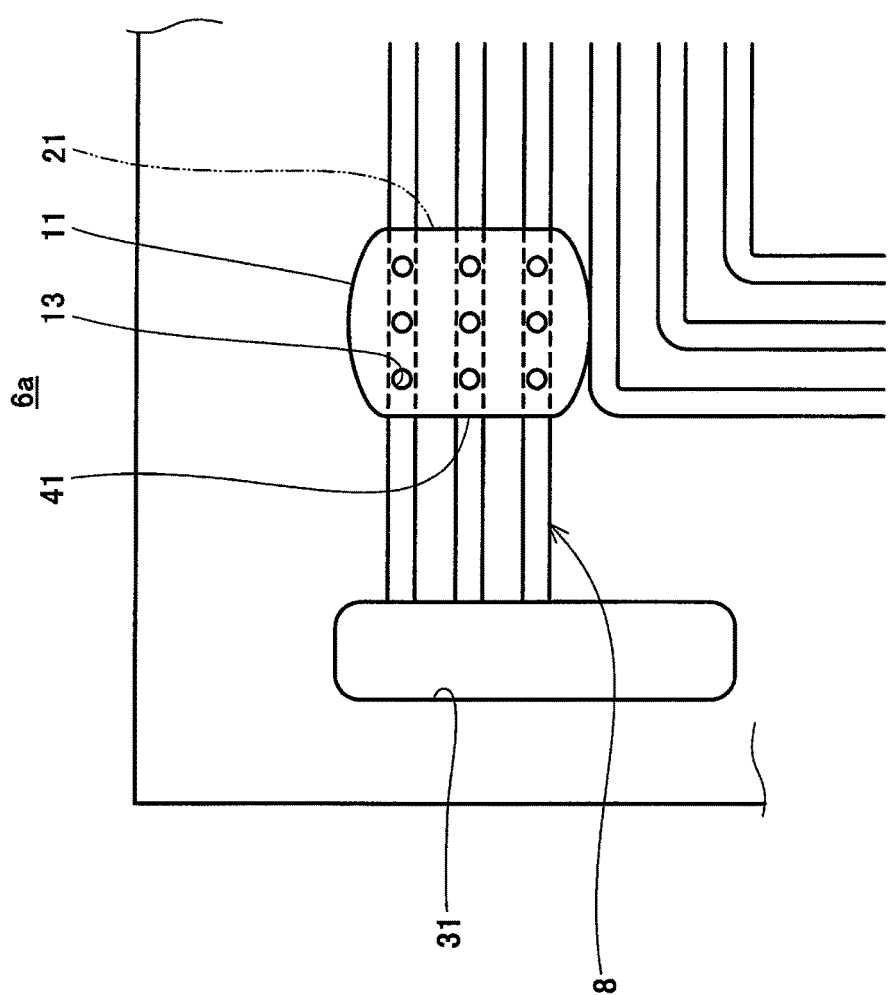
FIG. 23 is a schematic view showing an exemplary configuration of the inner surface of an anode separator of a fuel cell stack according to modification 1 of the present disclosure.

FIG. 23 is a schematic view showing an exemplary configuration of the inner surface of an anode separator of a fuel cell stack according to modification 1 of the present disclosure. In FIG. 23, a part of the configuration is omitted.

Referring to FIG. 23, the anode separator 6a of the fuel cell stack 61 of modification 1 of the present disclosure has a configuration which is basically identical to that of the anode separator 6a of the fuel cell stack 61 of Embodiment 1 but is different from the same in that the cover member 11 has an elongate-circle shape when viewed in the thickness direction of the anode separator 6a.

The fuel cell stack 61 (fuel cell 100) according to modification 1 configured as described above achieves substantially the same advantage as that of the fuel cell stack 61 (fuel cell 100) of Embodiment 1. Although the cover member 11 is formed to have the elongate-circle shape in modification 1, the cover member 12 may alternatively be formed to have an elongate-circle shape. Or, at least one of the cover member 11 and the cover member 12 may be formed to have a polygon shape or a circular shape when viewed in the thickness direction of the anode separator 6a. In other words, the cover member 11 and the cover member 12 may have a desired shape when viewed in the thickness direction of the anode separator 6a.

[Modification 2]

Figure 24:
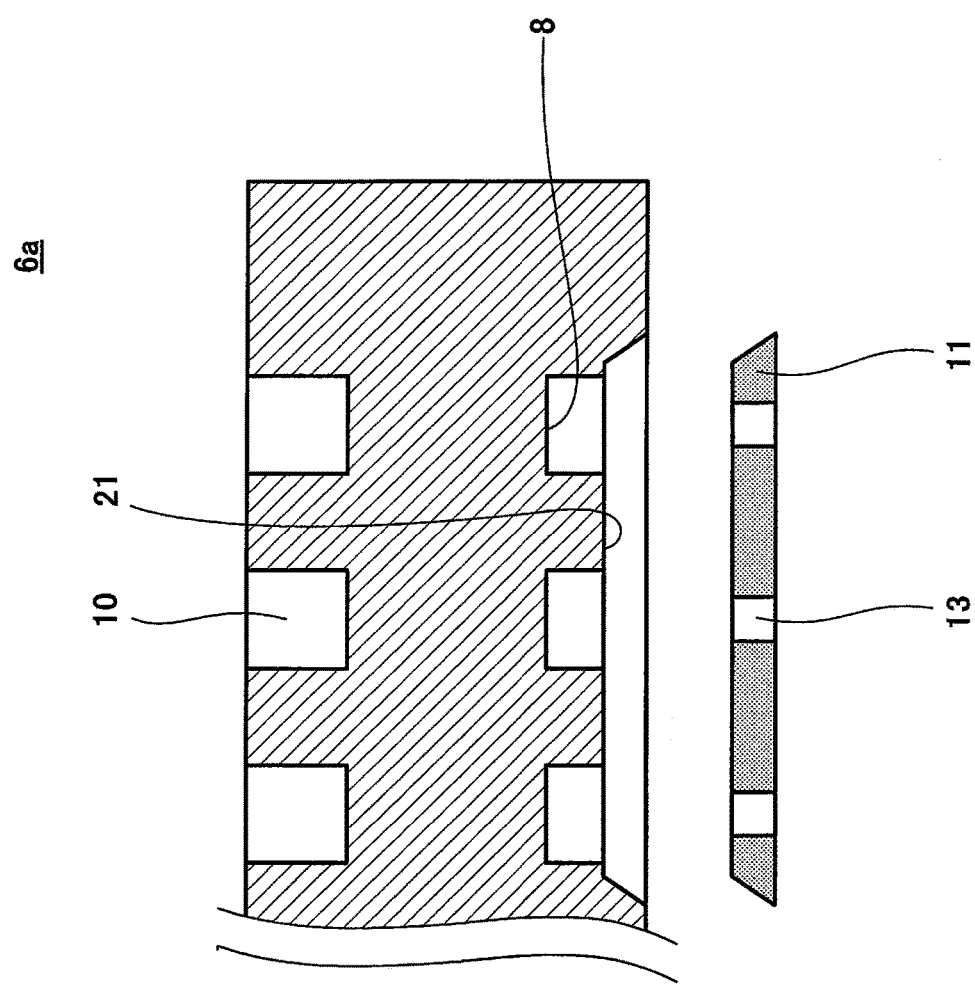
FIG. 24 is a cross-sectional view showing an exemplary configuration of the inner surface of an anode separator of a fuel cell stack according to modification 2 of the present disclosure.

FIG. 24 is a schematic view showing an exemplary configuration of an anode separator of a fuel cell stack according to modification 2 of the present disclosure. In FIG. 24, a part of the configuration is omitted.

Referring to FIG. 24, the anode separator 6a of the fuel cell stack 61 of modification 2 of the present disclosure has a configuration which is basically identical to that of the anode separator 6a of the fuel cell stack 61 of Embodiment 1 but is different from the same in that the cover member 11 and the first region 21 are formed to have a trapezoidal cross-section.

The fuel cell stack 61 (fuel cell 100) according to modification 2 configured as described above achieves substantially the same advantage as that of the fuel cell stack 61 (fuel cell 100) of Embodiment 1. Although the cover member 11 and the first region 21 are formed to have a trapezoidal cross-section in modification 2, the cover member 12 and the second region 22 may alternatively be formed to have a trapezoidal cross-section, or at least either the cover member 11 and the first region 21 or the cover member 12 and the second region 22 may be formed to have a polygon shape, a circular shape, or an elongate-circle shape. In other words, the cover member 11 and the first region 21, and the cover 12 and the second region 22 may have desired cross-sectional shapes.

Embodiment 2

Figure 8:
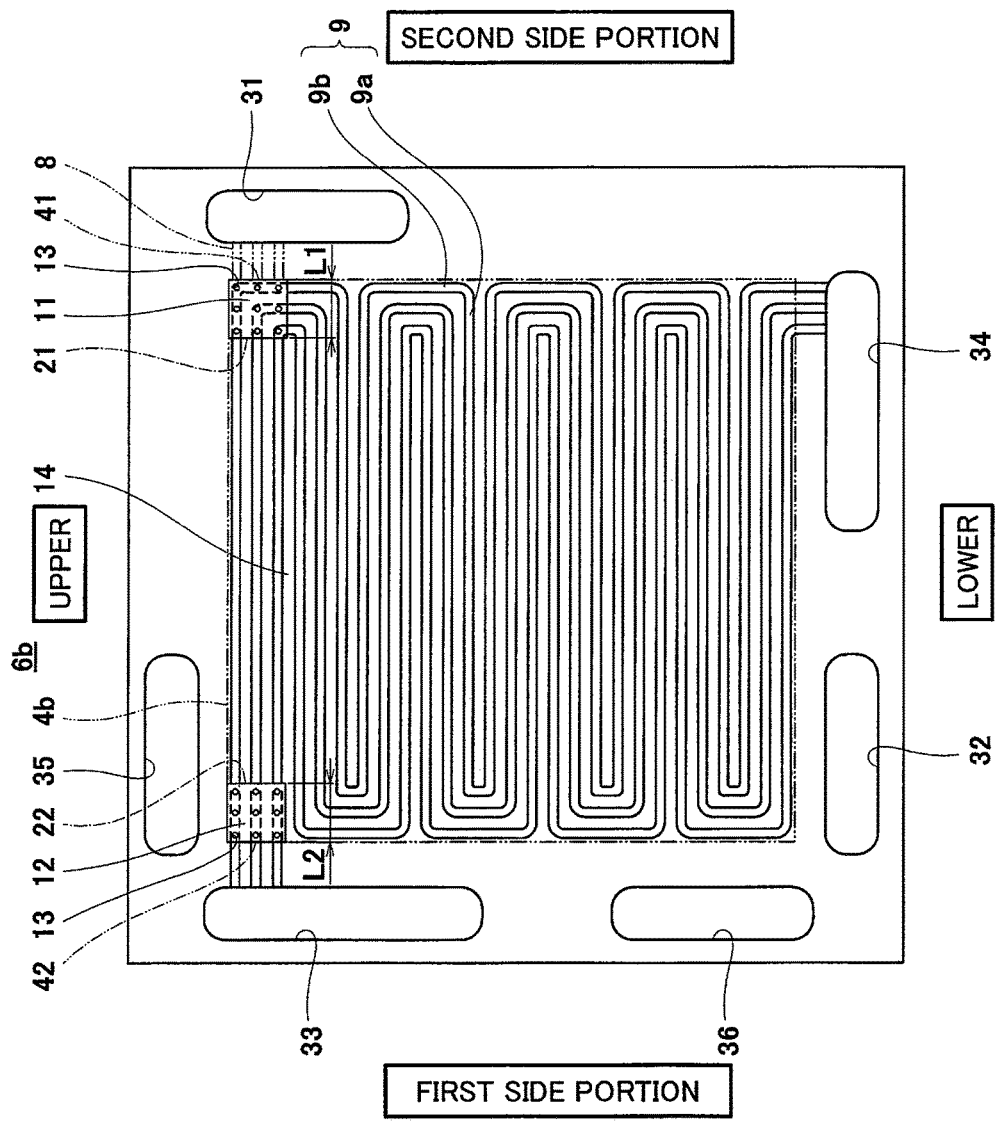
FIG. 8 is a schematic view showing an exemplary configuration of the inner surface of a cathode separator of a fuel cell stack according to Embodiment 2 of the present disclosure.
Figure 9:
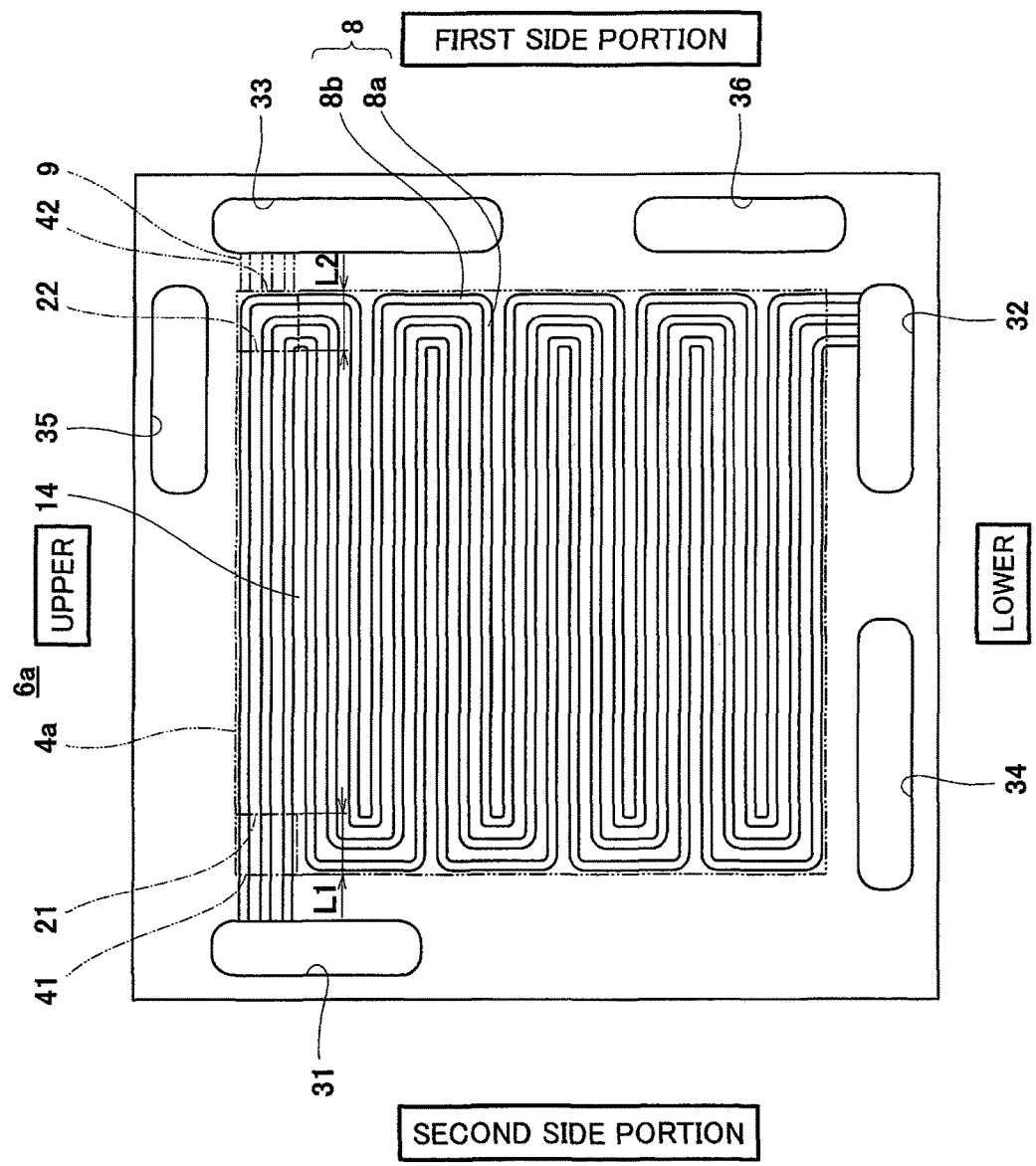
FIG. 9 is a schematic view showing an exemplary configuration of the inner surface of an anode separator of the fuel cell stack according to Embodiment 2 of the present disclosure.

FIG. 8 is a schematic view showing an exemplary configuration of the inner surface of a cathode separator of a fuel cell stack according to Embodiment 2 of the present disclosure. FIG. 9 is a schematic view showing an exemplary configuration of the inner surface of an anode separator of the fuel cell stack according to Embodiment 2 of the present disclosure. In FIG. 8, the upper and lower sides of the cathode separator are expressed as the upper and lower sides in FIG. 8 and a part of the fuel gas channel is indicated by imaginary lines. In FIG. 9, the upper and lower sides of the anode separator are expressed as the upper and lower sides in FIG. 9 and a part of the oxidizing gas channel is indicated by imaginary lines.

Referring to FIGS. 8 and 9, the fuel cell stack 61 (fuel cell 100) according to Embodiment 2 of the present disclosure has a configuration which is basically identical to that of the fuel cell stack 61 (fuel cell 100) of Embodiment 1 but is different from the same in that the cover member 11 and the cathode member 12 are provided at the cathode separator 6b in place of the anode separator 6a.

To be specific, as shown in FIG. 8, the first region 21 and the second region 22 of the cathode separator 6b are recessed to a certain depth in the inner surface of the peripheral portion of the cathode separator 6b, and the cover member 11 and the cover member 12 are provided at the first region 21 and the second region 22 to cover the first region 21 and the second region 22, respectively.

Each of the cover member 11 and the cover member 12 is provided with plural though-holes 13 on a main surface thereof. The through-holes 13 are arranged along the oxidizing gas channel 9. This makes it possible to suppress a steam from diffusing from the portions of MEA 5 (to be precise, cathode 4b) which face the first region 21 and the second region 22 of the cathode separator 6b to the oxidizing gas channel 9, when viewed in the thickness direction of the cathode separator 6b. Thus, it is possible to more effectively suppress the MEA 5 (especially, polymer electrolyte membrane 1) from getting dried.

The size of the through-holes 13 is desirably set smaller than the width (length of the oxidizing gas channel 9 in a direction which is perpendicular to the direction in which the oxidizing gas flows through the oxidizing gas channel 9) of the oxidizing gas channel 9, to allow the oxidizing gas to be supplied from the oxidizing gas channel 9 to the MEA 5 while suppressing the steam from moving from the MEA 5 to the oxidizing gas channel 9. The number of through-holes 13 is suitably set based on the size of the cover member 11 and the cover member 12, the width of the groove of the oxidizing gas channel 9, the flow rate of the oxidizing gas flowing through the oxidizing gas channel 9, etc.

Although in Embodiment 2, the shape of the opening of the through-holes 13 is a circle, it may be elongate-circle, a rectangle, etc.

The cover members 11 and 12 are desirably configured to be low in gas-permeability. The cover members 11 and 12 are formed of, for example, a metal plate made of metal such as titanium or stainless, a resin film made of resin such as Teflon (registered trademark) or silicon, a thin film made of carbon powders, a mixture of carbon powders and resin, etc.

The cover members 11 and 12 are more desirably made of an electrically-conductive material to enable power generation in regions of the cover member 11 and the cover member 12 which are other than the through-holes 13. As the electrically-conductive material, for example, there is a metal. The cover members 11 and 12 are desirably formed of a material having porosity of zero degree, to suppress the steam from moving to the oxidizing gas channel 9, through the portions of the cover member 11 and the cover member 12 other than the through-holes 13. As the material having porosity of zero degree, for example, there is a metal.

In the fuel cell stack 61 (fuel cell 100) of Embodiment 2 configured as described above, it is possible to suppress the steam from diffusing from the portions of the MEA 5 (to be precise, cathode 4b) which face the first region 21 and the second region 22 of the cathode separator 6b, to the oxidizing gas channel 9. Thus, it is possible to suppress the MEA 5 (especially, polymer electrolyte membrane 1) from getting dried.

In the fuel cell stack 61 (fuel cell 100) of Embodiment 2, the plural through-holes 13 are provided in each of the main surfaces of the cover member 11 and the cover member 12 such that they are arranged along the oxidizing gas channel 9. This makes it possible to supply the oxidizing gas from the oxidizing gas channel 9 to the MEA 5 while suppressing the steam from moving from the MEA 5 (to be precise, cathode 4b) to the oxidizing gas channel 9.

In the fuel cell stack 61 (fuel cell 100) according to Embodiment 2, since the cover member 11 and the cover member 12 are formed of the material with porosity of zero degree, it is possible to suppress a steam from moving to the oxidizing gas channel 9, through the portions of the cover member 11 and the cover member 12 other than the through-holes 13. Thus, it is possible to more effectively suppress the MEA 5 (especially, polymer electrolyte membrane 1) from getting dried.

Since the cover member 11 and the cover member 12 are formed of the electrically-conductive material in the fuel cell stack 61 (fuel cell 100) according to Embodiment 2, power generation is enabled in the regions of the cover member 11 and the cover member 12 which are other than the through-holes 13, thereby enabling the fuel cell stack 61 (fuel cell 100) to maintain a power generation ability. With the water generated through the power generation, it is possible to more effectively suppress the MEA 5 (especially, polymer electrolyte membrane 1) from getting dried.

In Embodiment 2, the cover member 11 and the cover member 12 are provided with the through holes 13 to allow the reactant gas (oxidizing gas) to be supplied to the MEA 5 while suppressing diffusion of the steam. Alternatively, the degree of porosity of the cover member 11 and the cover member 12 may be adjusted (e.g., the cover member 11 and the cover member 12 may be formed of ceramic and the degree of porosity of the ceramic may be adjusted when calcined) to allow the reactant gas (oxidizing gas) to be supplied to the MEA 5 while suppressing diffusion of the steam.

Embodiment 3

Figure 10:
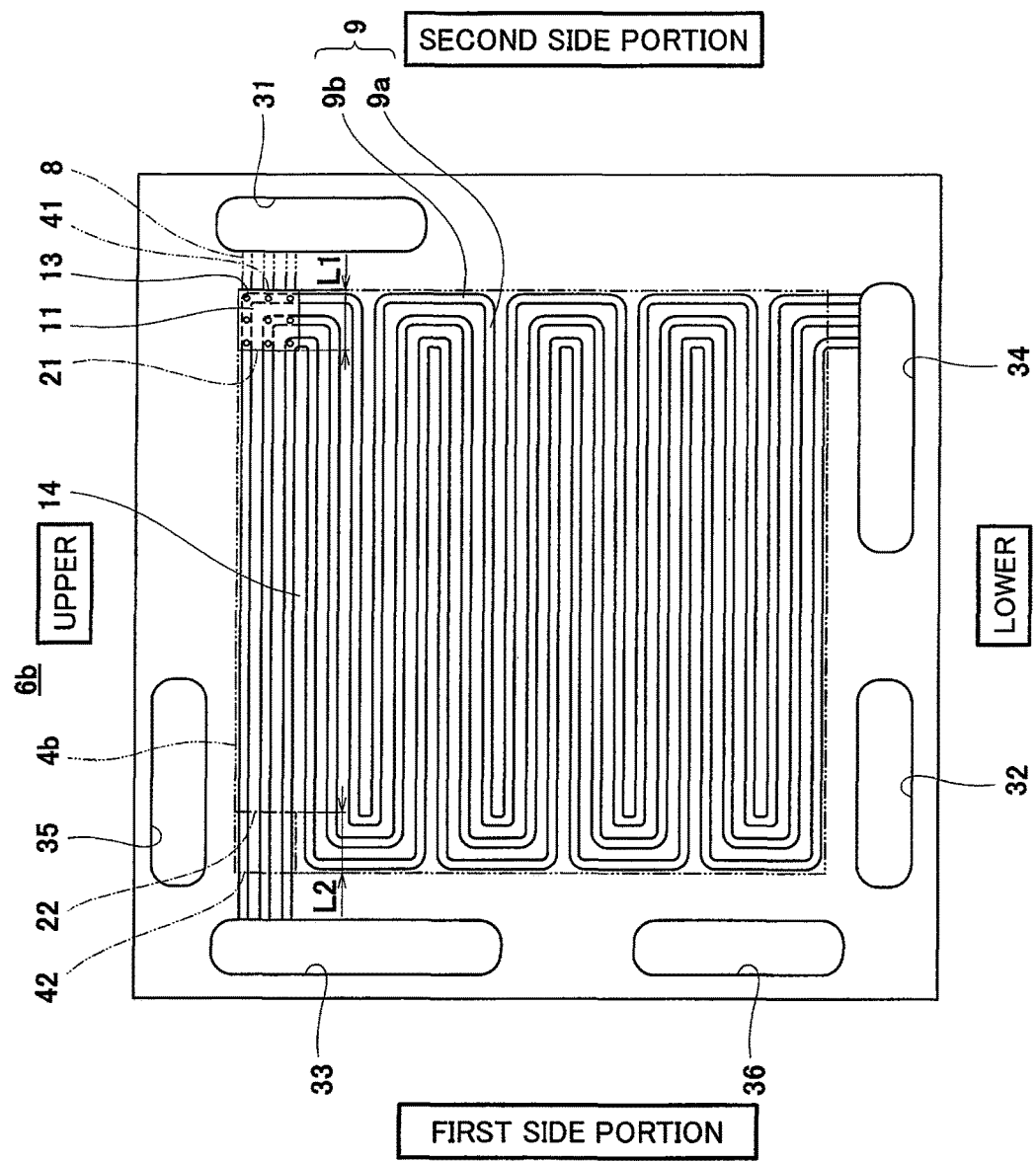
FIG. 10 is a schematic view showing an exemplary configuration of a cathode separator of a fuel cell stack (fuel cell) according to Embodiment 3 of the present disclosure.
Figure 11:
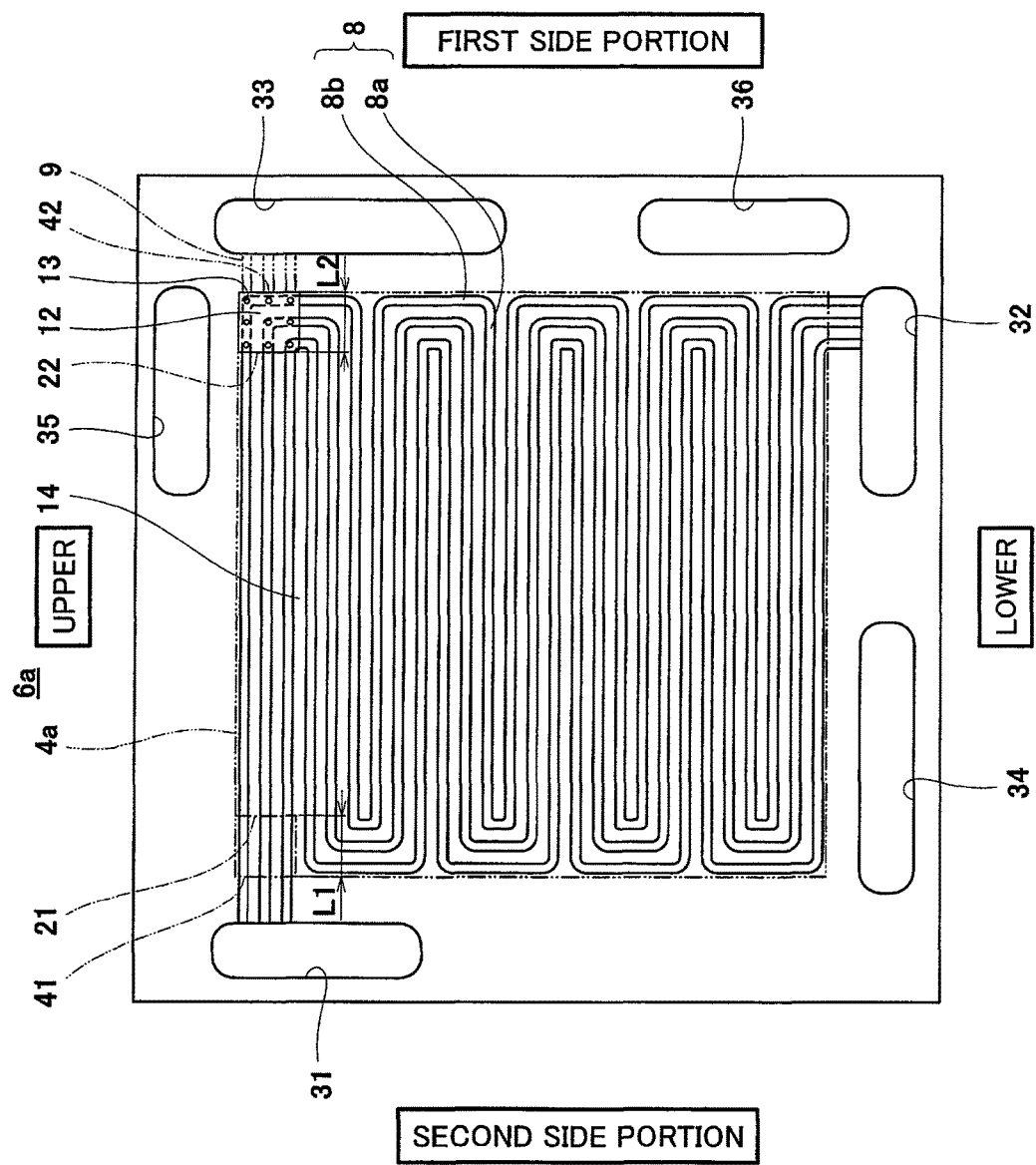
FIG. 11 is a schematic view showing an exemplary configuration of an anode separator of the fuel cell stack (fuel cell) according to Embodiment 3 of the present disclosure.

FIG. 10 is a schematic view showing an exemplary configuration of a cathode separator of a fuel cell stack (fuel cell) according to Embodiment 3 of the present disclosure. FIG. 11 is a schematic view showing an exemplary configuration of an anode separator of the fuel cell stack (fuel cell) according to Embodiment 3 of the present disclosure. In FIG. 10, the upper and lower sides of the cathode separator are expressed as the upper and lower sides in FIG. 10 and a part of the fuel gas channel is indicated by imaginary lines. In FIG. 11, the upper and lower sides of the anode separator are expressed as the upper and lower sides in FIG. 11 and a part of the oxidizing gas channel is indicated by imaginary lines.

Referring to FIGS. 10 and 11, the fuel cell stack 61 (fuel cell 100) according to Embodiment 3 of the present disclosure has a configuration which is basically identical to those of the fuel cell stacks 61 (fuel cells 100) of Embodiment 1 an Embodiment 2 but is different from the same in that the cover member 11 is provided at the cathode separator 6b and the cover member 12 is provided at the anode separator 6a.

To be specific, as shown in FIG. 10, the first region 21 of the cathode separator 6b is recessed to a certain depth in the inner surface of the peripheral portion of the cathode separator 6b, and the cover member 11 is provided at the first region 21 to cover the first region 21. As shown in FIG. 11, the second region 22 of the anode separator 6a is recessed to a certain depth in the inner surface of the peripheral portion of the anode separator 6a, and the cover member 12 is provided at the second region 22 to cover the second region 22.

Since the materials and the like of the cover members 11 and 12 are similar to those of the cover members 11 and the cover members 12 of the fuel cell stacks 61 (fuel cells 100) of Embodiment 1 and Embodiment 2, they will not be described in detail.

In the fuel cell stack 61 (fuel cell 100) according to Embodiment 3 configured as described above, it is possible to suppress the steam from diffusing from the portion of the MEA 5 (to be precise, cathode 4b) which faces the first region 21 of the cathode separator 6b, to the oxidizing gas channel 9, and to suppress the steam from diffusing from the portion of the MEA 5 (to be precise, anode 4a) which faces the second region 22 of the anode separator 6a, to the fuel gas channel 8, thereby suppressing the MEA 5 (especially, polymer electrolyte membrane 1) from getting dried. The advantages achieved by the materials and the like of the cover member 11 and the cover member 12 of Embodiment 3 are similar to those of the fuel cell stacks 61 (fuel cells 100) Embodiment 1 and Embodiment 2.

Embodiment 4

Figure 12:
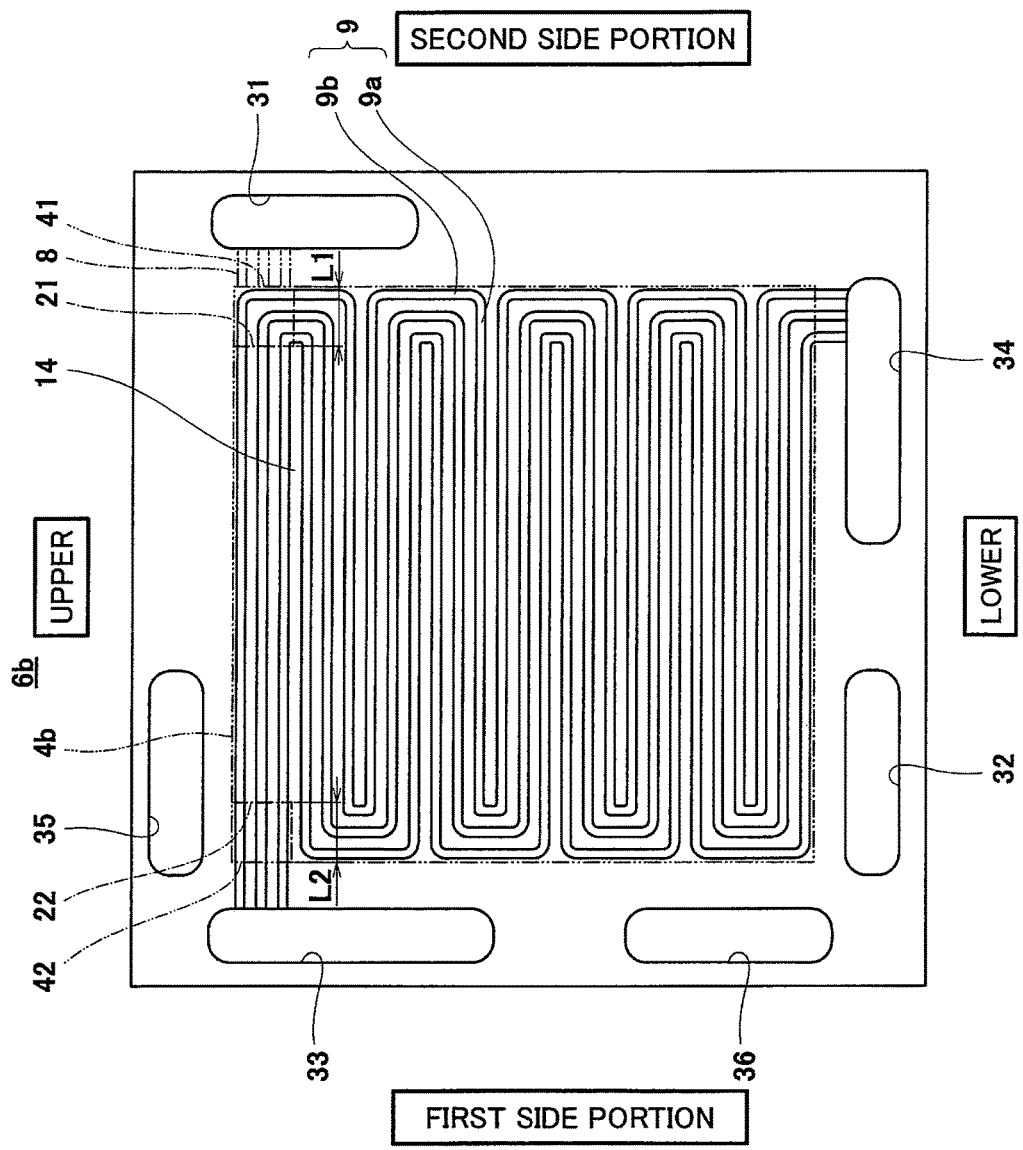
FIG. 12 is a schematic view showing an exemplary configuration of the inner surface of a cathode separator of a fuel cell stack according to Embodiment 4 of the present disclosure.
Figure 13:
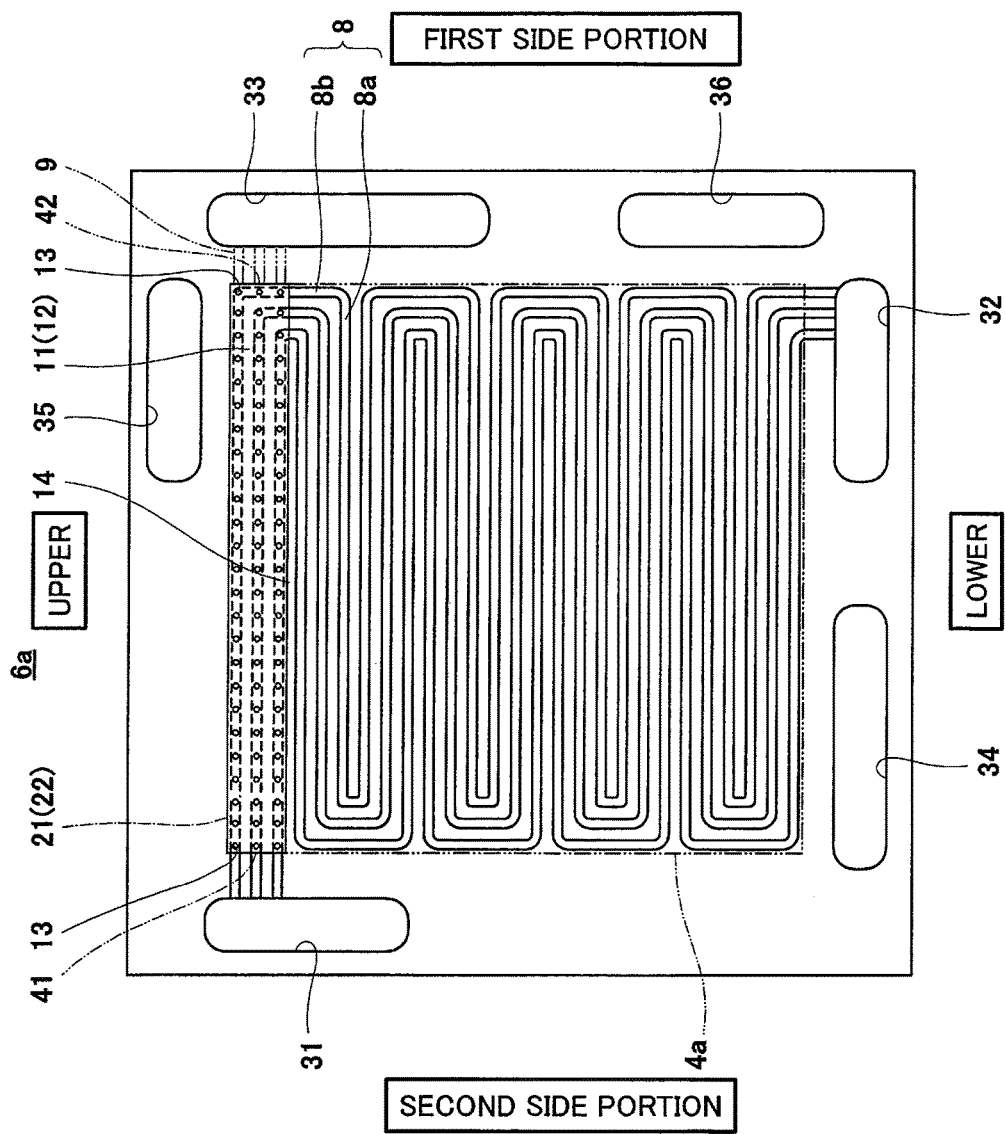
FIG. 13 is a schematic view showing an exemplary configuration of the inner surface of an anode separator of the fuel cell stack according to Embodiment 4 of the present disclosure.

FIG. 12 is a schematic view showing an exemplary configuration of the inner surface of a cathode separator of a fuel cell stack according to Embodiment 4 of the present disclosure. FIG. 13 is a schematic view showing an exemplary configuration of the inner surface of an anode separator of the fuel cell stack according to Embodiment 4 of the present disclosure. In FIG. 12, the upper and lower sides of the cathode separator are expressed as the upper and lower sides in FIG. 12 and a part of the fuel gas channel is indicated by imaginary lines. In FIG. 13, the upper and lower sides of the anode separator are expressed as the upper and lower sides in FIG. 13 and a part of the oxidizing gas channel is indicated by imaginary lines.

Referring to FIGS. 12 and 13, the fuel cell stack 61 (fuel cell 100) according to Embodiment 4 of the present disclosure has a configuration which is basically identical to that of the fuel cell stack 61 (fuel cell 100) of Embodiment 1 but is different from the same in that the first region 21 of the anode separator 6a and the second region 22 of the anode separator 6a overlap (align) with each other to form one region, when viewed in the thickness direction of the anode separator 6a.

To be specific, as shown in FIG. 13, the first region 21 (in other words, second region 22) of the anode separator 6a is a region extending between the portion 41 which contacts the anode 4a first from the upstream end of the fuel gas channel 8 and the portion 42 which contacts the cathode 4b first from the upstream end of the oxidizing gas channel 9. The first region 21 (22) is the region extending from the portion 41 of the fuel gas channel 8 to the portion 42 along the fuel gas channel 8. When viewed in the thickness direction of the anode separator 6a, horizontal one end portion (second side end portion) of the first region 21 is the portion 41 which contacts the anode 4a first from the upstream end of the fuel gas channel 8. When viewed in the thickness direction of the anode separator 6a, horizontal other end portion (first side end portion) of the first region 21 is the portion 42 which contacts the cathode 4b first from the upstream end of the oxidizing gas channel 9.

The cover member 11 (or cover member 12) is provided at the first region 21 (second region 22) of the anode separator 6a to cover the first region 21 (second region 22). The material and others of the cover member 11 (cover member 12) are similar to those of the cover member 11 and the cover member 12 of the fuel cell stack 61 (fuel cell 100) of Embodiment 1 and will not be described in detail.

The fuel cell stack 61 (fuel cell 100) of Embodiment 4 configured as described above achieves substantially the same advantage as that of the fuel cell stack 61 (fuel cell 100) of Embodiment 1.

Embodiment 5

Figure 14:
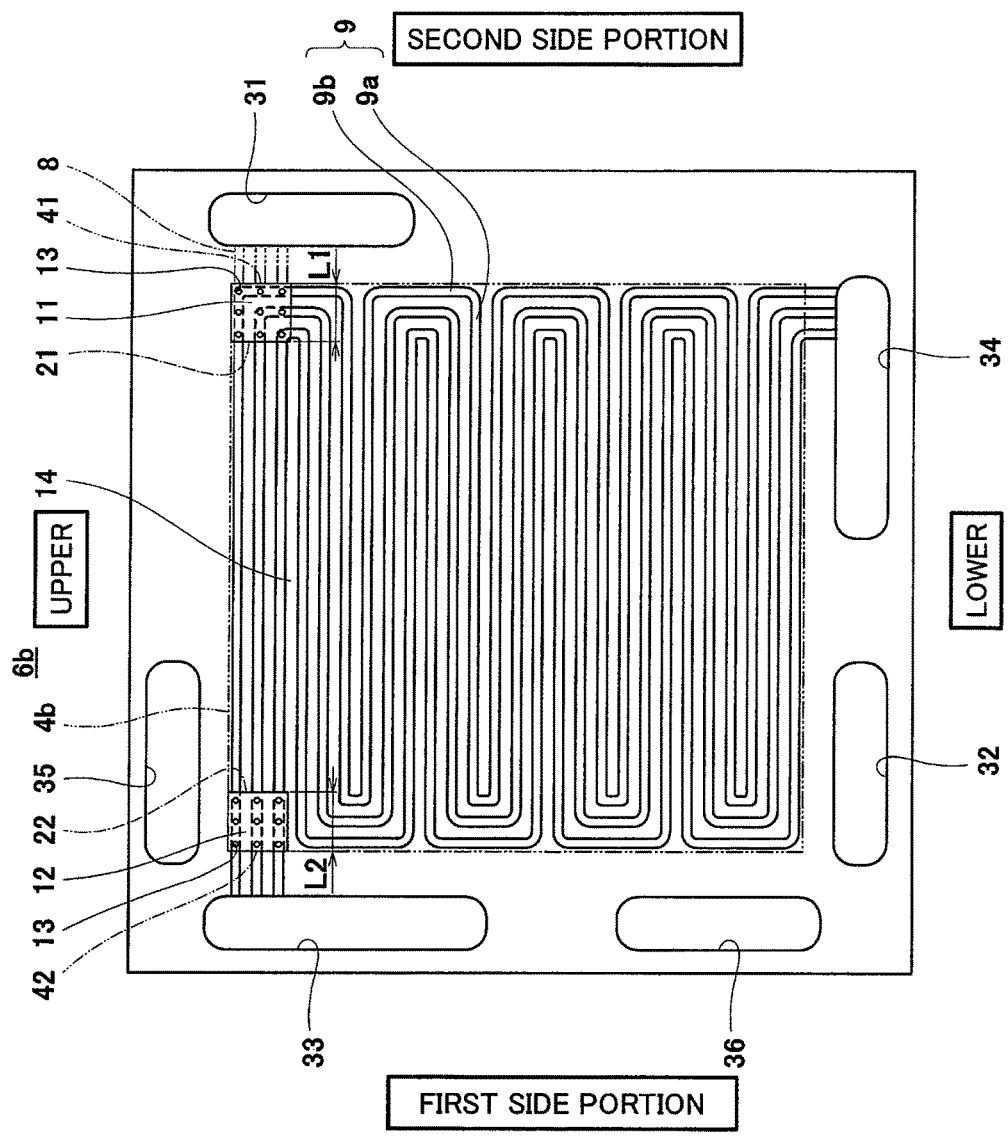
FIG. 14 is a schematic view showing an exemplary configuration of the inner surface of a cathode separator of a fuel cell stack according to Embodiment 5 of the present disclosure.
Figure 15:
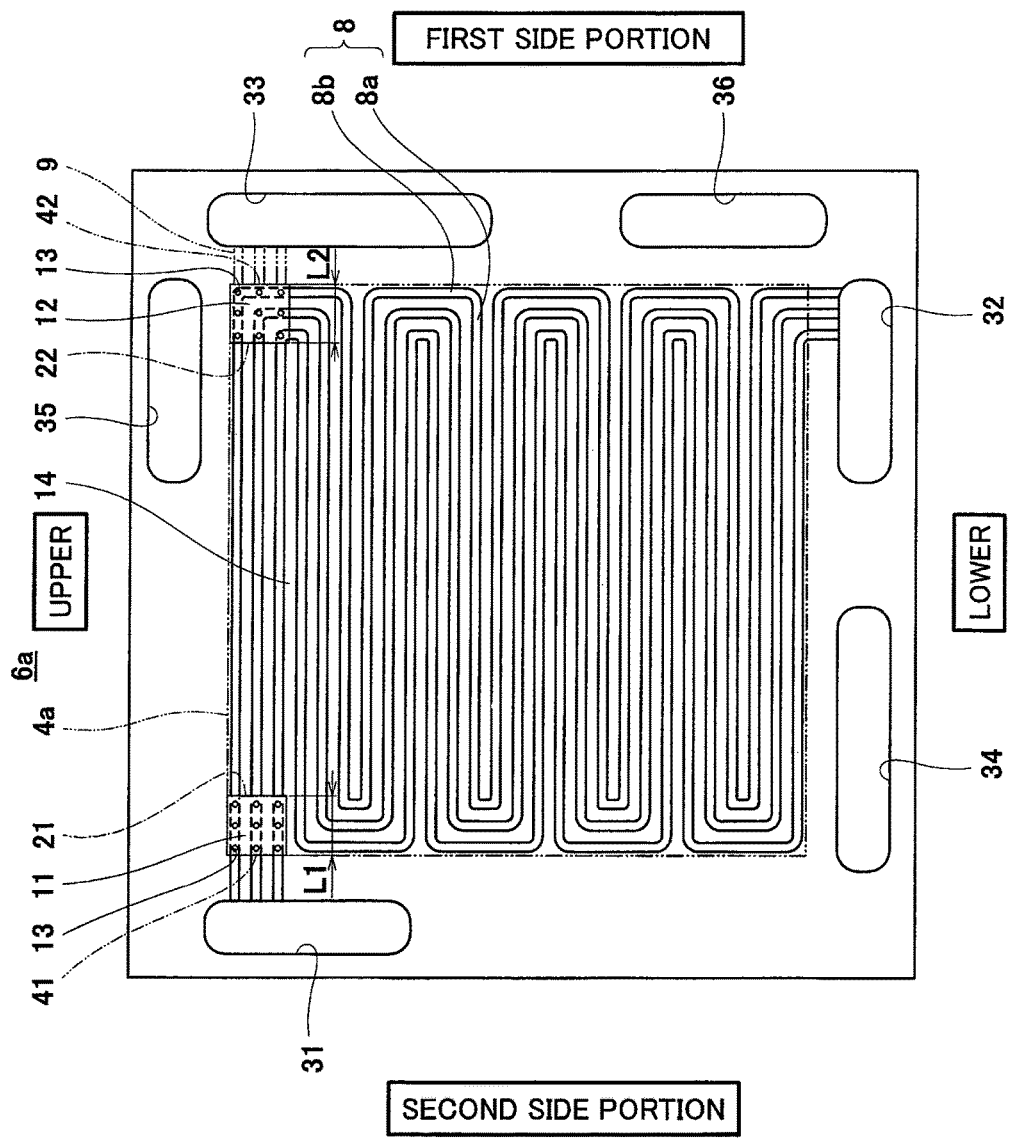
FIG. 15 is a schematic view showing an exemplary configuration of the inner surface of an anode separator of the fuel cell stack according to Embodiment 5 of the present disclosure.

FIG. 14 is a schematic view showing an exemplary configuration of the inner surface of a cathode separator of a fuel cell stack according to Embodiment 5 of the present disclosure. FIG. 15 is a schematic view showing an exemplary configuration of the inner surface of an anode separator of the fuel cell stack according to Embodiment 5 of the present disclosure. In FIG. 14, the upper and lower sides of the cathode separator are expressed as the upper and lower sides in FIG. 14 and a part of the fuel gas channel is indicated by imaginary lines. In FIG. 15, the upper and lower sides of the anode separator are expressed as the upper and lower sides in FIG. 15 and a part of the oxidizing gas channel is indicated by imaginary lines.

Referring to FIGS. 14 and 15, the fuel cell stack 61 (fuel cell 100) according to Embodiment 5 of the present disclosure has a configuration which is basically identical to that of the fuel cell stack 61 (fuel cell 100) of Embodiment 1 but is different from the same in that the cathode separator 6b is configured like the cathode separator 6b of the fuel cell stack 61 (fuel cell 100) according to Embodiment 2.

To be specific, the fuel cell stack 61 (fuel cell 100) according to Embodiment 5 is configured such that the cover member 11 and the cover member 12 are provided at each of the anode separator 6a and the cathode separator 6b. Since the materials and the like of the cover member 11 and the cover member 12 which are provided at each of the anode separator 6a and the cathode separator 6b are similar to those of the cover member 11 and the cover member 12 of the fuel cell stacks 61 (fuel cells 100) of Embodiment 1 and Embodiment 2, they will not be described in detail.

The fuel cell stack 61 (fuel cell 100) of Embodiment 5 configured as described above achieves the advantages of both of the fuel cell stacks 61 (fuel cells 100) of Embodiment 1 and Embodiment 2. That is, in the fuel cell stack 61 (fuel cell 100) according to Embodiment 5, the cover member 11 and the cover member 12 are provided at the first region 21 and the second region 22 of each of the anode separator 6a and the cathode separator 6b to cover the first region 21 and the second region 22, respectively. This makes it possible to suppress a steam from diffusing from the portions of MEA 5 (to be precise, anode 4a) which face the first region 21 and the second region 22 of the anode separator 6a, to the fuel gas channel 8. It is possible to suppress a steam from diffusing from the portions of MEA 5 (to be precise, cathode 4b) which face the first region 21 and the second region 22 of the cathode separator 6b, to the oxidizing gas channel 9. Therefore, it is possible to more effectively suppress the MEA 5 (especially, polymer electrolyte membrane 1) from getting dried.

Although the fuel cell stack 61 (fuel cell 100) according to Embodiment 5 is configured such that the first region 21 and the second region 22 in each of the anode separator 6a and the cathode separator 6b do not overlap with each other, they may have an overlapping region. For example, like the anode separator 6a of the fuel cell stack 61 (fuel cell 100) of Embodiment 4, the first region 21 and the second region 22 may align with each other.

Embodiment 6

Figure 16:
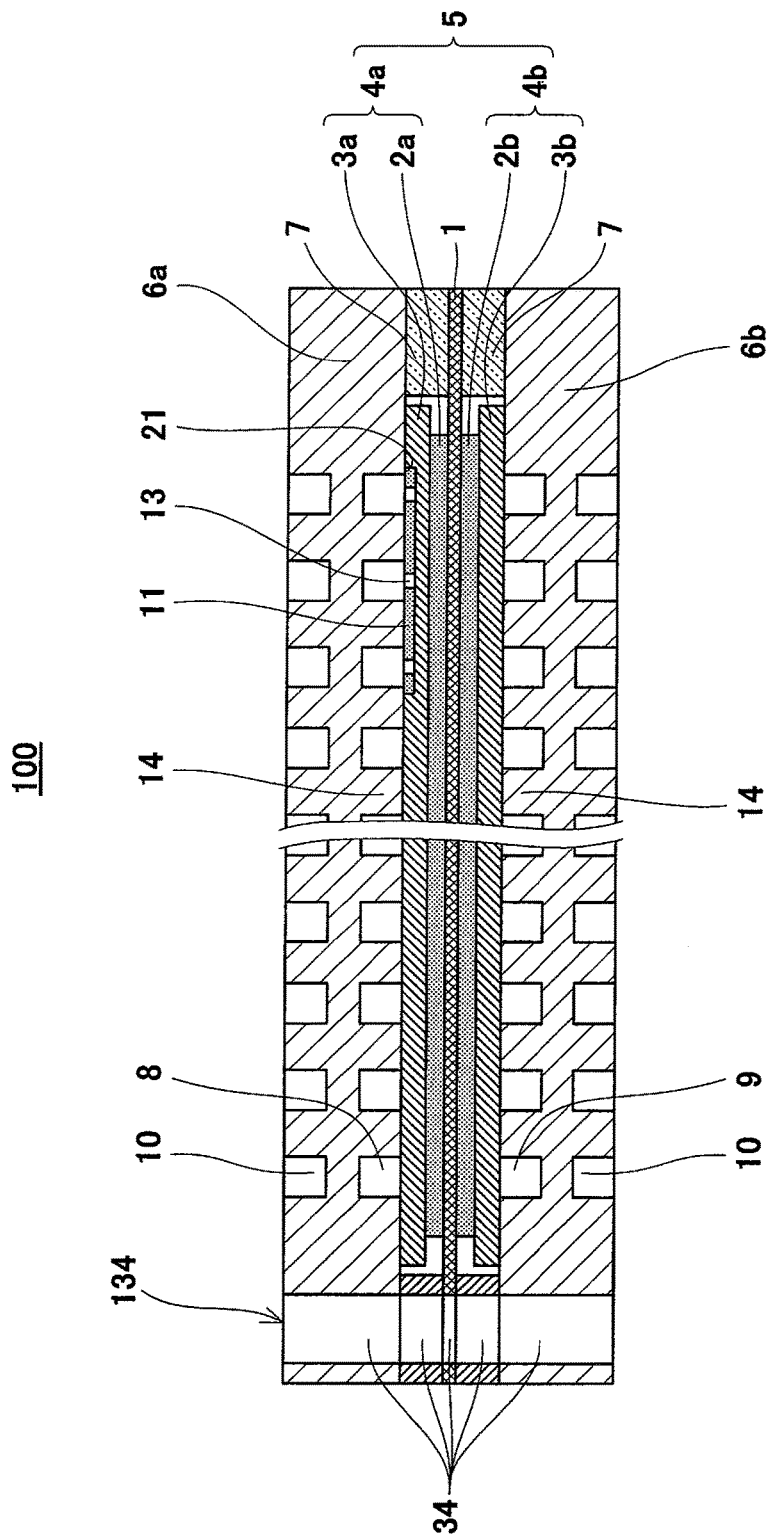
FIG. 16 is a cross-sectional view schematically showing an exemplary configuration of a fuel cell of a fuel cell stack according to Embodiment 6 of the present disclosure.

FIG. 16 is a cross-sectional view schematically showing an exemplary configuration of a fuel cell of a fuel cell stack according to Embodiment 6 of the present disclosure. In FIG. 16, a part of the configuration is omitted.

As shown in FIG. 16, the fuel cell stack 61 (fuel cell 100) according to Embodiment 6 of the present disclosure has a configuration which is basically identical to that of the fuel cell stack 61 (fuel cell 100) of Embodiment 1 but is different from the same in that the first region 21 and the second region 22 (not shown) of the anode separator 6a are not recessed in the inner surface of the peripheral portion of the anode separator 6a but instead the portions of the anode gas diffusion layer 3a which are in contact with the cover member 11 and the cover member 12 are recessed in a thickness direction thereof.

To be specific, in the fuel cell 100 of Embodiment 6, the anode separator 6a is configured like the cathode separator 6b. In a case where a base material made of carbon fibers (carbon paper, carbon fiber woven cloth, etc) is used for the anode gas diffusion layer 3a, the anode gas diffusion layer 3a is sufficiently compressed in a thickness direction thereof when the fuel cell 100 is fastened by a fastener member (not shown), because a compression rate of the base material made of carbon fibers is high. Because of this, the portions of one main surface of the anode gas diffusion layer 3a (main surface which is in contact with the cover member 11 and the cover member 12) may be or may not be formed in a recess shape. On the other hand, in a case where the base material made of carbon fibers is not used for the anode gas diffusion layer 3a, it is sometimes difficult to absorb the thickness of the cover member 11 and the thickness of the cover member 12, because of a low compression rate of the anode gas diffusion layer 3a. Therefore, it is desired that the portions of one main surface of the anode gas diffusion layer 3a which are in contact with the cover member 11 and the cover member 12 may be formed in a recess shape.

The fuel cell stack 61 (fuel cell 100) of Embodiment 6 configured as described above achieves substantially the same advantage as that of the fuel cell stack 61 (fuel cell 100) of Embodiment 1.

Embodiment 7

Figure 17:
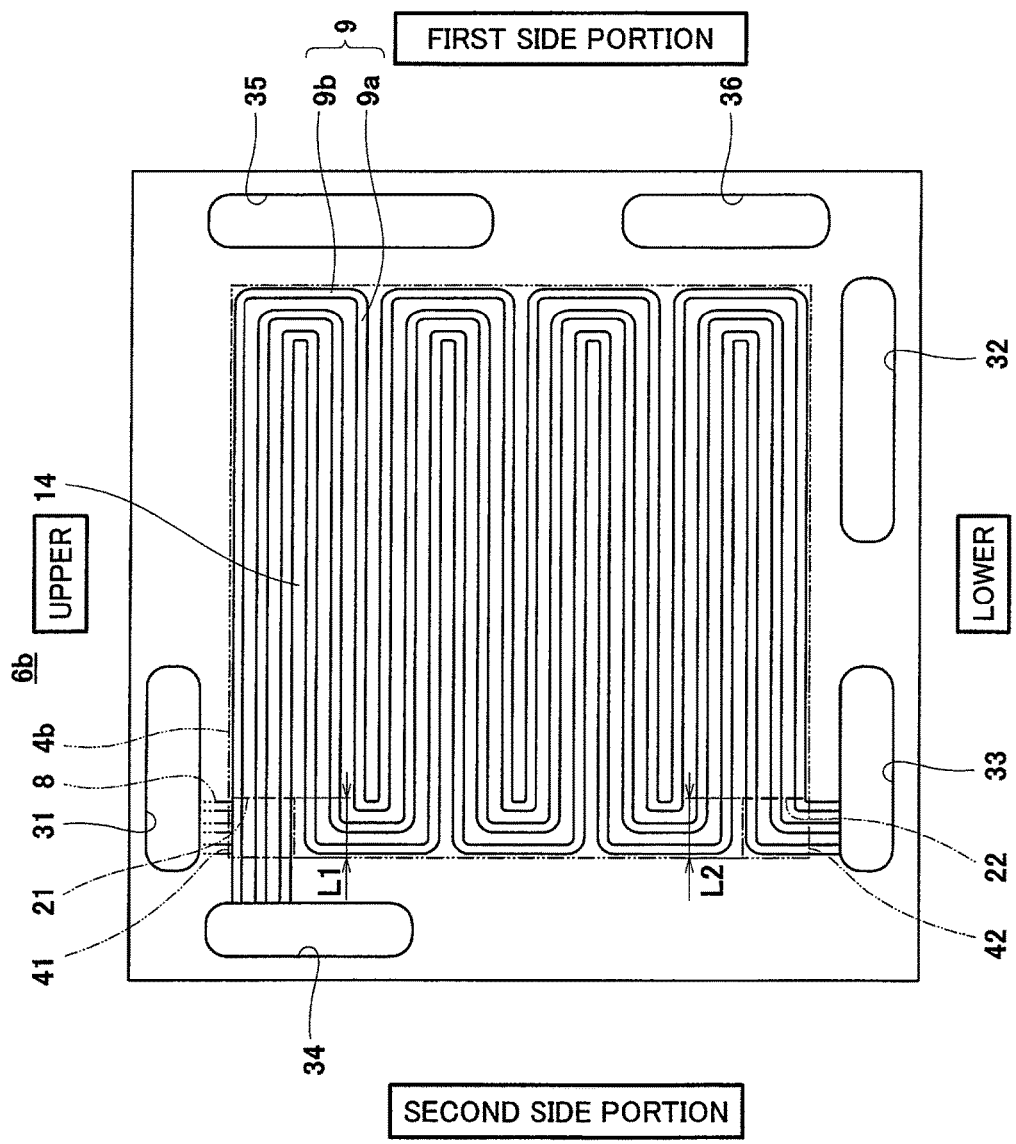
FIG. 17 is a schematic view showing an exemplary configuration of the inner surface of a cathode separator of a fuel cell stack according to Embodiment 7 of the present disclosure.
Figure 18:
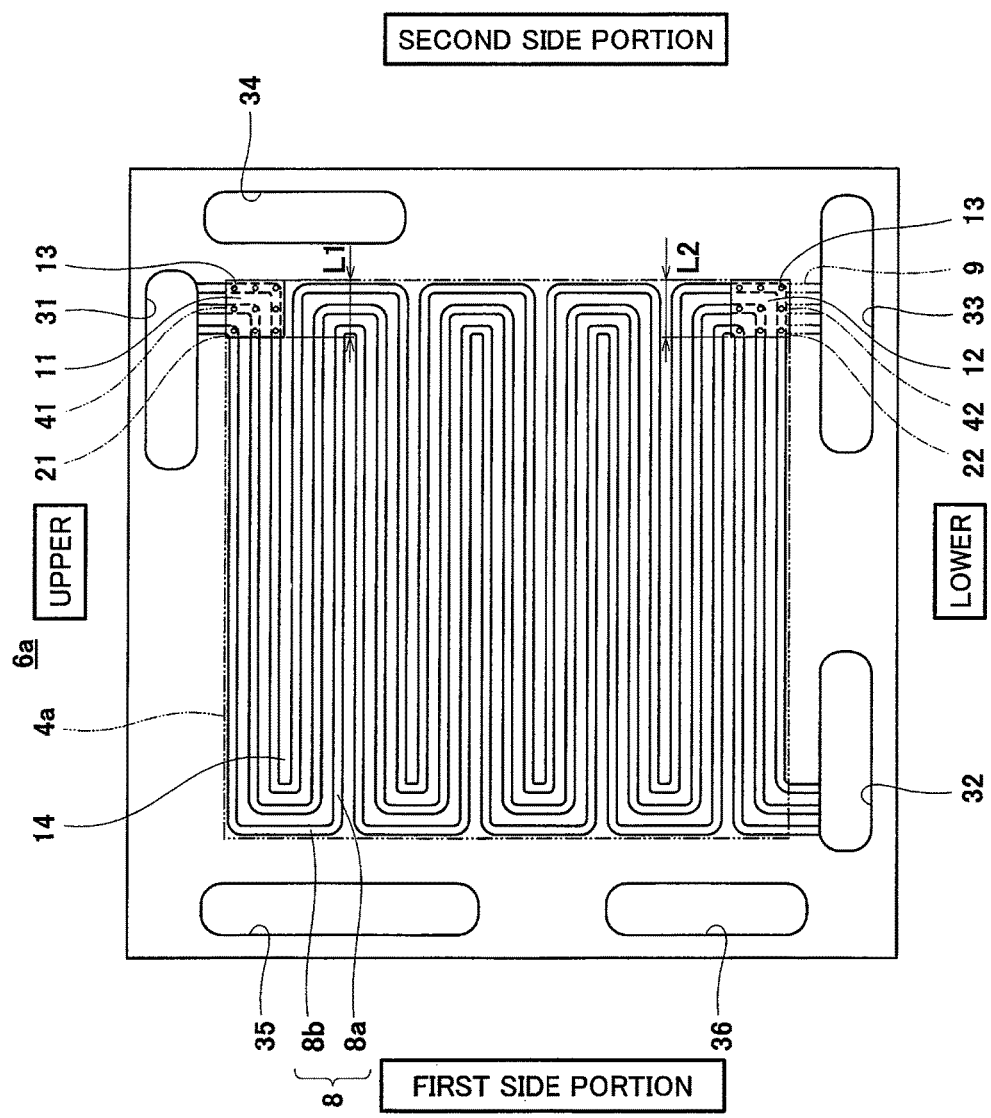
FIG. 18 is a schematic view showing an exemplary configuration of the inner surface of an anode separator of the fuel cell stack according to Embodiment 7 of the present disclosure.

FIG. 17 is a schematic view showing an exemplary configuration of the inner surface of a cathode separator of a fuel cell stack according to Embodiment 7 of the present disclosure. FIG. 18 is a schematic view showing an exemplary configuration of the inner surface of an anode separator of the fuel cell stack according to Embodiment 7 of the present disclosure. In FIG. 17, the upper and lower sides of the cathode separator are expressed as the upper and lower sides in FIG. 17 and a part of the fuel gas channel is indicated by imaginary lines. In FIG. 18, the upper and lower sides of the anode separator are expressed as the upper and lower sides in FIG. 18 and a part of the oxidizing gas channel is indicated by imaginary lines.

Referring to FIGS. 17 and 18, the fuel cell stack 61 (fuel cell 100) according to Embodiment 7 of the present disclosure has a configuration which is basically identical to that of the fuel cell stack 61 (fuel cell 100) of Embodiment 1 but is different from the same in that the fuel gas channel 8 and the oxidizing has channel 9 are arranged to form so-called a counter flow pattern, and the manifold holes such as the fuel gas supply manifold hole 31 are provided at different positions.

Firstly, the positions where the manifold holes such as the fuel gas supply manifold hole 31 are provided in the cathode separator 6b will be described with reference to FIG. 17. Since the positions where the manifold holes such as the fuel gas supply manifold hole 31 are provided in the anode separator 6a are similar to the positions where the manifold holes such as the fuel gas supply manifold hole 31 are provided in the cathode separator 6b, they will not be described in detail.

As shown in FIG. 17, the cooling medium supply manifold hole 35 is provided in the upper portion of the first side portion of the cathode separator 6b and the cooling medium discharge manifold hole 36 is provided in the lower portion of the first side portion. The fuel gas discharge manifold hole 32 is provided inward relative to the cooling medium discharge manifold hole 36 in the lower portion of the first side portion, where the cooling medium discharge manifold hole 36 is provided. The fuel gas supply manifold hole 31 is provided in the upper portion of the second side portion of the cathode separator 6b, and the oxidizing gas supply manifold hole 33 is provided in the lower portion of the second side portion. In addition, the oxidizing gas discharge manifold hole 34 is provided outward relative to the fuel gas supply manifold hole 31 in the upper portion of the second side portion where the fuel gas supply manifold hole 31 is provided.

As shown in FIGS. 17 and 18, the oxidizing gas channel 9 is formed in a serpentine shape to connect the oxidizing gas supply manifold hole 33 to the oxidizing gas discharge manifold hole 34. In the same manner, the fuel gas channel 8 is formed in a serpentine shape to connect the fuel gas supply manifold hole 31 to the fuel gas discharge manifold hole 32. These channels are arranged to form so-called a counter flow pattern as described above. The counter flow pattern will be described with reference to FIG. 19.

Figure 19:
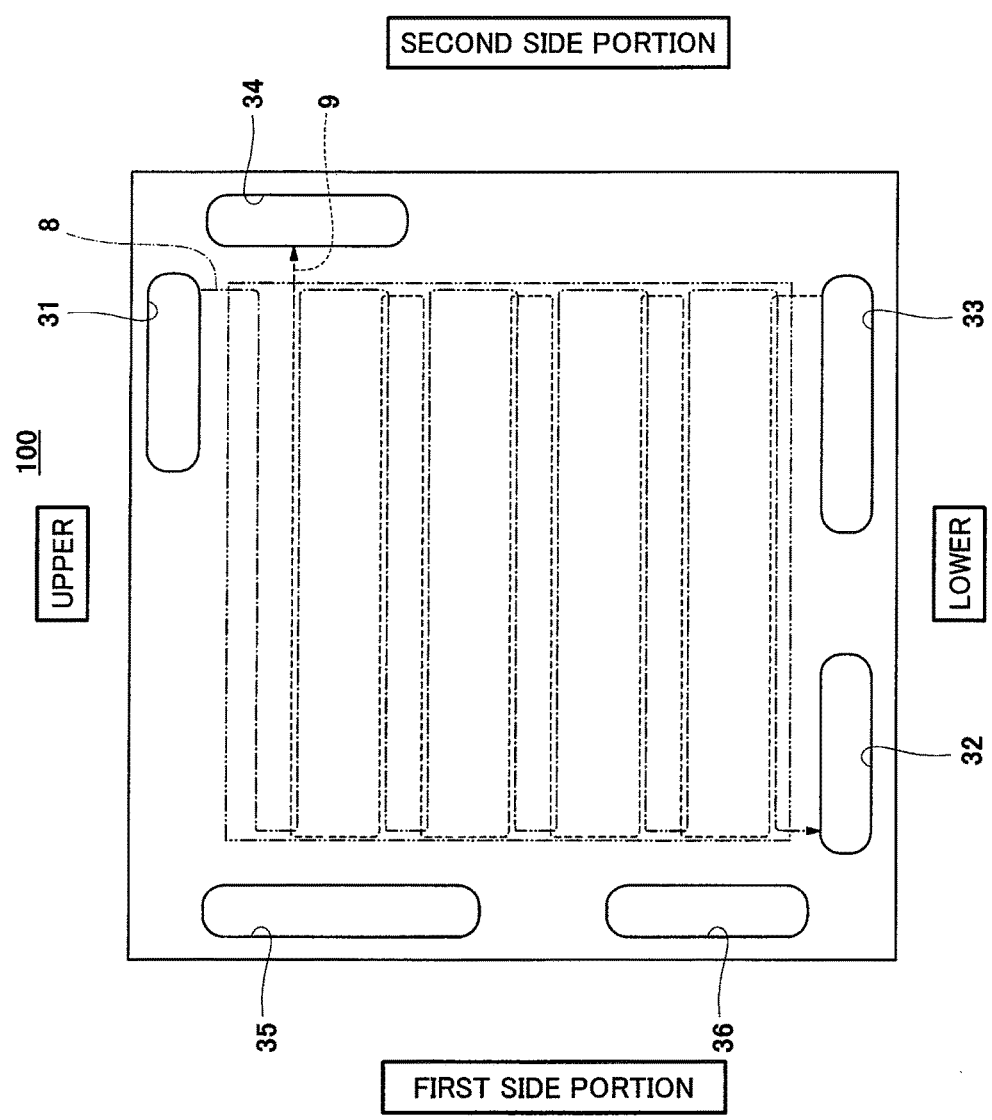
FIG. 19 is a schematic view showing an exemplary structure of the anode separator and an exemplary structure of the cathode separator of the fuel cell according to Embodiment 7 shown in FIGS. 17 and 18.

FIG. 19 is a schematic view showing an exemplary structure of the anode separator 6a and an exemplary structure of the cathode separator 6b of the fuel cell 100 according to Embodiment 7 shown in FIGS. 17 and 18. In FIG. 19, the anode separator 6a and the cathode separator 6b are drawn perspectively when viewed in the thickness direction of the fuel cell 100. The grooves of the fuel gas channel 8 of the anode separator 6a are drawn as a single line and the grooves of the oxidizing gas channel 9 of the cathode separator 6b are drawn as a single line. The upper and lower sides of the separators 6a and 6b are drawn as the upper and lower sides of FIG. 19. Furthermore, in FIG. 19, the fuel gas channel 8 and the oxidizing gas channel 9 are drawn to run at different positions in the vertical direction, to easily distinguish between them.

As shown in FIG. 19, the fuel gas channel 8 and the oxidizing gas channel 9 are configured such that the fuel gas and the oxidizing gas flow along each other in portions of these channels but flow in opposite directions from upstream side to downstream side microscopically (as a whole). This flow pattern is called the counter flow pattern.

Since the manifold holes such as the fuel gas supply manifold hole 31, the fuel gas channel 8 and the oxidizing gas channel 9 are configured in this way, the first region 21 and the second region 22 are configured as follows. To be specific, as shown in FIG. 18, when viewed in the thickness direction of the anode separator 6a, horizontal one end portion (second side end portion) of the first region 21 is the second side end portion of the anode 4a. As shown in FIG. 18, when viewed in the thickness direction of the anode separator 6a, the horizontal other end portion (first side end portion) of the first region 21 is a portion extending a predetermined distance L1 from the horizontal one end portion (second side end portion) of the first region 21 along the fuel gas channel 8. When viewed in the thickness direction of the anode separator 6a, the upper end portion of the first region 21 is the portion 41 which contacts the anode 4a first from the upstream end of the fuel gas channel 8, and the lower end portion of the first region 21 is the rib portion 14 formed by the lowermost groove of the fuel gas channel 8 composed of three grooves running along each other (arranged in parallel).

When viewed in the thickness direction of the anode separator 6a, horizontal one end portion (second side end portion) of the second region 22 is a second side end portion of the anode 4a. When viewed in the thickness direction of the anode separator 6a, the horizontal other end portion (first side end portion) of the second region 22 is a portion extending a predetermined distance L2 from the horizontal one end portion (second side end portion) of the second region 22 along the oxidizing gas channel 9. When viewed in the thickness direction 6a of the anode separator 6a, the upper end portion of the second region 22 is the rib portion 14 formed by the lowermost groove of the fuel gas channel 8 composed of three grooves running along each other (arranged in parallel). The lower end portion of the second region 22 is the lower end portion of the anode 4a (in other words, portion 42 which contacts the anode 4a first from the upstream end of the oxidizing gas channel 9).

Although in Embodiment 7, the horizontal other end portion of the first region 21 is the portion extending the predetermined distance L1 from the horizontal one end portion (second side end portion) of the first region 21 along the fuel gas channel 8, it may be a region where the fuel gas channel 8 aligning with the oxidizing gas channel 9 first misaligns with the oxidizing gas channel 9. Although in Embodiment 7, the horizontal other end portion of the second region 22 is the portion extending the predetermined distance L2 from the horizontal one end portion (second side end portion) of the first region 21 along the oxidizing gas channel 9, it may be a region where the oxidizing gas channel 9 aligning with the fuel gas channel 8 first misaligns the fuel gas channel 8.

The fuel cell stack 61 (fuel cell 100) of Embodiment 7 configured as described above achieves substantially the same advantage as that of the fuel cell stack 61 (fuel cell 100) of Embodiment 1.

Although the fuel cell stack 61 (fuel cell 100) according to Embodiment 7 is configured such that the cover member 11 and the cover member 12 are provided at the first region 21 and the second region 22 of the anode separator 6a like the fuel cell stack 61 (fuel cell 100) of Embodiment 1, they may be configured like the fuel cell stacks 61 (fuel cells 100) of Embodiment 2 to Embodiment 6.

Embodiment 8

Figure 20:
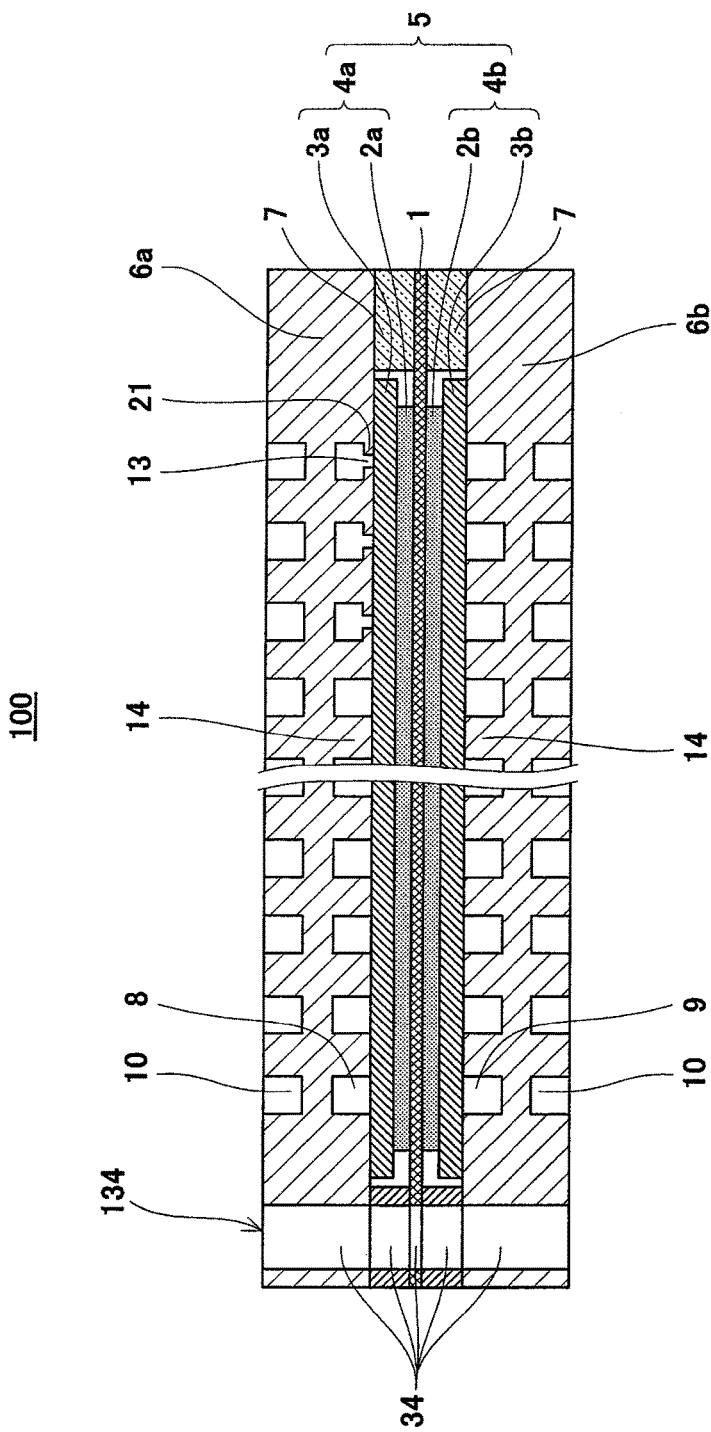
FIG. 20 is a cross-sectional view schematically showing an exemplary configuration of a fuel cell of a fuel stack according to Embodiment 8 of the present disclosure.
Figure 21:
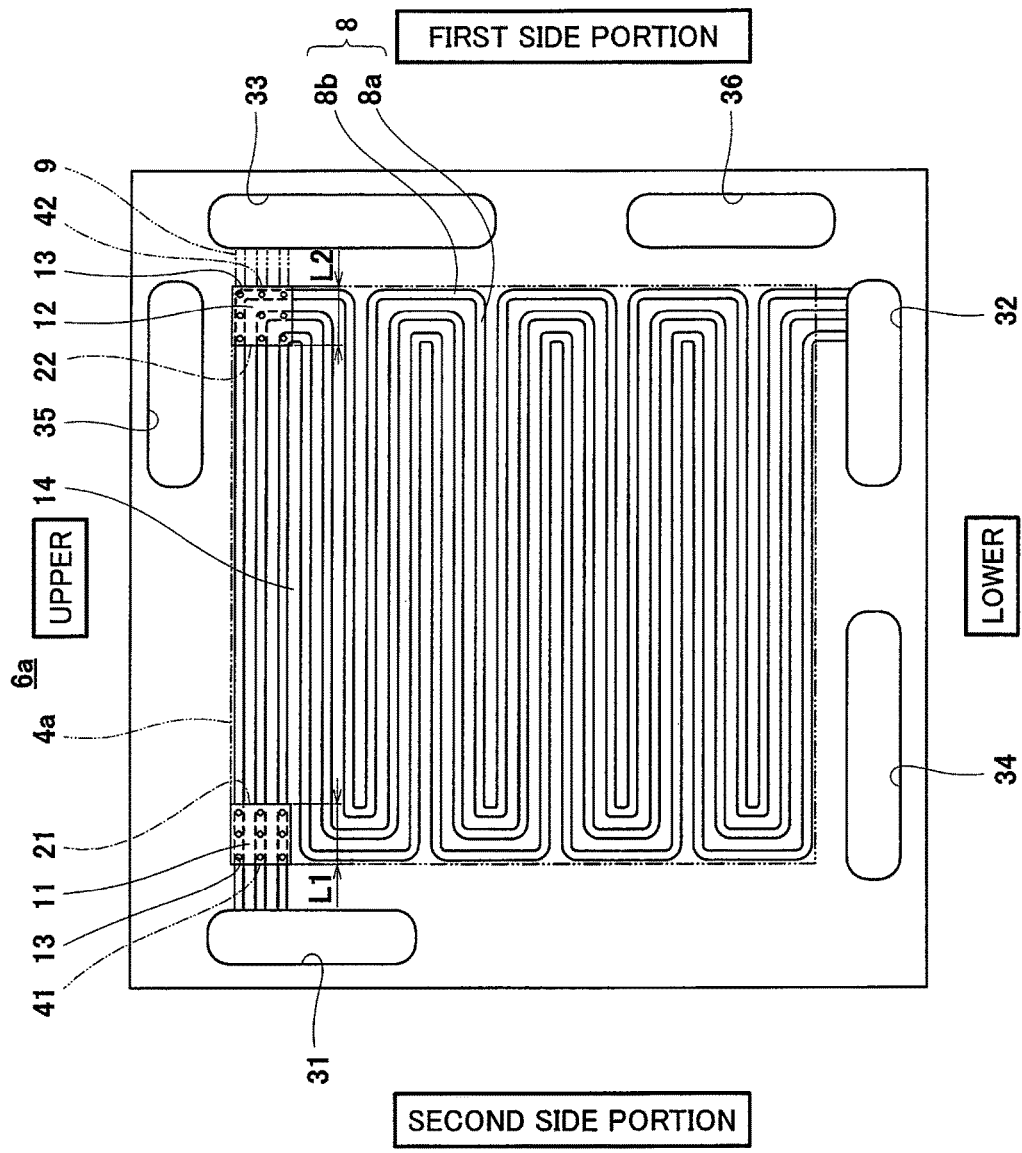
FIG. 21 is a schematic view showing an exemplary configuration of the inner surface of an anode separator of the fuel cell of FIG. 20.
Figure 22:
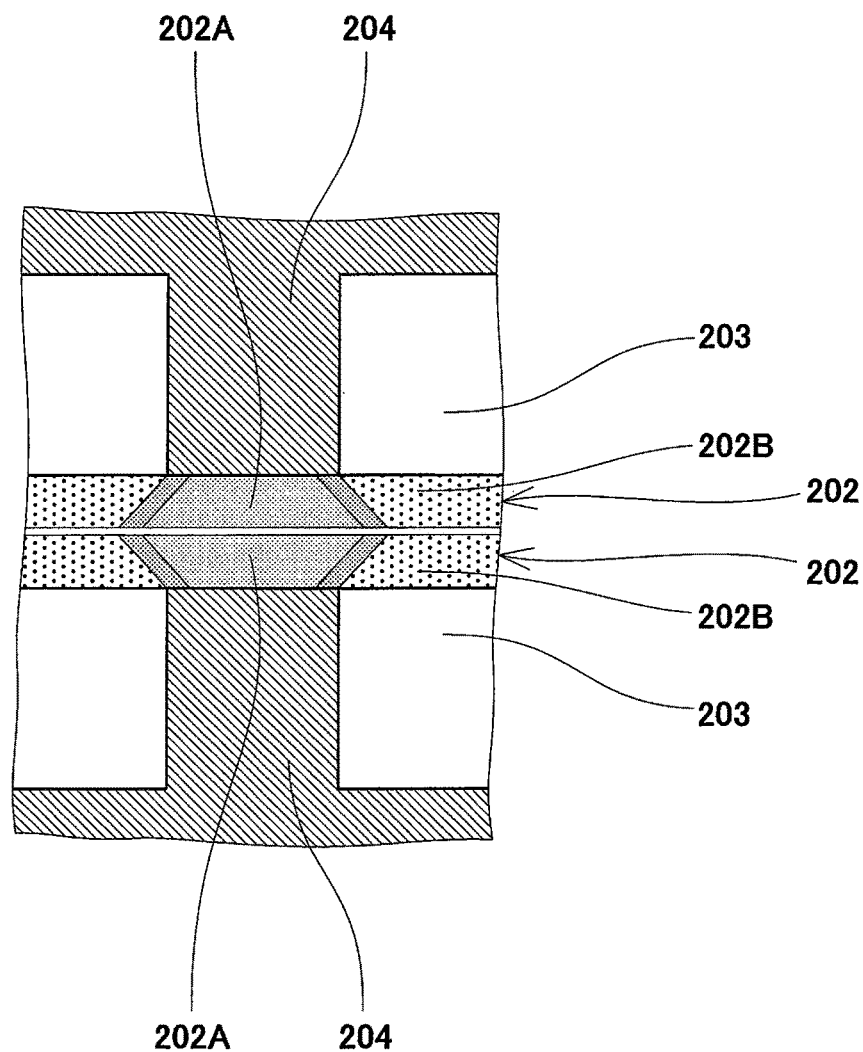
FIG. 22 is a schematic view showing a water content in an electrode during an operation of a fuel cell.

FIG. 20 is a cross-sectional view schematically showing an exemplary configuration of a fuel cell of a fuel stack according to Embodiment 8 of the present disclosure. FIG. 21 is a schematic view showing an exemplary configuration of the inner surface of an anode separator of the fuel cell of FIG. 20. In FIG. 20, a part of the configuration is omitted. In FIG. 21, the upper and lower sides of the anode separator are expressed as the upper and lower sides in FIG. 21 and a part of the oxidizing gas channel 9 is indicated by imaginary lines.

Referring to FIGS. 20 and 21, the fuel cell stack 61 (fuel cell 100) according to Embodiment 8 of the present disclosure has a configuration which is basically identical to that of the fuel cell stack 61 (fuel cell 100) of Embodiment 1 but is different from the same in the configuration of the first region 21 and the second region 22 of the anode separator 6a.

To be specific, in the portions of the fuel gas channel 8 which are formed in the first region 21 and the second region 22 of the anode separator 6a, respectively, the opening of the groove-shaped fuel gas channel 8 is covered with the inner surface of the anode separator 6a, To be more specific, the portions of the fuel gas channel 8 which are formed in the first region 21 and the second region 22 of the anode separator 6a are constructed of a tunnel formed by boring the anode separator 6a (formed in a culvert (tunnel) shape). This tunnel section of the anode separator 6a constitutes a gas permeation suppressing section. Through-holes 13 (which open in the inner surface of the anode separator 6a) connected to the plural grooves of the fuel gas channels 8 are provided in this tunnel section.

The fuel cell stack 61 (fuel cell 100) of Embodiment 8 configured as described above achieves substantially the same advantage as that of the fuel cell stack 61 (fuel cell 100) of Embodiment 1.

Embodiment 9

Figure 25:
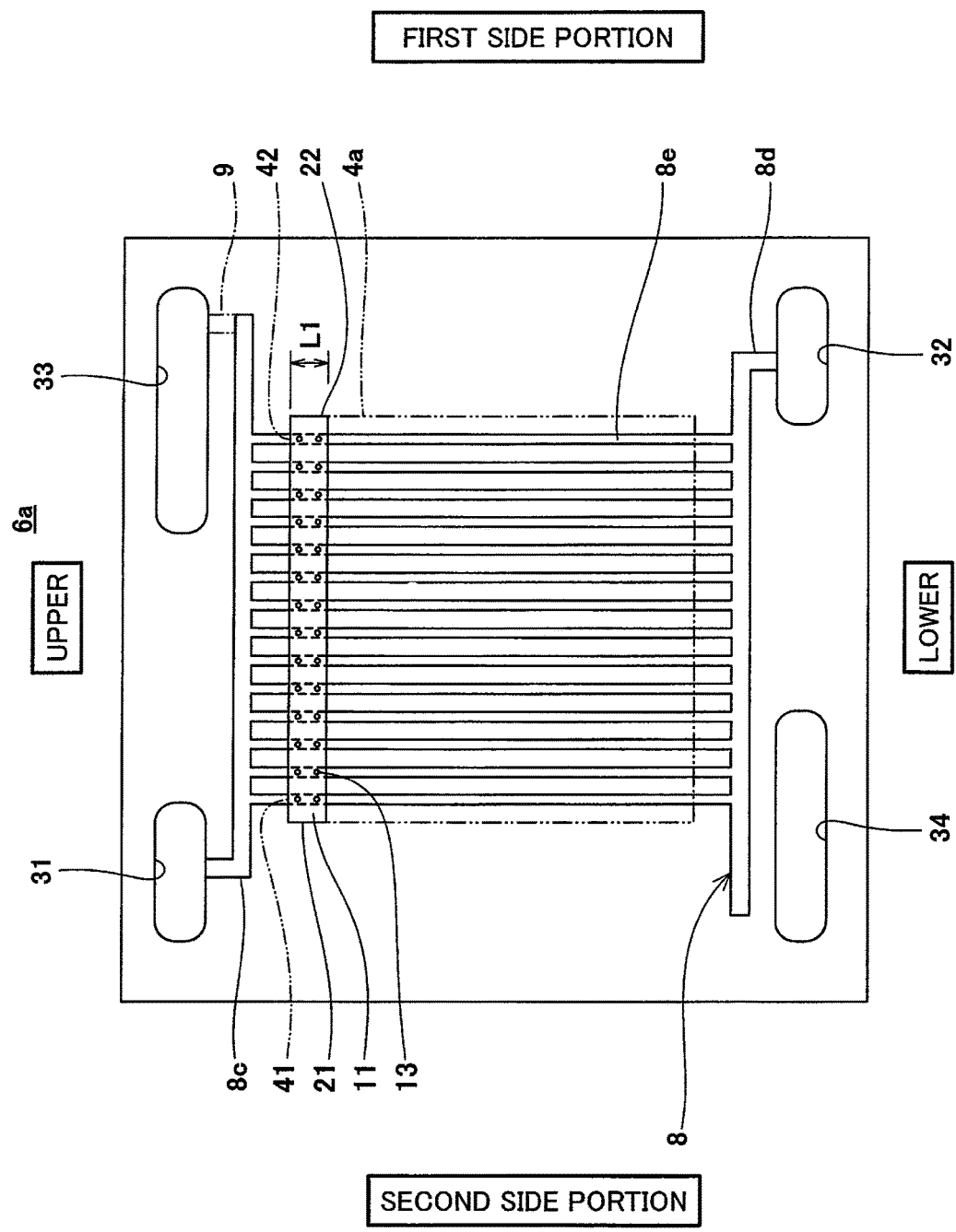
FIG. 25 is a schematic view showing an exemplary configuration of the inner surface of a cathode separator of a fuel cell stack according to Embodiment 9 of the present disclosure.
Figure 26:
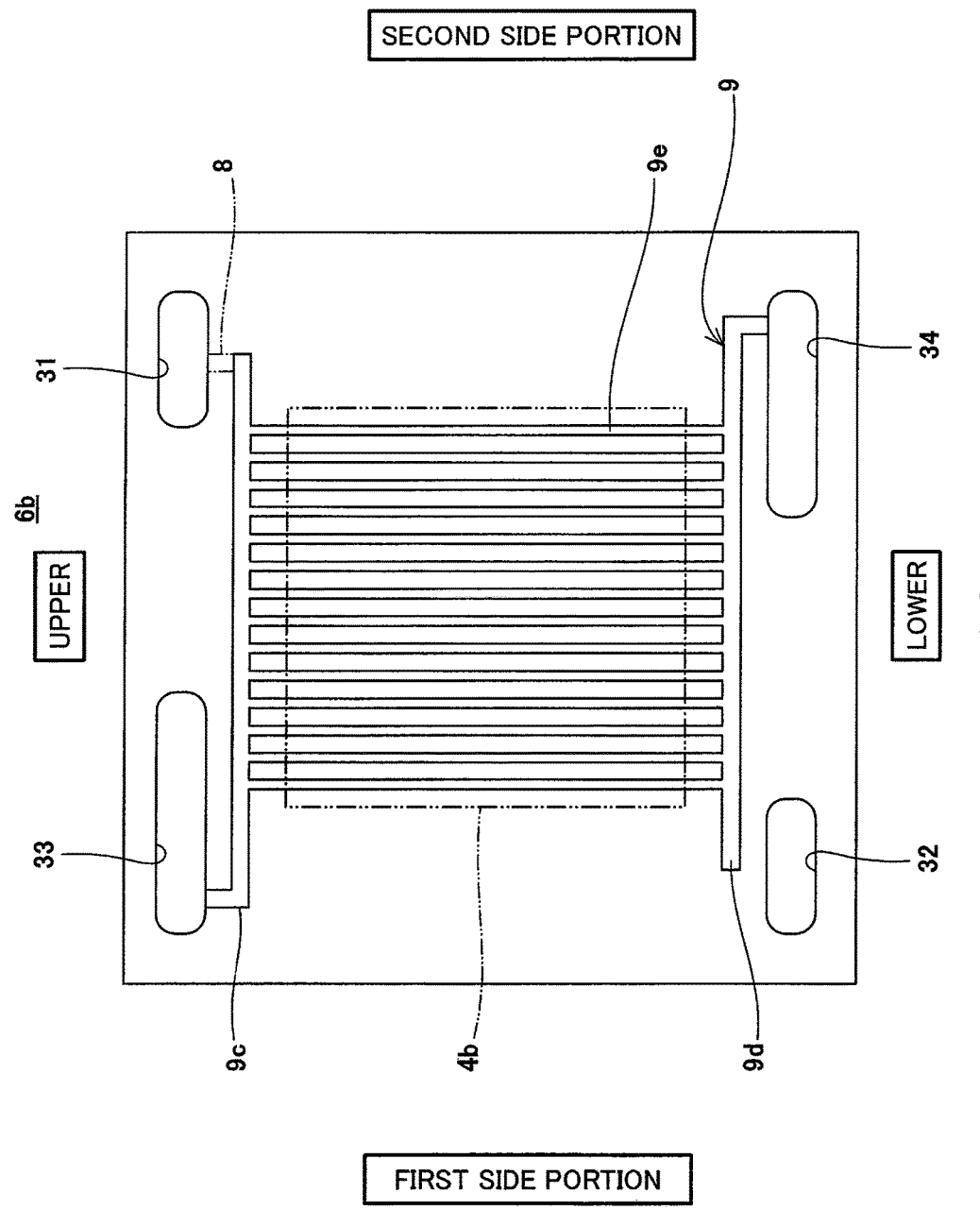
FIG. 26 is a schematic view showing an exemplary configuration of the inner surface of an anode separator of the fuel cell stack according to Embodiment 9 of the present disclosure.

FIG. 25 is a schematic view showing an exemplary configuration of the inner surface of an anode separator of a fuel cell stack according to Embodiment 9 of the present disclosure. FIG. 26 is a schematic view showing an exemplary configuration of the inner surface of the cathode separator of the fuel cell stack according to Embodiment 9 of the present disclosure. In FIG. 25, the upper and lower sides of the anode separator are expressed as the upper and lower sides in FIG. 25, and a part of the oxidizing gas channel is indicated by imaginary lines. In FIG. 26, the upper and lower sides of the cathode separator are expressed as the upper and lower sides in FIG. 26, and a part of the fuel gas channel is indicated by imaginary lines. In FIGS. 25 and 26, the cooling medium supply manifold hole and the cooling medium discharge manifold hole are omitted.

Referring to FIGS. 25 and 26, the fuel cell stack 61 (fuel cell 100) according to Embodiment 9 of the present disclosure has a configuration which is basically identical to that of the fuel cell stack 61 (fuel cell 100) of Embodiment 1 but is different from the same in the positions of the manifold holes such as the fuel gas supply manifold hole 31 and in that the fuel gas channel 8 and the oxidizing gas channel 9 are formed to extend in a straight-line shape.

Firstly, the positions where the manifold holes such as the fuel gas supply manifold hole 31 are provided in the anode separator 6a will be described with reference to FIG. 25. Since the positions where the manifold holes such as the fuel gas supply manifold hole 31 are provided in the cathode separator 6b are similar to the positions where the manifold holes such as the fuel gas supply manifold hole 31 are provided in the anode separator 6a, they will not be described in detail.

As shown in FIG. 25, the oxidizing gas supply manifold hole 33 is provided in the upper portion of the first side portion of the anode separator 6a, and the fuel gas discharge manifold hole 32 is provided in the lower portion of the first side portion. The fuel gas supply manifold hole 31 is provided in the upper portion of the second side portion of the anode separator 6a, and the oxidizing gas discharge manifold hole 34 is provided in the lower portion of the second side portion.

As shown in FIG. 25, the fuel gas channel 8 includes a first upstream gas channel 8c, a first downstream gas channel 8d, and a plurality of first communication gas channels 8e which are formed in a straight-line shape to connect the first upstream gas channel 8c to the first downstream gas channel 8d.

The upstream end of the first upstream gas channel 8c is connected to the fuel gas supply manifold hole 31 and forms the upstream end of the fuel gas channel 8. The first upstream gas channel 8c has a vertically extending portion and a horizontally extending portion (portion extending from the second side portion toward the first side portion). The downstream end of the first downstream gas channel 8d is connected to the fuel gas discharge manifold hole 32 and forms the downstream end of the fuel gas channel 8. The first downstream gas channel 8d has a vertically extending portion and a horizontally extending portion (portion extending from the second side portion toward the first side portion). The first communication gas channels 8e extend vertically.

As shown in FIG. 26, the oxidizing gas channel 9 of the cathode separator 6b is configured like the fuel gas channel 8 shown in FIG. 25. To be specific, the oxidizing gas channel 9 includes a second upstream gas channel 9c, a second downstream gas channel 9d, and plural second communication gas channels 9e which are formed, extending in a straight-line shape to connect the second upstream gas channel 9c to the second downstream gas channel 9d.

The upstream end of the second upstream gas channel 9c is connected to the oxidizing gas supply manifold hole 33 and forms the upstream end of the oxidizing gas channel 9. The second upstream gas channel 9c includes a vertically extending portion and a horizontally extending portion (portion extending from the first side portion toward the second side portion). The downstream end of the second downstream gas channel 9d is connected to the oxidizing gas discharge manifold hole 34 and forms the downstream end of the oxidizing gas channel 9. The second downstream gas channel 9d includes a vertically extending portion and a horizontally extending portion (portion extending from the first side portion toward the second side portion). The second communication gas channels 9e extend vertically. The cooling medium channel 10 may have a desired shape. The cooling medium channel 10 may have a serpentine shape like the cooling medium channel 10 in Embodiment 1 or may have a straight-line shape like the fuel gas channel 8 and the oxidizing gas channel 9 in Embodiment 9.

Since the fuel gas channel 8 and the oxidizing gas channel 9 are configured as described above, the first region 21 and the second region 22 overlap with each other (align with each other), as shown in FIG. 25. The first region 21 is a region extending between the portion 41 which contacts the anode 4a first from the upstream end of the fuel gas channel 8 when viewed in the thickness direction of the anode separator 6 and a region extending a predetermined distance L1 from the portion 41 of the fuel gas channel 8 along the fuel gas channel 8. In other words, when viewed in the thickness direction of the anode separator 6a, the upper end portion of the first region 21 is the portion 41 (upper end portion of the anode 4a) which contacts the anode 4a first from the upstream end of the fuel gas channel 8 along the fuel gas channel 8, and the lower end portion of the first region 21 is the portion extending the predetermined distance L1 from the portion 41 of the fuel gas channel 8 along the fuel gas channel 8. The horizontal one end portion (first side end portion) of the first region 21 is the first side end portion of the anode 4a and the horizontal other end portion (second side end portion) of the first region 21 is the second side end portion of the anode 4a.

Likewise, the second region 22 is a region extending between the portion 42 which contacts the cathode 4b first from the upstream end of the oxidizing gas channel 9 and the portion extending the predetermined distance L1 from the portion 42 of the oxidizing gas channel 9 along the oxidizing gas channel 9. Since the first communication gas channels 8e and the second communication gas channels 9e are formed to extend vertically in Embodiment 9, the first region 21 and the second region 22 are configured as described above. If the first communication gas channels 8e and the second communication gas channels 9e are configured to extend horizontally, then the first region 21 and the second region 22 are configured like those of Embodiment 1. The cover member 11 is provided at the first region 21. The cover member 11 is configured like the cover member 11 of the fuel cell stack 61 (fuel cell 100) according to Embodiment 1, and therefore, will not be described in detail.

The fuel cell stack 61 (fuel cell 100) of Embodiment 9 configured as described above achieves the same advantage as that of the fuel cell stack 61 (fuel cell 100) of Embodiment 1.

Although the cover member 11 is provided at the anode separator 6a and is not provided at the cathode separator 6b in Embodiment 9, the cover member 11 may not be provided at the anode separator 6a but may be provided at the cathode separator 6b. In such a configuration, the advantage achieved by the fuel cell stack 61 (fuel cell 100) of Embodiment 2 are achieved.

Although the cover member 11 and the first region 21 have a rectangular shape when viewed in the thickness direction of the anode separator 6a In Embodiment 9, they may have a desired shape like a circular-shape like those in modification 1. Furthermore, the cover member 11 and the first region 21 have a desired cross-sectional shape such as a trapezoidal shape like those in modification 2.

Embodiment 10

Figure 27:
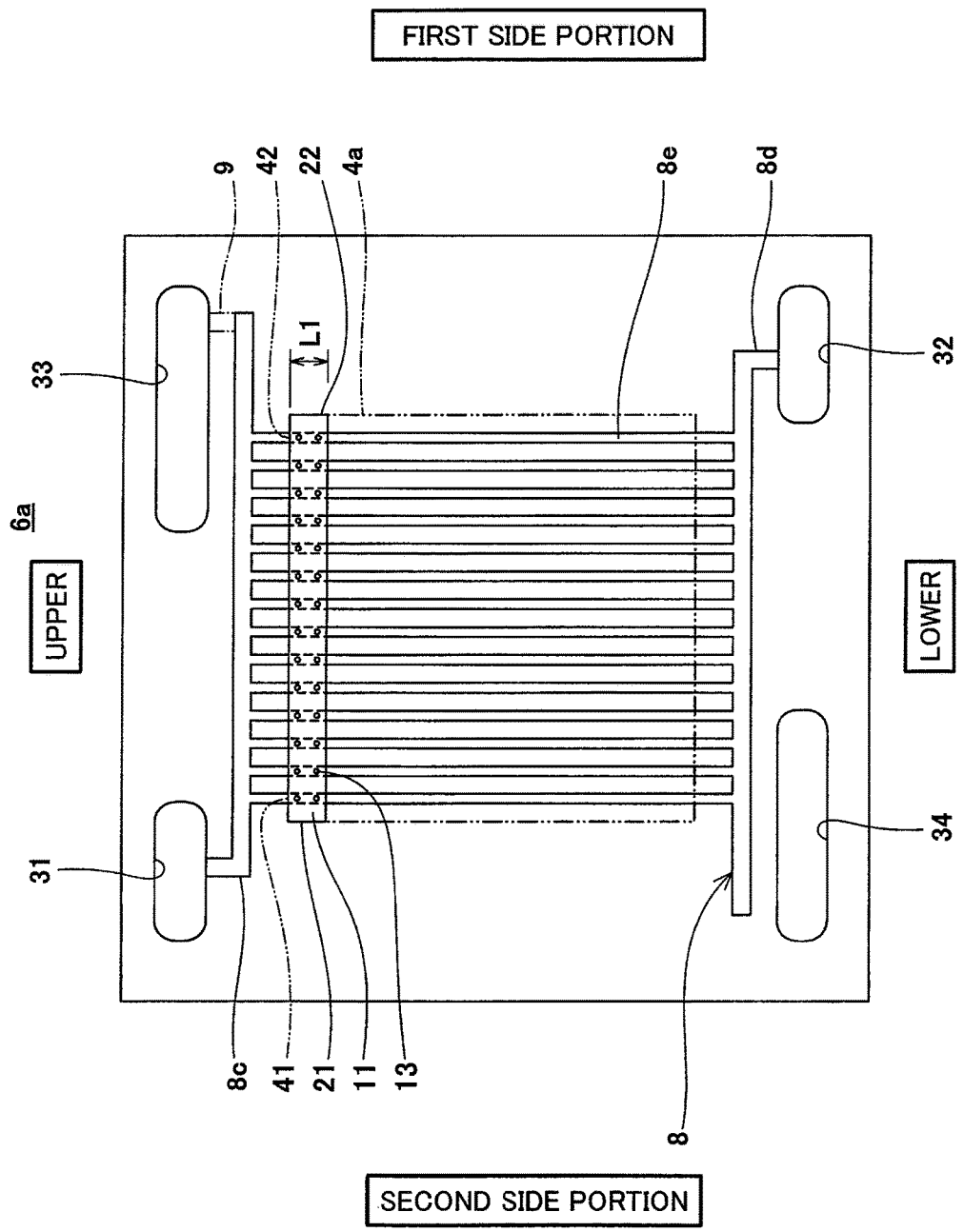
FIG. 27 is a schematic view showing an exemplary configuration of the inner surface of an anode separator of a fuel cell stack according to Embodiment 10 of the present disclosure.
Figure 28:
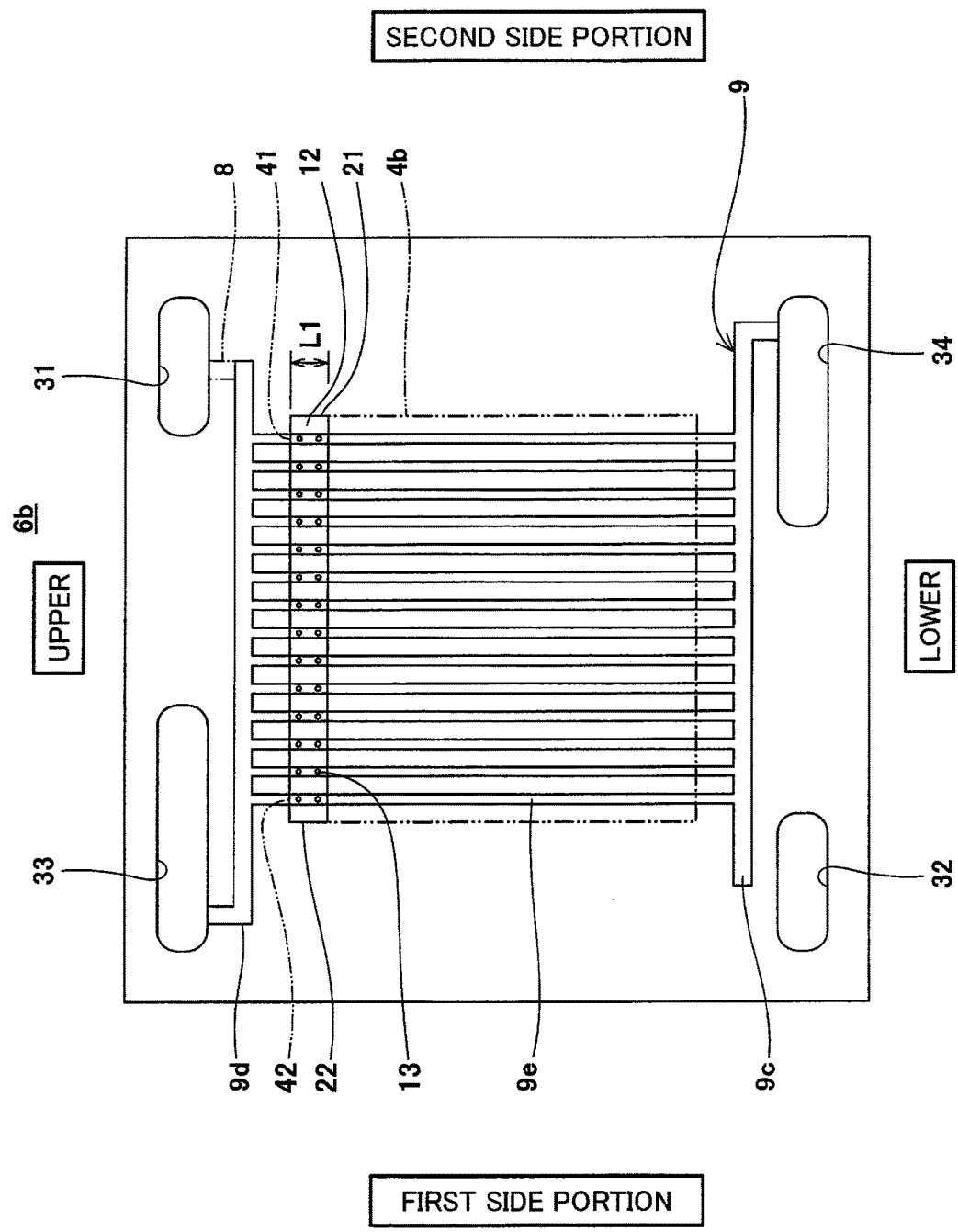
FIG. 28 is a schematic view showing an exemplary configuration of the inner surface of a cathode separator of a fuel cell stack according to Embodiment 10 of the present disclosure.

FIG. 27 is a schematic view showing an exemplary configuration of the inner surface of an anode separator of a fuel cell stack according to Embodiment 10 of the present disclosure. FIG. 28 is a schematic view showing an exemplary configuration of the inner surface of a cathode separator of the fuel cell stack according to Embodiment 10 of the present disclosure. In FIG. 27, the upper and lower sides of the anode separator are expressed as the upper and lower sides in FIG. 27, and a part of the oxidizing gas channel is indicated by imaginary lines. In FIG. 28, the upper and lower sides of the cathode separator are expressed as the upper and lower sides in FIG. 28, and a part of the fuel gas channel is indicated by imaginary lines. In FIGS. 27 and 28, the cooling medium supply manifold hole and the cooling medium discharge manifold hole are omitted.

Referring to FIGS. 27 and 28, the fuel cell stack 61 (fuel cell 100) according to Embodiment 10 of the present disclosure has a configuration which is basically identical to that of the fuel cell stack 61 (fuel cell 100) of Embodiment 9 but is different from the same in that the cover member 12 is provided at the first region 21 (second region 22) of the cathode separator 6b. The cover member 12 of Embodiment 10 is configured like the cover member 12 of the fuel cell stack 61 (fuel cell 100) of Embodiment 1, and therefore will not be described in detail.

The fuel cell stack 61 (fuel cell 100) of Embodiment 10 configured as described above achieves the same advantage as that of the fuel cell stack 61 (fuel cell 100) of Embodiment 9. In addition, it is possible to suppress a steam from diffusing from the portion of the MEA 5 (to be precise, cathode 4b) which faces the second region 22 (first region 21) of the cathode separator 6b, to the oxidizing gas channel 9. Thus, it is possible to suppress the MEA 5 (especially, polymer electrolyte membrane 1) from getting dried.

Embodiment 11

Figure 29:
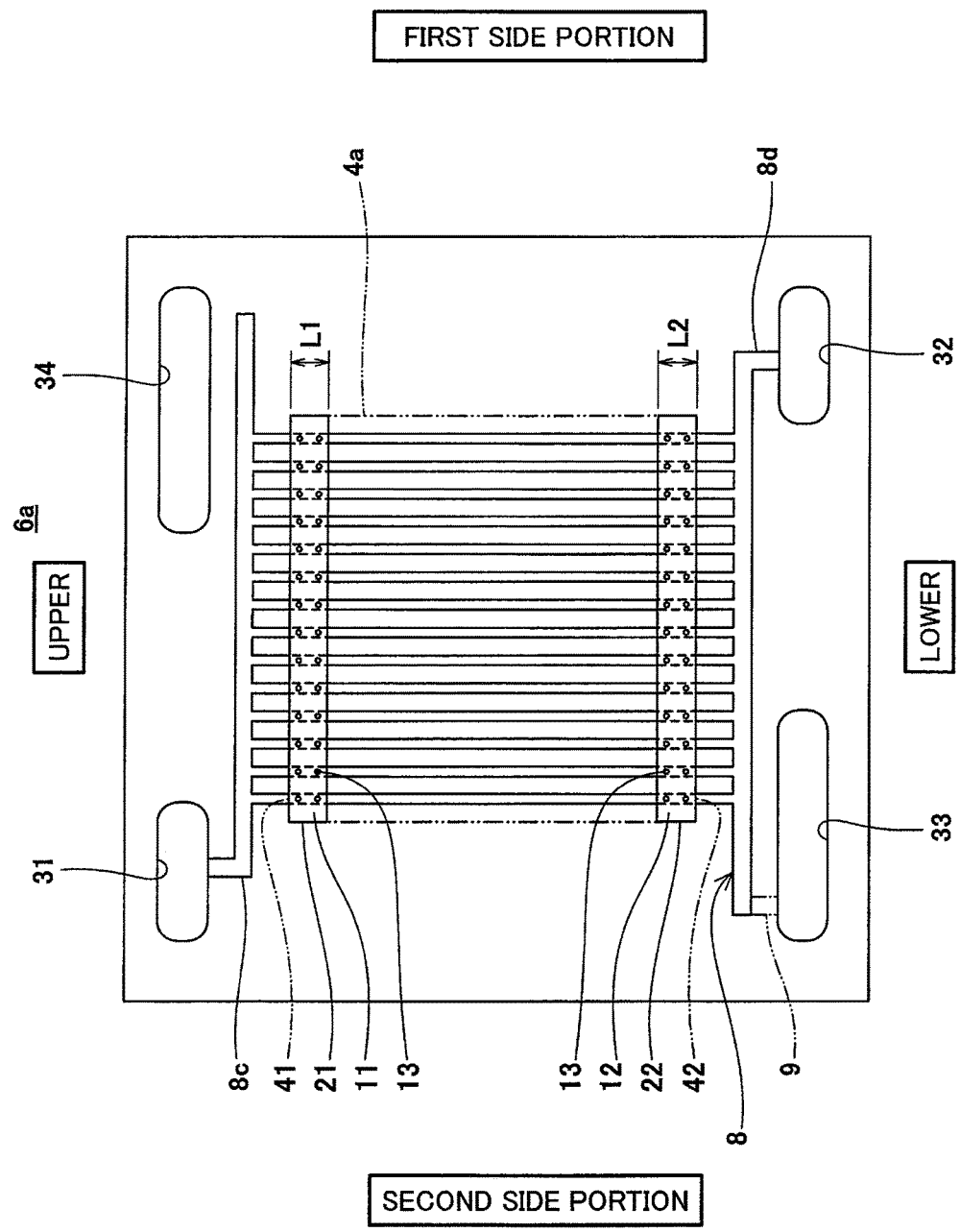
FIG. 29 is a schematic view showing an exemplary configuration of the inner surface of an anode separator of a fuel cell stack according to Embodiment 11 of the present disclosure.
Figure 30:
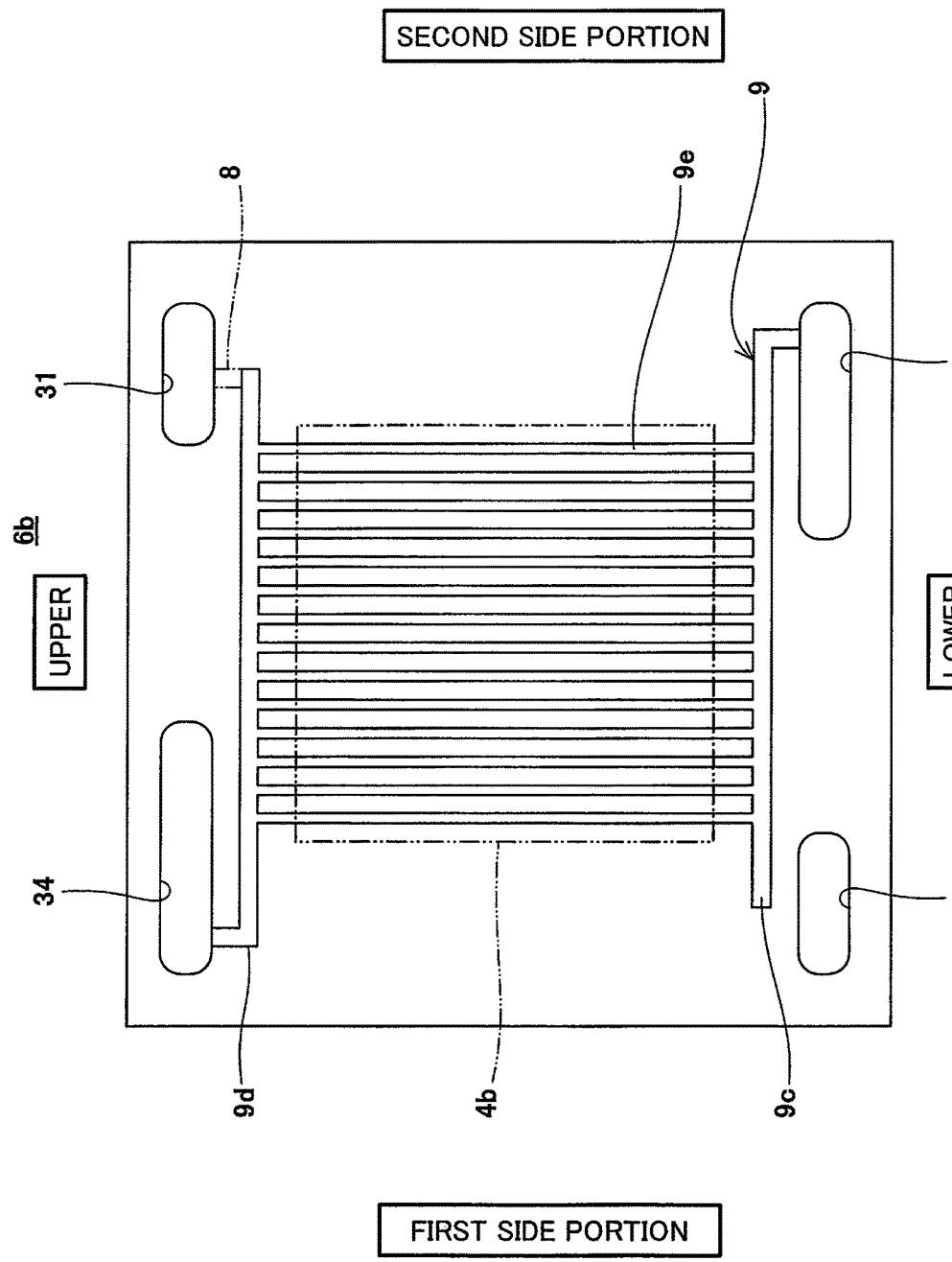
FIG. 30 is a schematic view showing an exemplary configuration of the inner surface of a cathode separator of a fuel cell stack according to Embodiment 11 of the present disclosure.

FIG. 29 is a schematic view showing an exemplary configuration of the inner surface of an anode separator of a fuel cell stack according to Embodiment 11 of the present disclosure. FIG. 30 is a schematic view showing an exemplary configuration of the inner surface of a cathode separator of the fuel cell stack according to Embodiment 11 of the present disclosure. In FIG. 29, the upper and lower sides of the anode separator are expressed as the upper and lower sides in FIG. 29, and a part of the oxidizing gas channel is indicated by imaginary lines. In FIG. 30, the upper and lower sides of the cathode separator are expressed as the upper and lower sides in FIG. 30, and a part of the fuel gas channel is indicated by imaginary lines. In FIGS. 29 and 30, the cooling medium supply manifold hole and the cooling medium discharge manifold hole are omitted.

Referring to FIGS. 29 and 30, the fuel cell stack 61 (fuel cell 100) according to Embodiment 11 of the present disclosure has a configuration which is basically identical to that of the fuel cell stack 61 (fuel cell 100) of Embodiment 9 but is different from the same in the positions of the manifold holes such as the fuel gas supply manifold hole 31 and in that the fuel gas channel 8 and the oxidizing gas channel 9 are arranged to form so-called a counter flow pattern.

Firstly, the positions where the manifold holes such as the fuel gas supply manifold hole 31 are provided in the anode separator 6a will be described with reference to FIG. 29. Since the positions where the manifold holes such as the fuel gas supply manifold hole 31 are provided in the cathode separator 6b are similar to the positions where the manifold holes such as the fuel gas supply manifold hole 31 are provided in the anode separator 6a, they will not be described in detail.

As shown in FIG. 29, the oxidizing gas discharge manifold hole 34 is provided in the upper portion of the first side portion of the anode separator 6a, and the fuel gas discharge manifold hole 32 is provided in the lower portion of the first side portion. The fuel gas supply manifold hole 31 is provided in the upper portion of the second side portion of the anode separator 6a, and the oxidizing gas supply manifold hole 33 is provided in the lower portion of the second side portion.

As shown in FIG. 29, the second region 22 is a region between the portion 42 which contacts the cathode 4b first from the upstream end of the oxidizing gas channel 9 and a portion extending a predetermined distance L1 from the portion 42 of the oxidizing gas channel 9 along the oxidizing gas channel 9. In other words, when viewed in the thickness direction of the anode separator 6a, the lower end portion of the second region 22 is the portion 42 (lower end portion of the cathode 4b) which contacts the cathode 4b first from the upstream end of the oxidizing gas channel 9, and the upper end portion of the second region 22 is the portion extending a predetermined distance L2 from the portion 42 of the oxidizing gas channel 9 along the oxidizing gas channel 9. The horizontal one end portion (first side end portion) of the first region 21 is the first side end portion of the anode 4a, and the horizontal other end portion (second side end portion) of the first region 21 is the second side end portion of the anode 4a.

The cover member 11 is provided at the first region 21, and the cover member 12 is provided at the second region 22. Since these cover members 11 and 12 are configured like the cover members 11 and 12 of the fuel cell stack 61 (fuel cell 100) of Embodiment 1, they will not be described in detail.

The fuel cell stack 61 (fuel cell 100) of Embodiment 11 configured as described above achieves the same advantage as that of the fuel cell stack 61 (fuel cell 100) of Embodiment 9 and hence Embodiment 1.

Embodiment 12

Figure 31:
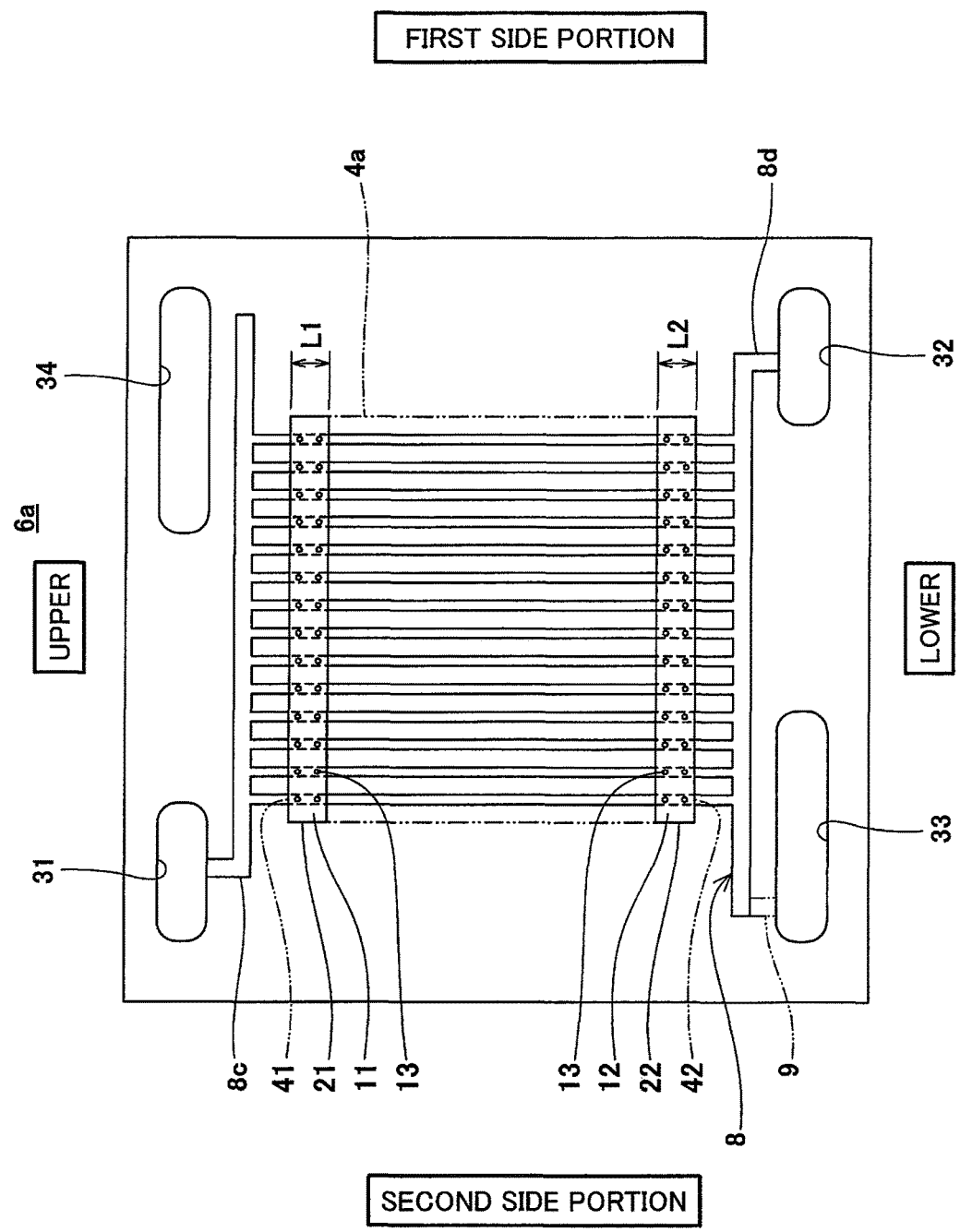
FIG. 31 is a schematic view showing an exemplary configuration of the inner surface of an anode separator of a fuel cell stack according to Embodiment 12 of the present disclosure.
Figure 32:
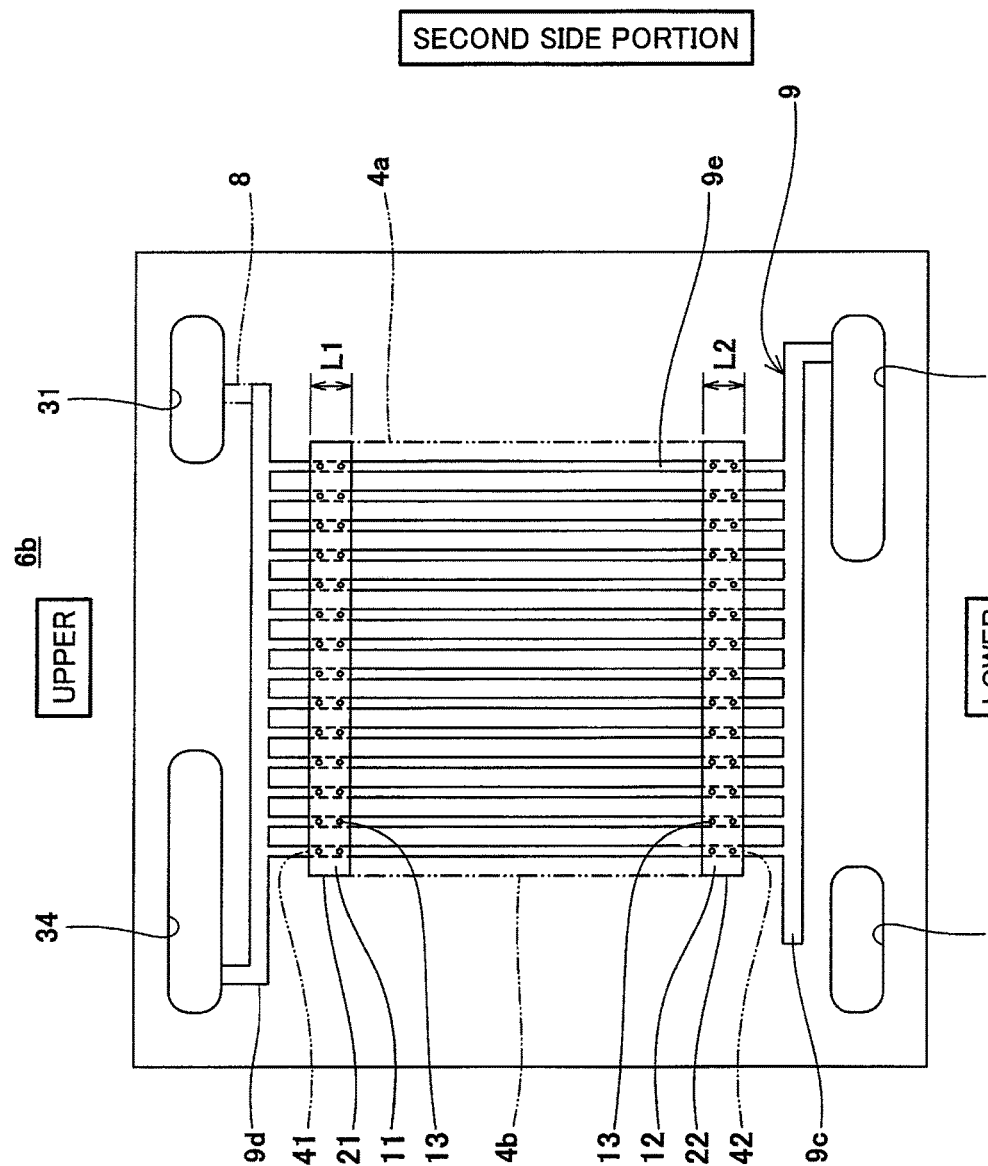
FIG. 32 is a schematic view showing an exemplary configuration of the inner surface of a cathode separator of a fuel cell stack according to Embodiment 12 of the present disclosure.

FIG. 31 is a schematic view showing an exemplary configuration of the inner surface of an anode separator of a fuel cell stack according to Embodiment 12 of the present disclosure. FIG. 32 is a schematic view showing an exemplary configuration of the inner surface of a cathode separator of the fuel cell stack according to Embodiment 12 of the present disclosure. In FIG. 31, the upper and lower sides of the anode separator are expressed as the upper and lower sides in FIG. 31, and a part of the oxidizing gas channel is indicated by imaginary lines. In FIG. 32, the upper and lower sides of the cathode separator are expressed as the upper and lower sides in FIG. 32, and a part of the fuel gas channel is indicated by imaginary lines. In FIGS. 29 and 30, the cooling medium supply manifold hole and the cooling medium discharge manifold hole are omitted.

Referring to FIGS. 31 and 32, the fuel cell stack 61 (fuel cell 100) according to Embodiment 12 of the present disclosure has a configuration which is substantially identical to that of the fuel cell stack 61 (fuel cell 100) of Embodiment 11 but is different from the same in that the cover member 11 is provided at the first region 21 of the cathode separator 6b and the cover member 12 is provided at the second region 22 of the cathode separator 6b.

The fuel cell stack 61 (fuel cell 100) of Embodiment 12 configured as described above achieves the same advantage as that of the fuel cell stack 61 (fuel cell 100) of Embodiment 11. In addition, it is possible to suppress a steam from diffusing from the portions of the MEA 5 (to be precise, cathode 4b) which face the first region 21 and the second region 22 of the cathode separator 6b, to the oxidizing gas channel 9. Thus, it is possible to suppress the MEA 5 (especially, polymer electrolyte membrane 1) from getting dried.

Although an internal manifold type fuel cell stack in which the separator is provided with manifold holes is used in Embodiment 1 to 12, an external manifold type fuel cell may alternatively be used.

Although the fuel gas channel 8, the oxidizing gas channel 9 and the cooling medium channel 10 are formed in a serpentine shape in Embodiments 1 to 8, and the fuel gas channel 8 or the oxidizing gas channel 9 is formed in a straight-line shape in Embodiment 9 to Embodiment 12, any shapes may be used so long as the reactant gases or the cooling medium flow through substantially the entire main surface of the anode separator 6a and substantially the entire main surface of the cathode separator 6b.

Although the inner surface of the anode separator 6a or the inner surface of the cathode separator 6b is coplanar with the main surface of the cover member 11 and the main surface of the cover member 12 in Embodiment 1 to Embodiment 5, the main surface of the cover member 11 and the main surface of the cover member 12 may be recessed in the inner surface of the anode separator 6a or the cathode separator 6b. In other words, the depth of the recess of the first region 21 and the depth of the recess of the second region 22 of the anode separator 6a or the cathode separator 6b may be smaller than the height of the cover member 11 and the height of the cover member 12.

Although the gas permeation suppressing section is formed by covering the opening of the fuel gas channel 8 with the cover member 11 and the cover member 12 in Embodiment 9 to Embodiment 12, it may be constituted by a tunnel formed by boring the anode separator 6a or the cathode separator 6b like that of Embodiment 8.

EXAMPLE

Next, advantages of the present disclosure will be further described using Example.

In Example, the fuel cell 100 was configured such that each of the anode separator 6a and the cathode separator 6b was provided with the cover member 13 of FIG. 13. To be specific, each of the anode separator 6a and the cathode separator 6b was provided with the cover member 11 such that the cover member 11 covers the region between the portion 41 which contacts the anode 4a first from the upstream end of the fuel gas channel 8 and the portion 42 which contacts the cathode 4b first from the upstream end of the oxidizing gas channel 9. The other constituents of the fuel cell 100 of Example were identical to those of the fuel cell (cell) 100 of Embodiment 1.

In contrast, the fuel cell 100 of Comparative example was not provided with the cover member 11.

These fuel cells 100 were operated for 100 hours under power generation conditions in which a current density was 0.02 A/cm$^2$, a fuel gas utilization rate was 2%, an oxidizing gas utilization rate was 1.4%, a mixture gas consisting of hydrogen of 75% and carbon diode of 25% was used as the fuel gas, and an oxygen gas of 100% was used as the oxidizing gas, the dew point of the fuel gas and the dew point of the oxidizing gas were set to 65 degrees C. and a cell temperature was set to 90 degrees C. Then, the water discharged from the fuel gas channel 8 and the water discharged from the oxidizing gas channel 9 were collected during the operation of each fuel cell 100. Then, for each fuel cell 100, the amount of fluoride ions was measured by Ion Chromatography, and the integrated amount was regarded as a degradation amount of the polymer electrolyte membrane. The result is shown in FIG. 33.

Figure 33:
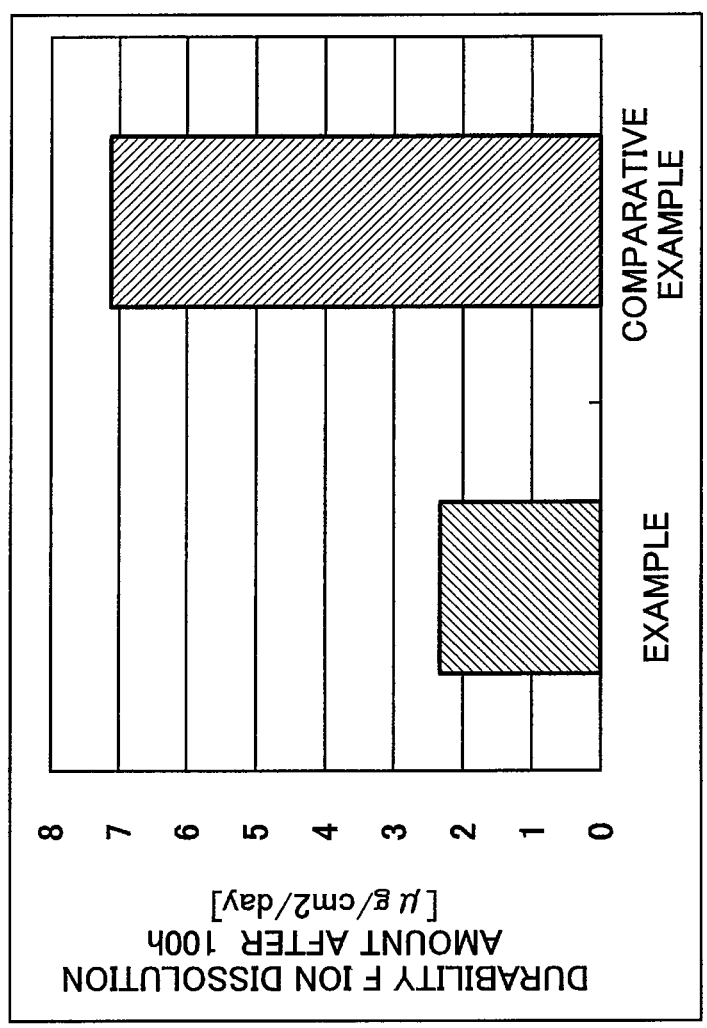
FIG. 33 is a graph showing a total dissolution amount of fluoride ions after 100-hour operation of a fuel cell.

FIG. 33 is a graph showing a total dissolution amount of fluoride ions after 100-hour operation of the fuel cell 100. As shown in FIG. 33, in the fuel cell 100 of Example, the total dissolution amount of fluoride ions was 2.374 μg/cm$^2$/day, whereas in the fuel cell 100 of Comparative example, the total dissolution amount of fluoride ions was 7.098 μg/cm$^2$/day. Thus, the dissolution amount of fluoride ions in the fuel cell 100 of Example was about ⅓ of the dissolution amount of fluoride ions in the fuel cell of Comparative example. Thus, it was discovered that, using the gas permeation suppressing section, the fuel cell 100 of Example is capable of suppressing a steam from diffusing from the portions of the anode 4a (anode gas diffusion layer 3a) which face the first region 21 and the second region 22 of the anode separator 6a, to the fuel gas channel 8, and to suppress a steam from diffusing from the portions of the cathode 4b (cathode gas diffusion layer 3b) which face the first region 21 and the second region 22 of the cathode separator 6b, to the oxidizing gas channel 9, thereby suppressing degradation of the polymer electrolyte membrane 1.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A fuel cell comprising:
an electrolyte-layer-electrode assembly including an electrolyte layer and a pair of electrodes sandwiching the electrolyte layer, the pair of electrodes including a first gas diffusion layer and a second gas diffusion layer;
a first separator which has a plate shape and is electrically conductive, the first separator being disposed to contact the electrolyte-layer-electrode assembly and being provided with a first groove-shaped reactant gas channel on an inner surface thereof which contacts one of the electrodes;
a second separator which has a plate shape and is electrically conductive, the second separator being disposed to contact the electrolyte-layer-electrode assembly and being provided with a second groove-shaped reactant gas channel on an inner surface thereof which contacts the other electrode; and
one or more gas permeation suppressing sections for suppressing a gas from flowing, in a stacking direction of the electrolyte-layer-electrode assembly, the first separator and the second separator, to at least one of the electrodes, wherein:
each of the inner surface of the first separator and the inner surface of the second separator has a region (hereinafter referred to as a first region) including at least a portion where the first reactant gas channel extending from its upstream end contacts one of the electrodes first when viewed in a thickness direction of the first separator, and a region (hereinafter referred to as a second region) including at least a portion where the second reactant gas channel extending from its upstream end contacts the other electrode first when viewed in the thickness direction of the first separator,
the gas permeation suppressing section is disposed on at least one of the first reactant gas channel and the second reactant gas channel so as to overlap with the first region when viewed in the thickness direction of the first separator,
the gas permeation suppressing section is disposed on at least one of the first reactant gas channel and the second reactant gas channel so as to overlap with the second region when viewed in the thickness direction of the first separator,
the gas permeation suppressing section has a through hole extending in the stacking direction,
a surface of the gas permeation suppressing section, on which an opening of the through hole is disposed, is in contact with at least one of the first and second gas diffusion layers,
a gas diffusion from the first groove-shaped reactant gas channel in the first region to the first gas diffusion layer is lower than a gas diffusion from the first groove-shaped reactant gas channel in a portion other than the first region to the first gas diffusion layer, and
a gas diffusion from the second groove-shaped reactant gas channel in the second region to the second gas diffusion layer is lower than a gas diffusion from the second groove-shaped reactant gas channel in a portion other than the second region to the second gas diffusion layer.

2. The fuel cell according to claim 1, wherein the gas permeation suppressing section has a culvert shape.

3. The fuel cell according to claim 1, wherein:
the gas permeation suppressing section of the first reactant gas channel is provided such that a first cover member covers an opening of the first reactant gas channel disposed on the inner surface of the first separator, and
the gas permeation suppressing section of the second reactant gas channel is provided such that a second cover member covers an opening of the second reactant gas channel disposed on the inner surface of the second separator.

4. The fuel cell according to claim 3, wherein at least one of the first and second cover members includes the through-hole in a region thereof which covers the first reactant gas channel or the second reactant gas channel.

5. The fuel cell according to claim 3, wherein at least one of the first and second cover members is made of an electrically-conductive material.

6. The fuel cell according to claim 3, wherein a degree of porosity of at least one of the first and second cover members is lower than a degree of porosity of the first and second gas diffusion layers.

7. The fuel cell according to claim 3, wherein at least one of the first and second cover members is made of a material having porosity of zero degree.

8. The fuel cell according to claim 1, wherein:
the gas permeation suppressing section of the first reactant gas channel is integral with the first separator and is constructed of a tunnel formed by boring the first separator, and
the gas permeation suppressing section of the second reactant gas channel is integral with the second separator and is constructed of a tunnel formed by boring the second separator, and
at least one of the tunnels of the first reactant gas channel and the second reactant gas channel functions as the through hole.

9. The fuel cell according to claim 8, wherein the tunnel of the first separator opens in an inner surface of the first separator, and the tunnel of the second separator opens in an inner surface of the second separator.

10. The fuel cell according to claim 1, wherein the first reactant gas channel is provided with the gas permeation suppressing section in each of portions thereof respectively formed in the first region and the second region of the first separator.

11. The fuel cell according to claim 1, wherein the second reactant gas channel is provided with the gas permeation suppressing section in each of portions thereof respectively formed in the first region and the second region of the second separator.

12. The fuel cell according to claim 1, wherein:
the first reactant gas channel is provided with the gas permeation suppressing section in each of portions thereof respectively formed in the first region and the second region of the first separator, and
the second reactant gas channel is provided with the gas permeation suppressing section in each of portions thereof respectively formed in the first region and the second region of the second separator.

13. The fuel cell according to claim 1, wherein:
the first reactant gas channel is provided with the gas permeation suppressing section in a portion thereof formed in the first region of the first separator, and
the second reactant gas channel is provided with the gas permeation suppressing section in a portion thereof formed in the second region of the second separator.

14. The fuel cell according to claim 1, wherein:
the first reactant gas channel is provided with the gas permeation suppressing section in a portion thereof formed in the second region of the first separator, and the second reactant gas channel is provided with the gas permeation suppressing section in a portion thereof formed in the first region of the second separator.

15. The fuel cell according to claim 1, wherein the first reactant gas channel and the second reactant gas channel are arranged to form a parallel flow pattern.

16. The fuel cell according to claim 1, wherein the first reactant gas channel and the second reactant gas channel are arranged to form a counter flow pattern.

17. The fuel cell according to claim 1, wherein each of the first reactant gas channel and the second reactant gas channel has a serpentine shape.

18. The fuel cell according to claim 1, wherein:
the first reactant gas channel includes a first upstream gas channel, a first downstream gas channel, and plural first communication gas channels through which the first upstream gas channel communicates with the first downstream gas channel, the plural first communication gas channels extending in a straight-line shape,
the second reactant gas channel includes a second upstream gas channel, a second downstream gas channel, and plural second communication gas channels through which the second upstream gas channel communicates with the second downstream gas channel, the plural second communication gas channels extending in a straight-line shape,
an upstream end of the first upstream gas channel is an upstream end of the first reactant gas channel and a downstream end of the first downstream gas channel is a downstream end of the first reactant gas channel, and
an upstream end of the second upstream gas channel is an upstream end of the second reactant gas channel and a downstream end of the second downstream gas channel is a downstream end of the second reactant gas channel.

19. The fuel cell according to claim 3, wherein a recess is provided in the first region or the second region of the inner surface of at least one of the first separator and the second separator such that a main surface of the cover member which does not contact the first separator or the second separator is entirely coplanar with the inner surface of the first separator or the second separator.

20. A fuel cell stack comprising plural fuel cells according to claim 1, the plural fuel cells being stacked together and fastened to each other.

* * * * *